(12) United States Patent
Kojima et al.

(10) Patent No.: US 6,171,410 B1
(45) Date of Patent: Jan. 9, 2001

(54) HARD MAGNETIC ALLOY, HARD MAGNETIC ALLOY COMPACT, AND METHOD FOR PRODUCING THE SAME

(75) Inventors: Akinori Kojima; Akihiro Makino; Takashi Hatanai, all of Niigata-ken; Yutaka Yamamoto, Niigta-ken; Akihisa Inoue, Miyagi-ken, all of (JP)

(73) Assignee: Alps Electric Co. Ltd., Tokyo (JP)

( * ) Notice: Under 35 U.S.C. 154(b), the term of this patent shall be extended for 0 days.

(21) Appl. No.: 09/026,853

(22) Filed: Feb. 20, 1998

(30) Foreign Application Priority Data

| Feb. 20, 1997 | (JP) | 9-036718 |
| Feb. 25, 1997 | (JP) | 9-072464 |
| Mar. 21, 1997 | (JP) | 9-068715 |
| May 26, 1997 | (JP) | 9-135601 |
| Oct. 27, 1997 | (JP) | 9-294613 |
| Nov. 21, 1997 | (JP) | 9-321807 |

(51) Int. Cl.$^7$ .................................... H01F 1/04
(52) U.S. Cl. .............. 148/302; 148/100; 148/121; 148/304
(58) Field of Search ................... 148/100, 121, 148/302, 304

(56) References Cited

U.S. PATENT DOCUMENTS

| 5,049,208 | 9/1991 | Yajima et al. | 148/302 |
| 5,089,065 | 2/1992 | Hamano et al. | 148/302 |
| 5,225,004 | * 7/1993 | O'Handley et al. | 148/101 |
| 5,634,987 | * 6/1997 | Zhang et al. | 148/302 |

* cited by examiner

*Primary Examiner*—Ngoclan Mai
(74) *Attorney, Agent, or Firm*—Brinks Hofer Gilson & Lione

(57) ABSTRACT

A hard magnetic alloy in accordance with the present invention is composed of at least element T selected from the group consisting of Fe, Co and Ni, at least one rare earth element R, and boron (B). The hard magnetic alloy has an absolute value of the temperature coefficient of magnetization of 0.15%/° C. or less and a coercive force of 1 kOe, when being used in a shape causing a permeance factor of 2 or more. A hard magnetic alloy compact in accordance with the present invention has a texture, in which at least a part or all of the texture comprises an amorphous phase or fine crystalline phase having an average crystal grain size of 100 nm or less, is subjected to crystallization or grain growth under stress, such that a mixed phase composed of a soft magnetic or semi-hard magnetic phase and a hard magnetic phase is formed in the texture, and anisotropy is imparted to the crystal axis of the hard magnetic phase.

21 Claims, 56 Drawing Sheets

$Fe_{85}Nb_2Nd_3B_5$ $T_s = 873K$
$D_s = 7.70 gcm^{-3}$ $T_s = 773K$
$D_s = 7.44 gcm^{-3}$ $T_s = 673K$
$D_s = 6.98 gcm^{-3}$

HARD MAGNETIC ALLOY, HARD MAGNETIC ALLOY COMPACT, AND METHOD FOR PRODUCING THE SAME

BACKGROUND OF THE INVENTION

1. Field of the Invention

The present invention relates to a hard magnetic alloy having excellent magnetic characteristics and temperature-dependent properties and used in sensors such as magnetic encoders and potentiometers, motors, actuators, and speakers. The present invention relates to a hard magnetic alloy compact and a method for producing the alloy and the compact.

2. Description of the Related Art

Nd-Fe-B magnets and Sm-Co magnets are generally known as magnetic materials which show superior characteristics to that of ferrite magnets and Alnico (Al-Ni-Co-Fe) magnets. Novel alloy magnets having further improved characteristics and particularly Sm-Fe-N magnets have also been intensively studied. These magnets, however, must contain at least 10 atomic % of Nd or at least 8 atomic % of Sm. Use of large quantities of expensive rare earth elements inevitably increases the production costs. Since the magnetic characteristics of Nd-Fe-B magnets are largely dependent on temperature, they cannot be used as sensors. On the other hand, Sm-Co magnets have not been used in practice in spite of their smaller thermal coefficients of magnetization, because they are more expensive than the Nd-Fe-B magnets.

Ferrite magnets and Alnico magnets are inexpensive compared to the rare earth magnets; however, the ferrite magnets have larger thermal coefficients of magnetization and thus cannot be used as sensors, whereas the Alnico magnets have extremely low coercive forces.

The above-mentioned hard magnetic alloys have been produced by spraying molten alloys onto rotating drums to form thin ribbons by quenching the alloys or by spraying molten alloys into cooling gas to form alloy powders by quenching alloy droplets. The thin ribbons and alloy powders must therefore be formed into given shapes before being used for motors, actuators, and speakers.

Typical methods for molding magnetic powder include compaction molding and injection compacting of a mixture of the magnetic powder and a rubber or plastic binder. The resulting magnet is referred to as a "bond magnet". Since the versatility of possible form features of bond magnets is high, they have been widely used in electronic parts. The binder in bond magnets, however, causes inferior magnetic characteristics because of decreased remanent magnetization and low mechanical strength of the bond magnet.

Accordingly, the advent of inexpensive magnetic materials having hard magnetic characteristics superior to those of ferrite magnets and excellent temperature-dependent properties has been eagerly awaited.

The present inventors have studied inexpensive hard magnetic materials having excellent magnetic characteristics and temperature-dependent properties, and have discovered from various experimental results that the thermal coefficient of magnetization is related to the permeance factor p.

Also, the present inventors have directed their attention to the heating rate during annealing of a quenched alloy essentially consisting of an amorphous phase and discovered that hard magnetic characteristics are related to the nano-crystalline structure (particularly, crystal grain size of the bcc(body centered cubic)-Fe phase) in a fine crystalline phase which is precipitated by the annealing.

SUMMARY OF THE INVENTION

It is an object of the present invention to provide a hard magnetic alloy which is capable of low cost production and has excellent hard magnetic characteristics and excellent temperature-dependent properties.

It is another object of the present invention to provide a hard magnetic alloy compact having high mechanical strength and excellent magnetic characteristics.

It is a further object of the present invention to provide a method for producing the hard magnetic alloy or hard magnetic alloy compact.

A first aspect of the present invention is a hard magnetic alloy comprising at least one element T selected from the group consisting of Fe, Co and Ni, at least one rare earth element R, and B, the hard magnetic alloy containing at least 10 percent by volume of a soft magnetic or semi-hard magnetic phase having a coercive force of 1 kOe or less and at least 10 percent by volume of a hard magnetic phase having a coercive force of 1 kOe or more, the absolute value of the thermal coefficient of magnetization being 0.15%/° C. or less when the hard magnetic alloy is used in a shape causing a permeance factor of 2 or more.

Preferably, the hard magnetic alloy may primarily contain a fine crystalline phase having an average crystal grain size of 100 nm or less.

Preferably, the absolute value of the thermal coefficient of magnetization may be 0.1%/° C. or less when the hard magnetic alloy is used in a shape causing a permeance factor of 10 or more.

Preferably, the ratio Ir/Is of the remanent magnetization Ir to the saturation magnetization Is may be 0.6 or more.

Preferably, the hard magnetic alloy may have the following formula:

$$T_xM_yR_zB_w$$

wherein T represents at least one element selected from the group consisting of Fe, Co and Ni, M represents at least one element selected from the group consisting of Zr, Nb, Ta and Hf, R represents at least one rare earth element, and the suffixes x, y, z and w by atomic percent satisfy $50 \leq x$, $0 \leq y \leq 15$, $3 \leq z \leq 20$, and $2 \leq w \leq 20$, respectively. Preferably, the suffixes x, y, z and w by atomic percent may satisfy $80 \leq x \leq 92$, $1 \leq y \leq 5$, $3 \leq z \leq 10$, and $3 \leq w \leq 7$, respectively.

Preferably, the hard magnetic alloy may have the following formula:

$$T_xM_yR_zB_wSi_u$$

wherein T represents at least one element selected from the group consisting of Fe, Co and Ni, M represents at least one element selected from the group consisting of Zr, Nb, Ta and Hf, R represents at least one rare earth element, and the suffixes x, y, z, w, and u by atomic percent satisfy $50 \leq x$, $0 \leq y \leq 15$, $3 \leq z \leq 20$, $2 \leq w \leq 20$, and $0 \leq u \leq 5$, respectively. Preferably, the suffixes x, y, z, w, and u by atomic percent may satisfy $80 \leq x \leq 92$, $1 \leq y \leq 5$, $3 \leq z \leq 10$, $3 \leq w \leq 7$, and $0.5 \leq u \leq 5$, respectively.

Preferably, the hard magnetic alloy may have the following formula:

$$T_xM_yR_zB_wE_v$$

wherein T represents at least one element selected from the group consisting of Fe, Co and Ni, M represents at least one element selected from the group consisting of Zr, Nb, Ta and Hf, R represents at least one rare earth element, E represents at least one element selected from the group consisting of Cr, Al, Pt and platinum elements, and the suffixes x, y, z, w, and v by atomic percent satisfy $50 \leq x$, $0 \leq y \leq 15$, $3 \leq z \leq 20$, $2 \leq w \leq 20$, and $0 \leq v \leq 10$, respectively. Preferably, the suffixes x, y, z, w, and v by atomic percent may satisfy $80 \leq x \leq 92$, $1 \leq y \leq 5$, $3 \leq z \leq 10$, $3 \leq w \leq 7$, and $0 \leq v \leq 5$, respectively.

Preferably, the hard magnetic alloy may have the following formula:

$$T_x M_y R_z B_w E_v Si_u$$

wherein T represents at least one element selected from the group consisting of Fe, Co and Ni, M represents at least one element selected from the group consisting of Zr, Nb, Ta and Hf, R represents at least one rare earth element, E represents at least one element selected from the group consisting of Cr, Al, Pt and platinum elements, and the suffixes x, y, z, w, v, and u by atomic percent satisfy $50 \leq x$, $0 \leq y \leq 15$, $3 \leq z \leq 20$, $2 \leq w \leq 20$, $0 \leq v \leq 10$, and $0 \leq u \leq 5$, respectively. Preferably, the suffixes x, y, z, w, v, and u by atomic percent satisfy $80 \leq x \leq 92$, $1 \leq y \leq 5$, $3 \leq z \leq 10$, $3 \leq w \leq 7$, $0 \leq v \leq 5$, and $0.5 \leq u \leq 5$, respectively.

A second aspect of the present invention is a method for producing a hard magnetic alloy comprising the steps of: preparing an alloy containing at least one element T selected from the group consisting of Fe, Co and Ni, at least one rare earth element R, and B, and essentially consisting of an amorphous phase by a liquid quenching process, and annealing the alloy at a heating rate of 10° C./min. or more.

Preferably, a fine crystalline phase having an average crystal grain size of 100 nm or less may be precipitated as a main phase by the annealing.

Preferably, the hard magnetic alloy in this method may have one of the above-mentioned composition.

A third aspect of the present invention is a hard magnetic alloy compact comprising an Fe-based or FeCo-based alloy containing 3 to 20 atomic percent of at least one rare earth element R, and 2 to 20 atomic percent of B, wherein the alloy having a texture, in which at least a part or all of the texture comprises an amorphous phase or fine crystalline phase having an average crystal grain size of 100 nm or less, is subjected to crystallization or grain growth under stress, such that a mixed phase composed of a soft magnetic or semi-hard magnetic phase and a hard magnetic phase is formed in the texture, anisotropy is imparted to the crystal axis of the hard magnetic phase, and the hard magnetic alloy compact has a coercive force of 1 kOe or more.

Preferably, the hard magnetic alloy compact may comprise at least 10 percent by volume of a soft magnetic or semi-hard magnetic phase having a coercive force of 1 kOe or less which comprises a body centered cubic (bcc) Fe phase or bcc-FeCo phase, an Fe-B compound phase, and an amorphous phase as precipitates, and at least 10 percent by volume of a hard magnetic phase having a coercive force of 1 kOe or more which comprises an $R_2Fe_{14}B$ phase, wherein R represents at least one rare earth element.

Preferably, the annealed alloy may be crystallized or may be subjected to crystal growth under stress and may be simultaneously compacted.

Preferably, the hard magnetic alloy contains an amorphous phase, and may be formed by solidifying an alloy having hard magnetic characteristics when being crystallized, by means of a softening phenomenon of the alloy during the crystallization reaction.

Preferably, the alloy may be heated under stress.

Preferably, the relative density of the compact obtained by compacting the alloy is 90% or more.

Preferably, the hard magnetic alloy compact may have a remanent magnetization of 100 emu/g or more.

Preferably, the ratio of the remanent magnetization Ir to the saturation magnetization Is may be 0.6 or more.

Preferably, the hard magnetic alloy compact has one of the composition described in the first aspect.

A fourth aspect of the present invention is a method for producing a hard magnetic alloy compact comprising the following steps of: quenching an Fe- or FeCo-based alloy containing 3 to 20 atomic percent of at least one rare earth element R and 2 to 20 atomic percent of B so as to form a texture, in which at least a part or all of the texture comprises an amorphous phase or fine crystalline phase having an average crystal grain size of 100 nm or less; performing crystallization or grain growth of the alloy under stress, such that a mixed phase composed of a soft magnetic or semi-hard magnetic phase and a hard magnetic phase is formed in the texture; imparting anisotropy to the crystal axis of the hard magnetic phase.

Preferably, after performing crystallization or grain growth of the alloy under stress, the alloy may be annealed at 400° C. to 1,000° C. so as to precipitate a fine crystalline phase having an average crystal grain size of 100 nm or less as a main phase in the texture.

Preferably, the alloy after quenching may be compacted while performing crystallization or grain growth of the alloy under stress.

Preferably, the hard magnetic alloy contains an amorphous phase, and may be formed by solidifying an alloy having hard magnetic characteristics when being crystallized, by means of a softening phenomenon of the alloy during the crystallization reaction.

Preferably the alloy may be heated under stress.

DESCRIPTION OF THE PREFERRED EMBODIMENTS

Figure 1:
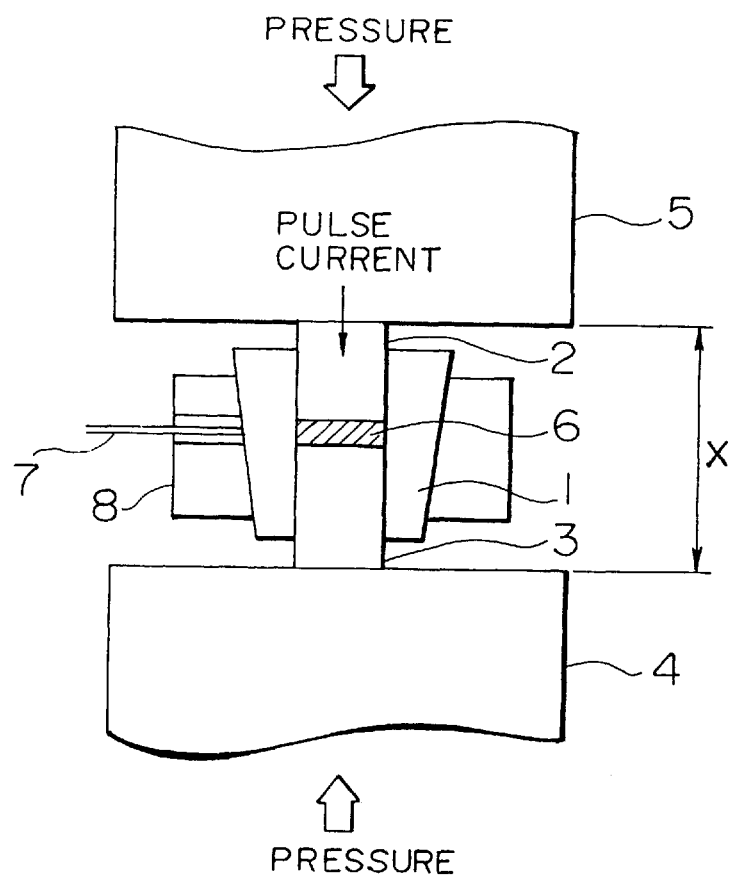
FIG. 1 is a cross-sectional view of the main section of a spark plasma sintering apparatus used in a method for producing a hard magnetic alloy compact in accordance with the present invention.

The preferred embodiments of the present invention will now be illustrated with reference to the drawings.

The hard magnetic alloy in accordance with the present invention comprises at least one element selected from the group consisting of Fe, Co and Ni, at least one rare earth element R, and B (boron), the absolute value of the temperature coefficient of magnetization of the alloy is 0.15%/° C. or less when it is used in a shape causing a permeance factor of 2 or more, and its coercive force is 1 kOe or more.

Magnetic characteristics of magnetic materials are generally expressed by the hysteresis curves in the second quadrant, that is, demagnetization curves. Since magnetic materials after magnetization lie under a demagnetizing field, which is a magnetic field in the reverse direction caused by remanent magnetization of itself, the operating point (the magnetic flux density B of the material and the demagnetizing field H) is given at a point p on the demagnetizing curve, wherein the $B/\mu_0H$ value, a nondimensional parameter, is referred to as a permeance factor p, and a line OP between p and the origin O is referred to as a permeance line. The permeance factor p or permeance line depends on the shape of the magnet, decreases as the length of the magnetization direction decreases, and increases as the length increases, for example, p=1.5 for a disk magnet or p=10 for a prismatic magnet.

The following equation (I) stands between the permeance factor p and the demagnetizing factor N:

$$p=(1-N)/N \qquad (I)$$

The operating point (B, H) is therefore determined by the demagnetization curve and the shape of the magnetic material. The magnetostatic energy U generated in an outer field by the magnetic material is represented by the following equation (II):

$$U=BHV/2 \qquad (II)$$

wherein V is the volume of the magnetic material. The demagnetization field, that is, the permeance line changes with the shape of the magnetic material, hence the operating point p and thus the magnetostatic energy U change. The magnetostatic energy U has a maximum value at a given operating point $p_m$, and the corresponding product of the magnetic flux density B and the demagnetizing field H is referred to as the maximum energy product $(BH)_{max}$.

When using the hard magnetic material in accordance with the present invention in sensors, it is preferable that the hard magnetic material has an excellent temperature-dependent property, that is, a small absolute value of the temperature coefficient of magnetization, which prevents the drift of the output caused by a change in temperature. Since the hard magnetic material in accordance with the present invention has a small absolute value of the temperature coefficient of magnetization of 0.15%/° C. or less when being used in a shape causing a permeance factor of 2 or more as described above, it can be preferably used for sensors. It is more preferable that the hard magnetic alloy in accordance with the present invention be used in a shape causing a permeance factor of 10 or more, in order to achieve a further improved temperature-dependent property, that is, a smaller absolute value of the temperature coefficient of magnetization of 0.1%/° C. or less. Such a low absolute value of the temperature coefficient of magnetization in the hard magnetic alloy in accordance with the present invention is comparable to or superior to any conventional Nd-Fe-B-based magnets having absolute values of temperature coefficients of magnetization in a range from 0.11 to 0.15%/° C. when being used in a shape causing a permeance factor of 10 or more.

Further, the hard magnetic alloy in accordance with the present invention has a larger coercive force compared to Alnico magnets, and is more inexpensive than conventional Sm-Co-based magnets having excellent temperature-dependent properties.

In the hard magnetic alloy in accordance with the present invention, Si (silicon) is preferably substituted for 0.5 to 5 atomic percent of the element T, or 0.5 to 20 atomic percent of Co (cobalt) is preferably contained in the element T, in order to further improve temperature-dependent properties.

The hard magnetic alloy in accordance with the present invention may contain at least 10 percent by volume of a soft magnetic or semi-hard magnetic phase having a coercive force of 1 kOe or less and at least 10 percent by volume of a hard magnetic phase having a coercive force of 1 kOe or more, and may have a coercive force of 1 kOe or more. The hard magnetic alloy with such a microstructure has an intermediate characteristic between the soft magnetic or semi-hard magnetic phase and the hard magnetic phase. Since the soft magnetic phase generally has high magnetization, it improves the overall remanent magnetization of the hard magnetic alloy. Accordingly, the inclusion of the soft magnetic phase is preferable for enhancing magnetic characteristics of the hard magnetic alloy. When the content of the soft magnetic phase with a coercive force of 1 kOe or less is less than 10 percent by volume, a large amount of Nd (neodymium) or the like, which is essential for the hard magnetic phase, must be added, and the remanent magnetization decreases. When the content of the hard magnetic phase with a coercive force of 1 kOe or more is less than 10 percent by volume, the coercive force of the hard magnetic alloy decreases. The preferred content of the soft magnetic phase with a coercive force of 1 kOe or less is 20 to 60 percent by volume, and the preferred content of the hard magnetic phase with a coercive force of 1 kOe or more is 40 to 80 percent by volume.

It is preferable that the hard magnetic alloy in accordance with the present invention contains at least 10 percent by volume of a magnetic phase with a Curie point of 600° C. or more and at least 10 percent by volume of a magnetic phase with a Curie point of 600° C. or less, and has a coercive force of 1 kOe or more, such that the hard magnetic alloy has an intermediate characteristic between the soft magnetic phase and the hard magnetic phase. The bcc Fe phase has a Curie point of near 770° C. and the $R_2Fe_{14}B$ phase has a Curie point of near 315° C. The hard magnetic alloy in accordance with the present invention must contain the magnetic phase with a Curie point of 600° C. or more and the magnetic phase with a Curie point of 600° C. or less, in order that the hard magnetic alloy contains the soft magnetic phase and the hard magnetic phase which participates in magnetization.

If the content of the magnetic phase with a Curie point of 600° C. or more is less than 10 percent by volume, the magnetization significantly changes with temperature in use at a relatively high permeance. On the other hand, if the content of the magnetic phase with a Curie point of 600° C. or less is less than 10 percent by volume, the coercive force of the hard magnetic alloy decreases because of a relatively small content of hard magnetic phase. The preferable content of the magnetic phase with a Curie point at 600° C. or more is 20 to 60 percent by volume, and the preferable content of the magnetic phase with a Curie point of 600° C. or less is 40 to 80 percent by volume.

The hard magnetic alloy in accordance with the present invention primarily contains a fine crystalline phase with an average crystal grain size of 100 nm or less as a precipitate. The fine crystalline precipitate is composed of a bcc-Fe phase with an average size of 100 nm or less which primarily forms the soft magnetic phase and a $R_2Fe_{14}B$ phase with an average size of 100 nm or less which primarily forms the hard magnetic phase. Further, the hard magnetic alloy in accordance with the present invention has a nano-composite texture including the fine crystalline phase composed of the bcc-Fe phase and $R_2Fe_{14}B$ phase, and a residual amorphous phase.

The hard magnetic alloy in accordance with the present invention may be produced by quenching the alloy melt having the above-mentioned composition to prepare an alloy primarily containing an amorphous phase, that is, amorphous alloy, and by annealing the amorphous alloy.

It is preferable that the hard magnetic alloy in accordance with the present invention has a coercive force of 2 kOe or more.

It is preferable that the hard magnetic alloy in accordance with the present invention has a ratio Ir/Is of the remanent magnetization Ir to the saturation magnetization Is of 0.6 or more.

The average crystal grain size of the crystalline phase in the hard magnetic alloy and the concentration of each element in each phase can be controlled by the annealing conditions of the amorphous alloy, such as the heating rate, the annealing temperature, and the holding time.

The hard magnetic alloy in accordance with the present invention is produced as follows.

The processes preparing the amorphous alloy include the formation of an amorphous alloy ribbon by spraying an alloy melt onto a drum to quench the alloy melt; the formation of an alloy powder by spraying droplets of an alloy melt into a cooling gas to quench the alloy melt; and a sputtering or CVD process.

The annealing of the amorphous alloy can be performed with any heating means. For example, in a process for preparing a hard magnetic alloy compact, the amorphous alloy is pulverized, and the pulverized amorphous alloy is pressure-molded with a hot press, and is simultaneously annealed at an adequate heating rate and annealing temperature. The preferable heating rate depends on the composition of the amorphous alloy, and is generally 10° C./min. or more, and specifically 100° C./min. or more. A heating rate of less than 10° C./min. causes coarsening of crystal grains which are precipitated in the alloy during the heating process, hence exchange coupling characteristics between the bcc-Fe soft magnetic phase and the $R_2Fe_{14}B$ hard magnetic phase is deteriorate, that is, the hard magnetic characteristics deteriorate. If the heating rate is 100° C./min. or more, a more homogeneous fine texture can be formed. The upper limit of the heating rate by the current apparatuses is near 200° C./min.

The annealing temperature is preferably 600° C. to 900° C., and more preferably 700° C. to 750° C. The holding time (annealing time) is preferably 1 min. to 20 min., and more preferably 3 m. to 10 min. The combination of the preferable annealing temperature and annealing time depends on the composition of the amorphous alloy. At an annealing temperature of less than 600° C., a relatively small amount of $R_2Fe_{14}B$ phase having hard magnetic characteristics is precipitated, and thus the hard magnetic alloy does not have satisfactory hard magnetic characteristics. On the other hand, at an annealing temperature above 900° C., other precipitates will form or crystal grains will be coarsened, resulting in deterioration of hard magnetic characteristics.

The hard magnetic alloy compact in accordance with the present invention is produced as follows.

The hard magnetic alloy compact in accordance with the present invention is basically composed of an Fe-based or FeCo-based alloy which contains 3 to 20 atomic percent of at least one rare earth element R, and 2 to 20 atomic percent of B. The alloy has a texture, in which at least a part or all of the texture is composed of an amorphous phase or fine crystalline phase having an average crystal grain size of 100 nm or less, is subjected to crystallization or grain growth under stress, such that a mixed phase composed of a soft magnetic or semi-hard magnetic phase and a hard magnetic phase is formed in the texture, and anisotropy is imparted to the crystal axis of the hard magnetic phase. The Fe- or FeCo-based alloy is an alloy containing an amorphous phase, that is, amorphous alloy, and the amorphous alloy may contain a small amount of crystalline phase and shows hard magnetic characteristics when being crystallized.

In the production of the hard magnetic alloy compact, an alloy powder is prepared. The process for preparing the alloy powder generally includes the step for quenching an amorphous alloy melt to form an alloy ribbon or powder, and the step for pulverizing the alloy ribbon. The alloy powder has a particle size of approximately 50 $\mu$m to 150 $\mu$m. It is preferable that the alloy powder is composed of only the amorphous phase.

The processes preparing the amorphous alloy, which may contain a small amount of crystalline phase as described above, include the formation of an amorphous alloy ribbon by spraying an alloy melt onto a drum to quench the alloy melt; the formation of an alloy powder by spraying droplets of an alloy melt into a cooling gas to quench the alloy melt; and a sputtering or CVD process. The resulting alloy ribbon or powder contains a texture composed of a fine crystalline phase precipitate with an average crystal grain size of 100 nm or less or an amorphous phase.

Under stress, the amorphous phase in the alloy powder is crystallized or the crystal grains in the fine crystalline phase are grown, and then the alloy powder is compacted. A mixed phase composed of a soft magnetic or semi-hard magnetic phase and a hard magnetic phase is formed in the texture, which is composed of the fine crystalline phase precipitate with an average crystal grain size of 100 nm or less, or a fine crystalline phase having an average crystal grain size of 100 nm or less is precipitated in the amorphous phase and the mixed phase is simultaneously formed. Further, anisotropy is imparted to the crystal axis of the hard magnetic phase during the compaction process. Such an anisotropic crystal axis of the hard magnetic phase shows a higher remanent magnetization Ir than the isotropic crystal axis.

It is preferable that the amorphous alloy powder be heated when it is subjected to crystallization or grain growth under stress.

It is preferable that the amorphous alloy powder be compacted by means of the softening of the amorphous alloy powder which accompanies the crystallization. The amorphous alloy powder is noticeably softened in the heating process for the crystallization, and the amorphous alloy powder particles are tightly bonded to each other under the pressure. The resulting hard magnetic compact therefore has a high density. It is preferable that the amorphous alloy powder contains at least 50 percent by weight of amorphous phase in order to achieve tight bonding after solidification with heat and pressure and to obtain a permanent magnet with strong hard magnetic characteristics.

Examples of the production of the compact from the alloy powder include compaction of the amorphous alloy powder in a spark plasma sintering system under pressure while applying pulse currents to the alloy powder to heat the amorphous alloy at near the crystallization temperature for a given time; or compaction of the amorphous alloy powder by the heat formed by the pulse currents applied to the alloy powder and by the pressure formed by pressing the alloy powder with two punches at near the crystallization temperature.

FIG. 1 is a cross-sectional view of the main section of a spark plasma sintering system which is preferably used for producing the hard magnetic alloy compact in accordance with the present invention. The spark plasma sintering system includes a tungsten carbide dice 1, tungsten carbide upper and lower punches 2 and 3 inserted in the dice 1, a tungsten carbide overcap dice 8 provided at the exterior of the dice 1, a base table 4 which supports the lower punch 3 and functions as an electrode for leading pulse currents, a base table 6 which presses downward the upper punch 2 and functions as another electrode for leading the pulse currents, a thermocouple 7 for measuring the temperature of the alloy powder placed between the upper and lower punches 2 and 3.

Figure 3:
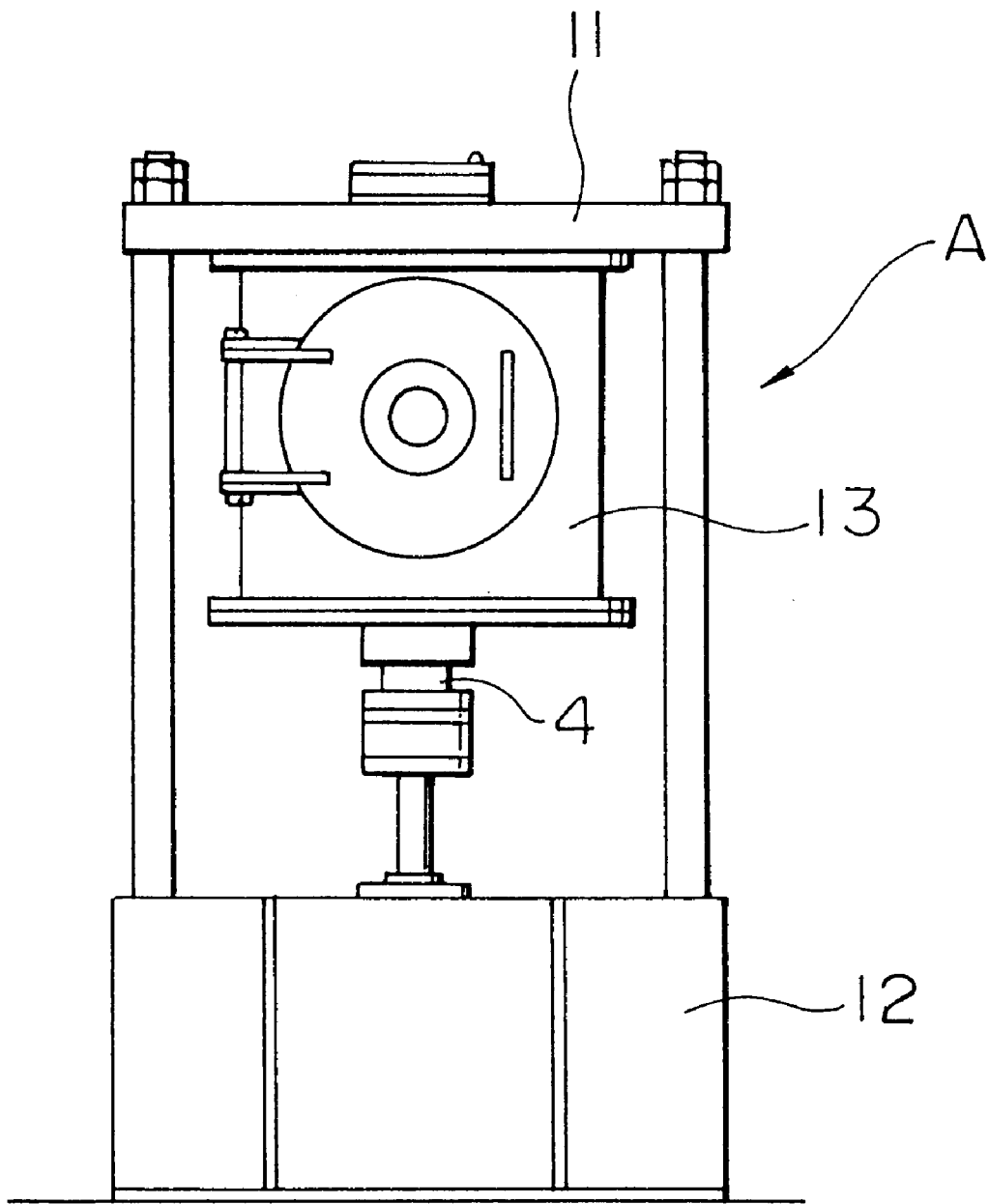
FIG. 3 is a front view of an entire spark plasma sintering apparatus used in a method for producing a hard magnetic alloy compact in accordance with the present invention.

FIG. 3 is a front view of the entire spark plasma sintering apparatus A, Model SPS-2050 made by Sumitomo Coal Mining Co., Ltd., in which the structure of the main section is shown in FIG. 1.

Figure 2:
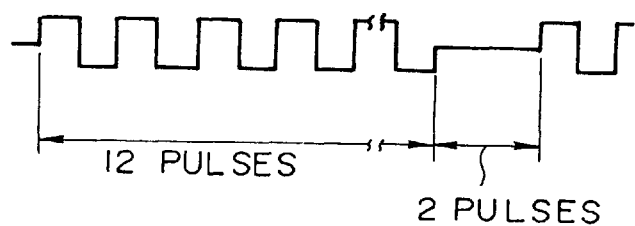
FIG. 2 is a graph of a waveform of a pulse sequence which is applied to an alloy powder in the spark plasma sintering apparatus shown in FIG. 1.

The spark plasma sintering apparatus includes an upper plate 11 and a lower plate 12, and a chamber 13 being in contact with the upper plate 11. The main section shown in FIG. 1 is stored in the chamber 13. The chamber 13 is connected to an evacuation system and an atmospheric gas supply system not shown in the drawing, so that the alloy powder 6 placed between the upper and lower punches 2 and 3 is held in a given atmosphere, such as an inert gas atmosphere. The upper and lower punches 2 and 3 and base tables 4 and 5 are connected to an electrical power unit not shown in FIGS. 1 and 3, which supplies a pulse sequence of electric current as shown in FIG. 2 to the alloy powder through the upper and lower punches 2 and 3 and base tables 4 and 5.

In the production of the compact using the spark plasma sintering system shown in FIGS. 1 and 3, the alloy powder 6 is placed between the punches 2 and 3, the chamber is evacuated, and the alloy powder 6 is molded by the pressure added to the upper and lower punches 2 and 3, while applying the pulse currents to the alloy powder. The amorphous alloy powder is heated at or near the melting point for a given time under stress, such that the amorphous alloy is crystallized or the crystal grains grow. The hard magnetic alloy compact in accordance with the present invention is produced, for example, in such a manner.

The pressure applied during the spark plasma sintering process for crystallization or grain growth ranges generally from 200 to 1,500 MPa, and preferably from 500 to 1,000 MPa. Satisfactory anisotropy in the hard magnetic phase is not achieved under a pressure of less than 200 MPa. Further, the density of the resulting compact is low due to high porosity in the compact. On the other hand, a pressure higher than 1,500 MPa causes damage of the tungsten carbide dice at the temperature.

The alloy powder 6 is heated at a heating rate of 10° C./min. or more, and preferably 20° C./min. or more. Crystal grains are coarsened at a heating rate of less than 10° C./min., and thus the hard magnetic characteristics deteriorate because of decreased exchange coupling.

In the spark plasma sintering process, it is preferable that the amorphous alloy powder be sintered at a sintering temperature Ts satisfying the equation, Tx−200° C.≦Ts ° C.≦Tx+200° C., wherein Tx is the starting temperature of the crystallization of the amorphous alloy. A satisfactory compact having a high density is not obtained at a temperature of less than Tx−200° C., whereas the hard magnetic characteristics deteriorate because of the growth of the fine crystalline phase at a temperature of higher than Tx+200° C.

In the spark plasma sintering process using such a spark plasma system, the current flow enables rapid heating of the alloy powder at a given rate and exact control of the temperature of the alloy powder compared with heating using a heater. The alloy powder can therefore be heated according to a designed heating program.

In the above-mentioned process, the compact is formed by solidifying the alloy powder while or after the alloy powder is subjected to crystallization or crystal grain growth under pressure by the spark plasma sintering process. The alloy powder may be placed into a mold and may be heated to or near the crystallization temperature of the amorphous alloy while being pressed by a hot press. The solidification of the alloy powder, the crystallization and the grain growth for the production of the compact simultaneously proceed also in this process.

In the solidification process by softening of the alloy powder, the pressure, temperature and molding time are controlled such that the resulting compact has a relative density of 90% or more. Since the sintered compact has a significantly dense texture and high mechanical strength, it functions as a compact permanent magnet having strong hard magnetic characteristics.

After the crystallization or grain growth under pressure, the alloy powder is annealed at 400° C. to 1,000° C. while or after the alloy powder is compacted. A fine crystalline phase with an average crystal grain size of 100 nm or less is thereby precipitated as a main phase, resulting in the occurrence of hard magnetic characteristics. At an annealing temperature of less than 400° C., a relatively small amount of $R_2Fe_{14}B$ phase having hard magnetic characteristics is precipitated, hence the resulting compact does not have satisfactory hard magnetic characteristics. At a temperature higher than 1,000° C., the crystal grains in the fine crystalline phase grow, and thus the hard magnetic characteristics deteriorate.

In particular, a compact having extremely high hard magnetic characteristics is obtained under the following conditions: A fine crystalline phase having an average crystal grain size of 100 nm or less occupies 60 percent by volume of the compact and the balance is the amorphous phase; and a bcc-Fe phase or bcc-FeCo phase, and an $R_2Fe_{14}B$ phase, wherein R is at least one rare earth element, are formed in the fine crystalline phase.

In a preferred embodiment, a hard magnetic alloy compact having intermediate characteristics between the soft magnetic phase and the hard magnetic phase can be provided under the following conditions: The compact contains at least 10 percent by volume of a soft or semi-hard magnetic phase with a coercive force of 1 kOe or less and at least 10 percent by volume of a hard magnetic phase with a coercive force of 1 kOe or more; a bcc-Fe or bcc-FeCo phase, an Fe-B compound, and an amorphous phase are precipitated in the soft or semi-hard magnetic phase with a coercive force of 1 kOe or less; and only an $R_2Fe_{14}B$ phase, wherein R is at least one rare earth element, is precipitated in the hard magnetic phase with a coercive force of 1 kOe or more. The formation of the soft magnetic phase having high magnetization in the compact results in a significant increase in remanent magnetization of the compact. When the content of the soft magnetic phase with a coercive force of 1 kOe or less is less than 10 percent by volume, the content of the rare earth element, which is necessary for the hard magnetic phase, should be increased, although the coercive force of the compact is increased. When the content of the hard magnetic phase with a coercive force of 1 kOe or more is less than 10 percent by volume, the content of the rare earth element, the coercive force of the compact is decreased.

The hard magnetic alloy compact prepared by the above-mentioned process has exchange coupling characteristics between the fine soft magnetic phase and the fine hard magnetic phase in the fine texture. Further, the hard magnetic alloy compact has a higher Fe content than that in conventional rare earth magnets, hence it can be used as a permanent magnet having high magnetic characteristics, that is, a remanent magnetization of 100 emu/g or more, and a remanence ratio Ir/Is of the remanent magnetization Ir to the saturation magnetization Is of 0.6 or more. Since the hard magnetic alloy compact is subjected to crystallization or crystal grain growth under stress, anisotropy is imparted to the crystal axis of the hard magnetic phase. The hard magnetic alloy compact has high uniaxial anisotropy and thus a high remanent magnetization Ir. Further, the hard magnetic alloy compact is produced by molding of the amorphous alloy powder under pressure, hence it has higher mechanical strength than conventional bond magnets. Accordingly, the hard magnetic alloy compact is used as a compact permanent magnet having high hard magnetic characteristics. Further, a hard magnetic alloy compact having a given shape can be easily formed from the alloy powder.

Accordingly, the hard magnetic alloy compact in accordance with the present invention is useful as a permanent magnet which is used in various apparatuses, for example, motors, actuators, speakers, and the material costs of these apparatuses can be reduced.

The preferred hard magnetic alloy in accordance with the present invention is represented by the following formula:

wherein T is at least one element selected from the group consisting of Fe, Co and Ni. The content of the element T must be at least 50 atomic percent as the main component for achieving hard magnetic characteristics. The saturation magnetization Is increases as the content x of the element T increases. In order to achieve a high remanent magnetization Ir of 100 emu/g or more, a saturation magnetization Is of at least 130 emu/g is required, and thus it is preferable that the content of the element T be at least 80 atomic percent. The hard magnetic alloy in accordance with the present invention must contain Fe among the elements T.

In the above-mentioned formula, M is at least one element selected from the group consisting of Zr, Nb, Ta, and Hf. The element M has a high ability for forming an amorphous phase. The addition of the element M in the hard magnetic alloy in accordance with the present invention enables easy formation of the amorphous phase even when the content of the rare earth element R is low. As the content y of the element Y as a substituent of the rare earth element R increases, the remanent magnetization Ir increases whereas the coercive force iHc decreases, that is, the hard magnetic characteristics of the hard magnetic alloy is changed to soft magnetic characteristics. As the content of the amorphous-forming element M as the substituent of the magnetic element T increases, the saturation magnetization Is and the remanent magnetization Ir decrease. Accordingly, it is preferable for achieving satisfactory magnetic characteristics that the concentration of the element M be in a range from 0 atomic percent to 15 atomic percent, and more preferably 1 atomic percent to 5 atomic percent.

In the above-mentioned formula, R is at least one rare earth element, such as Sc, Y, La, Ce, Pr, Nd, Pm, Sm, Eu, Gd, Tb, Dy, Ho, Er, Tm, Yb and Lu. The intermetallic compound $R_2Fe_{14}B$, which is precipitated when heating an amorphous alloy containing R, Fe and B to an appropriate temperature in a range from 600° C. to 900° C., imparts satisfactory hard magnetic characteristics to the hard magnetic alloy in accordance with the present invention. As the content z of the element R increases, the saturation magnetization Ir decreases. In order to achieve a high remanent magnetization Ir of 100 emu/g or more, a saturation magnetization Is of at least 130 emu/g is required, and thus it is preferable that the content z of the element R be 20 atomic percent or less. When the content of the element R contributing to the formation of the amorphous phase is decreased, no satisfactory amorphous or fine crystalline phase is formed, hence the content of the element R is preferably at least 2 atomic percent. When part or all of the element R is composed of Nd and/or Pr, higher hard magnetic characteristics can be achieved.

In the above-mentioned formula, B (boron) is an element easily forming an amorphous phase. The compound $R_2Fe_{14}B$ precipitated by annealing of the amorphous phase containing Fe and B at an appropriate temperature in a range from 600° C. to 900° C. imparts hard magnetic characteristics to the hard magnetic alloy in accordance with the present invention. It is preferable that the content of B be at least 2 atomic percent for obtaining a satisfactory amorphous or fine crystalline phase, however, the saturation magnetization Is, remanent magnetization Ir, and coercive force iHc decrease as the content w of B increases, hence the preferable upper limit of the B content is 20 atomic percent, and more preferably 7 atomic percent.

The hard magnetic alloy in accordance with the present invention may contain at least one element E selected from the group consisting of Cr, Al, Pt, Cu, Ag, Au, and platinum elements for fining the crystal texture and improving corrosion resistance of the alloy. In this case, the hard magnetic alloy is represented by the following formula:

The content x of the magnetic element is preferably 50 atomic percent or more, and more preferably 80 atomic percent or more and 92 atomic percent or less in order to increase the saturation magnetization Is. In particular, it is preferable that the content x be 86 atomic percent or more and 93 atomic percent or less for achieving a high remanent magnetization Ir of 100 emu/g or more.

The content y of the element M is preferably 0 atomic percent or more and 15 atomic percent or less, and more preferably 1 atomic percent or more and 5 atomic percent or less in order to achieve excellent hard magnetic characteristics. In particular, it is preferable that the content y be 0.5 atomic percent or more and 3 atomic percent or less for achieving a high remanent magnetization Ir of 100 emu/g or more.

The content z of the element R is preferably 3 atomic percent or more and 20 atomic percent or less, and more preferably 3 atomic percent or less and 10 atomic percent or less in order to impart excellent hard magnetic characteristics to the alloy and to form a satisfactory amorphous or fine crystalline phase. In particular, it is preferable that the content z be 3 atomic percent or more and 7 atomic percent or less for achieving a high remanent magnetization Ir of 100 emu/g or more.

The content w of the element B is preferably 2 atomic percent or more in order to form a satisfactory amorphous or fine crystalline phase. Further, it is preferable that the content w be 20 atomic percent or less, and more preferably 7 atomic percent or less for achieving excellent hard magnetic characteristics. The addition of the element E causes the improved corrosion resistance of the hard magnetic alloy. The hard magnetic characteristics, however, deteriorate if an excessive amount of element E is present, hence the content w of the element E is preferably 10 atomic percent or less, and more preferably 5 atomic percent or less. When a high remanent magnetization Ir of more than 100 emu/g is required, it is preferable that the element E be not added.

It is preferable that the hard magnetic alloy in accordance with the present invention contain Co as the element T other than Fe in order to reduce the absolute value of the temperature coefficient of magnetization when the alloy is used in a shape causing a permeance factor of 2 or more, and particularly 10 or more. Since Co as the element T in the alloy causes an increase in the Curie point, dependence of the magnetization and coercive force on temperature decreases, dependence of the magnetic characteristics on temperature also decreases because of an increased remanence ratio. Further, Co is contained in the bcc-Fe phase, hence dependence of the remanent magnetization on temperature decreases. Since an excessive amount of Co in the alloy causes deterioration of magnetic characteristics, the content is determined in view of the alloy composition and annealing conditions. The Co content is generally 50 atomic percent or less, preferably 0.5 atomic percent or more and 30 atomic percent or less, and more preferably 0.5 atomic percent or more and 20 atomic percent or less.

When Si is added as a substituent of the element T in the hard magnetic alloy in accordance with the present invention, magnetic characteristics, such as coercive force iHc and maximum magnetic energy product $(BH)_{max}$, can be further improved. Further, the addition of Si can decrease the absolute value of the temperature coefficient of magnetization when the alloy is used in a shape causing a permeance factor of 2 or more, and particularly 10 or more. An excessive Si content causes an unintended decrease in hard magnetic characteristics due to a relatively low content of the element T. Accordingly, the Si content is preferably 0.5 atomic percent or more and 5 atomic percent or less, and more preferably 0.5 atomic percent or more and 3 atomic percent or less, and the Si content is determined in view of the alloy composition and annealing conditions.

The hard magnetic alloy having such improved coercive force and temperature dependent properties can be suitable for magnets for compact motors and sensors.

Figure 4:
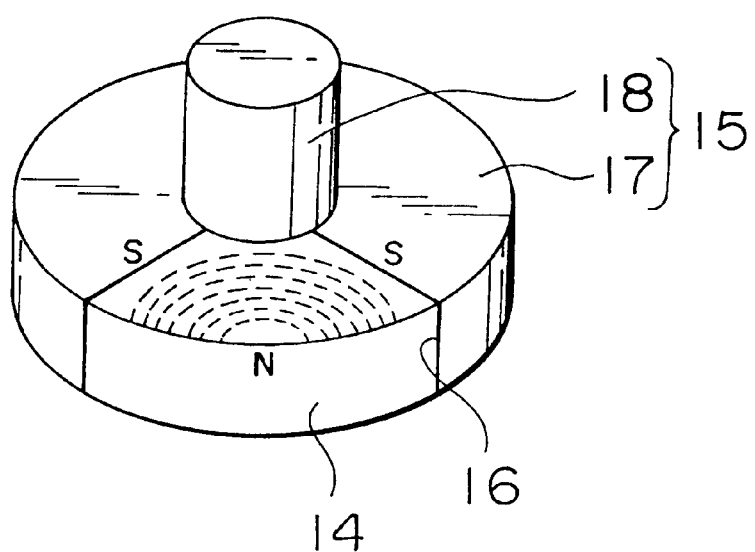
FIG. 4 is an isometric view of an embodiment using a hard magnetic alloy in accordance with the present invention as a magnet for a hall potentiometer.

FIG. 4 is an isometric view of an embodiment using the hard magnetic alloy in accordance with the present invention as a magnet for a hall potentiometer. In FIG. 4, numeral 14 represents a magnetic section composed of the hard magnetic alloy in accordance with the present invention, and numeral 15 represents a supporting section for supporting the magnetic section 14. The magnetic section 14 has a fan shape having a permeance factor of approximately 5 and an absolute value of the temperature coefficient of magnetization of 0.13%/° C. or less. The supporting section 15 includes a disk section 17 with a cutout section 16 for placing the magnetic section 14, and a connecting column 18 which protrudes from the top face of the disk section 17.

In such a magnet for a hall potentiometer, the magnetic section 14 is composed of the hard magnetic alloy in accordance with the present invention, hence it has temperature-dependent properties which are equal to or superior to those of conventional ferrite magnets and Nd-Fe-B-based magnets and the drift due to the change in temperature is prevented. As a result, the magnet enables accurate adjustment of the circuit voltage in electronic devices. Further, the magnet in accordance with this embodiment is more inexpensive than conventional ferrite magnets and Nd-Fe-B-based magnets, and has more excellent hard magnetic characteristics than conventional ferrite magnets and Alnico magnets.

Figure 5:
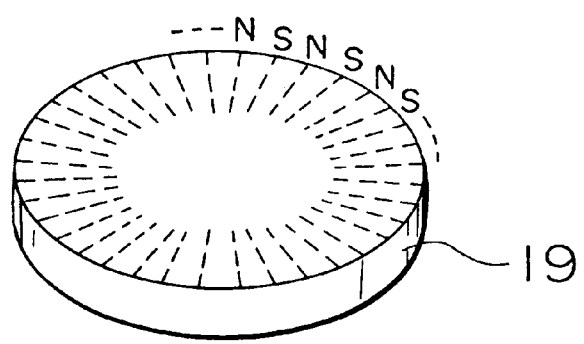
FIG. 5 is an isometric view of an embodiment using a hard magnetic alloy in accordance with the present invention as a rotary encoder magnet.

FIG. 5 is an isometric view of an embodiment using the hard magnetic alloy in accordance with the present invention as a rotary encoder magnet 19. The rotary encoder magnet 19 is composed of the hard magnetic alloy in accordance with the present invention and has a disk shape so that the permeance factor is approximately 2. The rotary encoder magnet 19 is magnetized along the circumference of the disk so as to form multiple poles. Further, the rotary encoder magnet 19 has an absolute value of the temperature coefficient of magnetization of 0.15%/° C. or less.

The rotary encoder magnet 19 using the hard magnetic alloy in accordance with the present invention has temperature-dependent properties which are equal or superior to those of conventional ferrite magnets and Nd-Fe-B-based magnets, can prevent the output drift due to a change in temperature, and thus can detect the rotated angle, or the like, of an electronic device with high accuracy. Further, the rotary encoder magnet 19 in accordance with this embodiment is more inexpensive than conventional ferrite magnets and Nd-Fe-B-based magnets, and has more excellent hard magnetic characteristics than conventional ferrite magnets and Alnico magnets.

Figure 6:
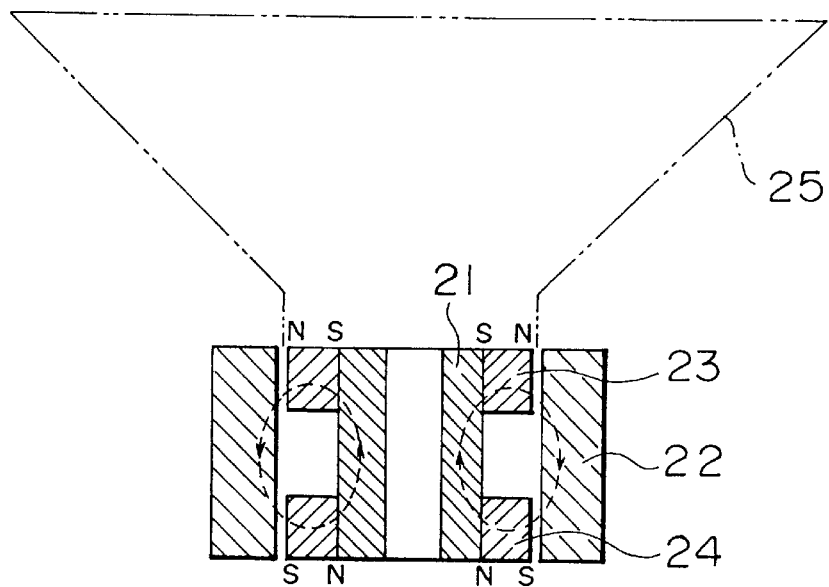
FIG. 6 is a cross-sectional view of a first embodiment using a hard magnetic alloy in accordance with the present invention as a speaker magnet.

FIG. 6 is a cross-sectional view of a first embodiment using the hard magnetic alloy in accordance with the present invention as a speaker magnet, wherein numeral 21 represents a pole piece composed of iron, numeral 22 is a cylindrical yoke which is provided at the exterior of the pole piece 21 at a distance, numerals 23 and 25 represent magnets composed of the hard magnetic alloy in accordance with the present invention and are provided at upper and lower portions of a gap between the pole pieces 21 and the yoke 22, and numeral 25 represents a vibrating cone. The magnets 23 and 24 have a ring shape. An audio coil not shown in the drawing is provided between the magnetic gap formed by these magnets 23 and 24, and is connected to the vibrating cone 25. The audio coil is vibrated by audio currents through an amplifier and causes the vibrational movement of the vibrating cone 25, generating sound.

The magnets 23 and 24 composed of the hard magnetic alloy in accordance with the present invention have temperature-dependent properties which are equal or superior to those of conventional ferrite magnets and Nd-Fe-B-based magnets, can prevent output drift due to a change in temperature, and thus can lead audio currents into the voice coil with high accuracy. Further, the speaker magnet in accordance with this embodiment is more inexpensive than conventional ferrite magnets and Nd-Fe-B-based magnets, and has more excellent hard magnetic characteristics than conventional ferrite magnets and Alnico magnets.

Figure 7:
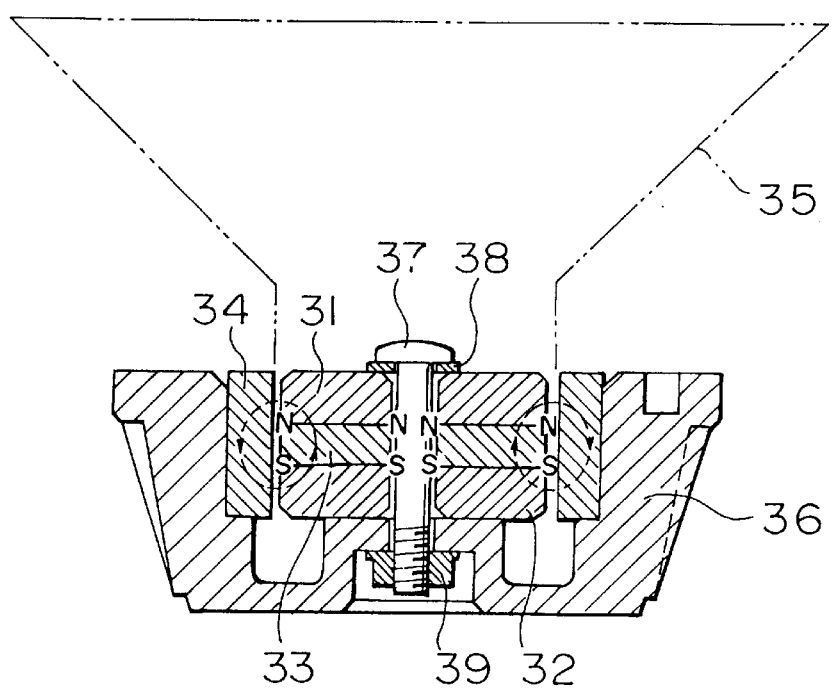
FIG. 7 is a cross-sectional view of a second embodiment using a hard magnetic alloy in accordance with the present invention as a speaker magnet.

FIG. 7 is a cross-sectional view of a second embodiment using the hard magnetic alloy in accordance with the present invention as the magnet for the speaker, wherein numerals 31 and 32 represent a pair of iron pole pieces which face in the vertical direction, numeral 33 represents a magnet composed of the hard magnetic alloy in accordance with the present invention and is provided between the pole pieces 31 and 32, numeral 34 represents a cylindrical yoke at the exterior of the pole pieces 31 and 32 and the magnet 33 with an interval, numeral 35 represents a vibrating cone, and numeral 36 represents a magnet-shielding cover. The magnet 33 has a ring shape. The pole pieces 31 and 32 and the magnet 33 are fixed to the magnet-shielding cover 36 with a bolt 37, washer 38 and nut 39. The speaker magnet 33 in the second embodiment composed of the hard magnetic alloy in accordance with the present invention has substantially the same advantages as the speaker magnet in the first embodiment.

Examples of preferred compositions of the hard magnetic alloy in accordance with the present invention include $Fe_{88}Pr_7B_5$, $Fe_{86}Nb_2Pr_7B_5$, $Fe_{86}Nd_7Zr_2B_5$, $Fe_{86}Nd_9B_5$, $Fe_{84}Pr_{11}B_5$, $Fe_{88}Nb_2Pr_5B_5$, $Fe_{88}Nb_2Nd_5B_5$, $Fe_{86}Nb_2Nd_7B_5$, $Fe_{89}Nb_2Pr_4B_5$, $Fe_{89}Nb_2Nd_4B_5$, $Fe_{89}Nb_2Pr_4B_5$, $Fe_{90}Nb_2Nd_5B_3$, $Fe_{90}Nb_2Pr_5B_3$, $Fe_{89}Nb_2Nd_5B_4$, $Fe_{89}Nb_2Pr_5B_4$, $Fe_{84}Nb_2Pr_7B_5Si_2$, $Fe_{76}Co_{10}Nb_2Pr_7B_5$, and $Fe_{66}Co_{20}Nb_2Pr_7B_5$. These alloys can form a rigid compact by annealing, and the formed fine crystalline phase contains a bcc-Fe phase and an $R_2Fe_{14}B$ phase. As a result, the alloys function as permanent magnets having excellent hard magnetic characteristics.

EXAMPLES

Example 1

Hard magnetic alloys were produced by annealing quenched alloy ribbons having various compositions.

Ingots were produced by an arc melting process, and the melted ingots were sprayed onto a copper roll rotating in an Ar atmosphere through a slit nozzle with a slit width of approximately 0.3 mm to prepare quenched alloy ribbons with a width of approximately 20 μm.

Figure 8:
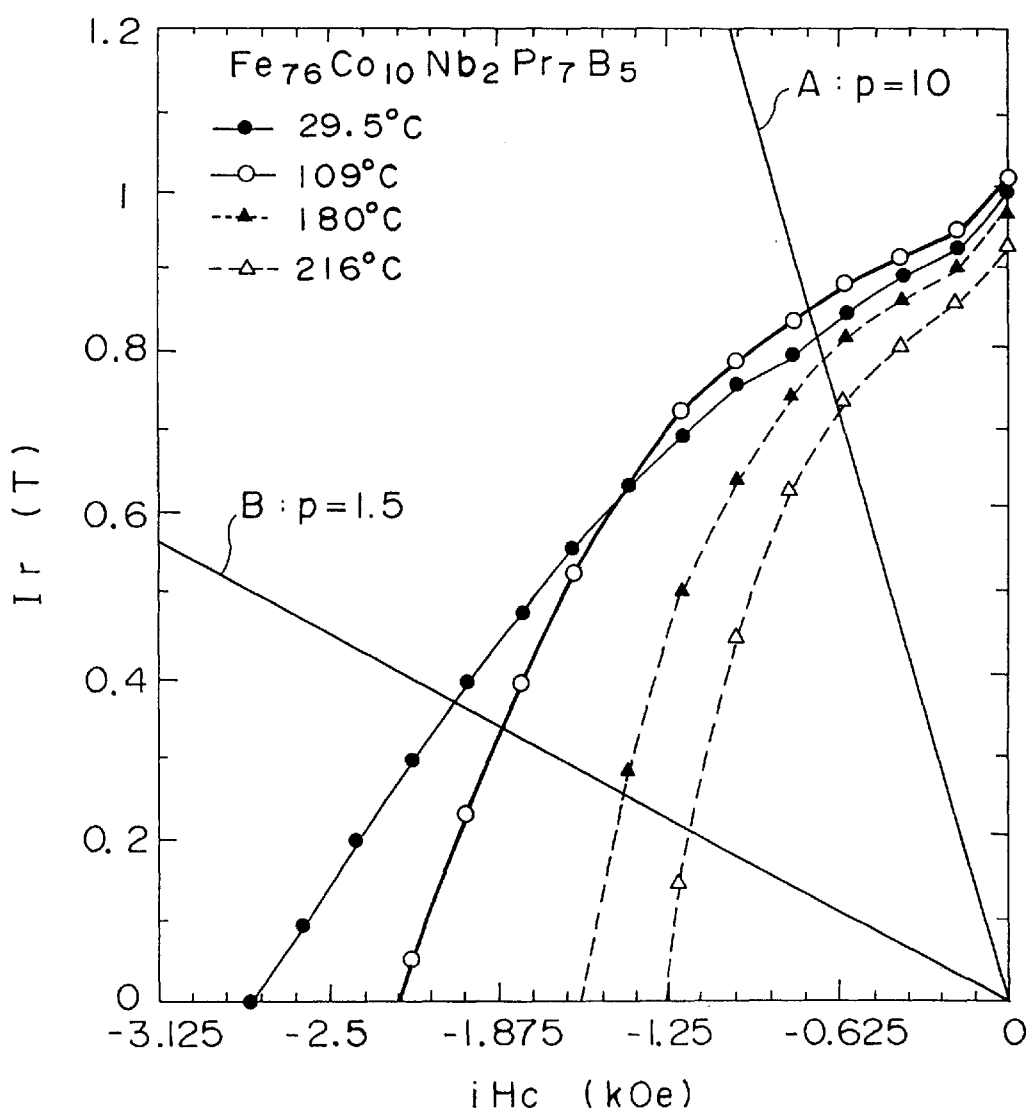
FIG. 8 is a graph of demagnetizing curves in the second quadrant of an alloy ribbon having a composition of $Fe_{76}Co_{10}Nb_2Pr_7B_5$ at 29.5° C. to 216° C.
Figure 9:
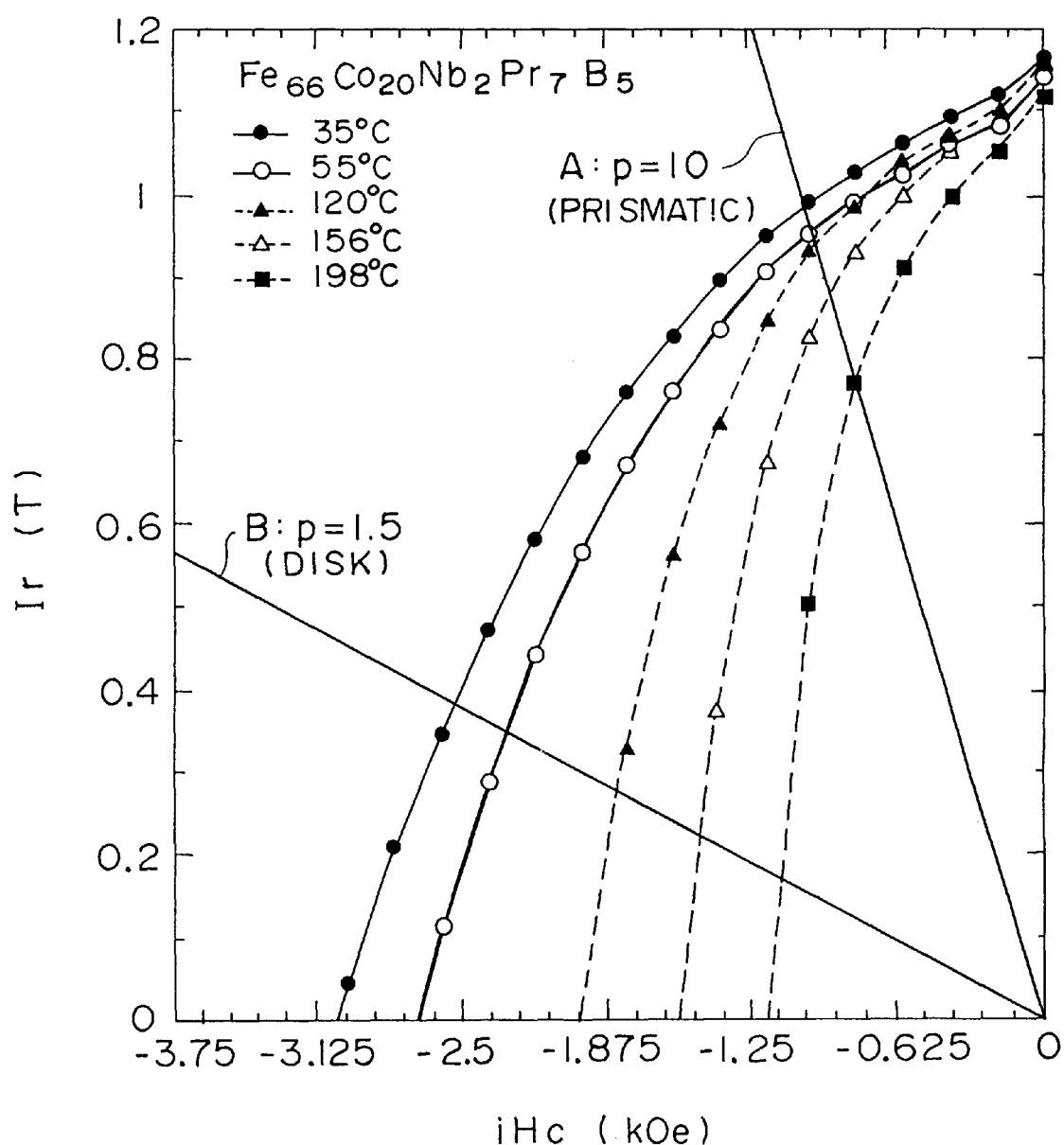
FIG. 9 is a graph of demagnetizing curves in the second quadrant of an alloy ribbon having a composition of $Fe_{66}Co_{20}Nb_2Pr_7B_5$ at 35° C. to 198° C.
Figure 10:
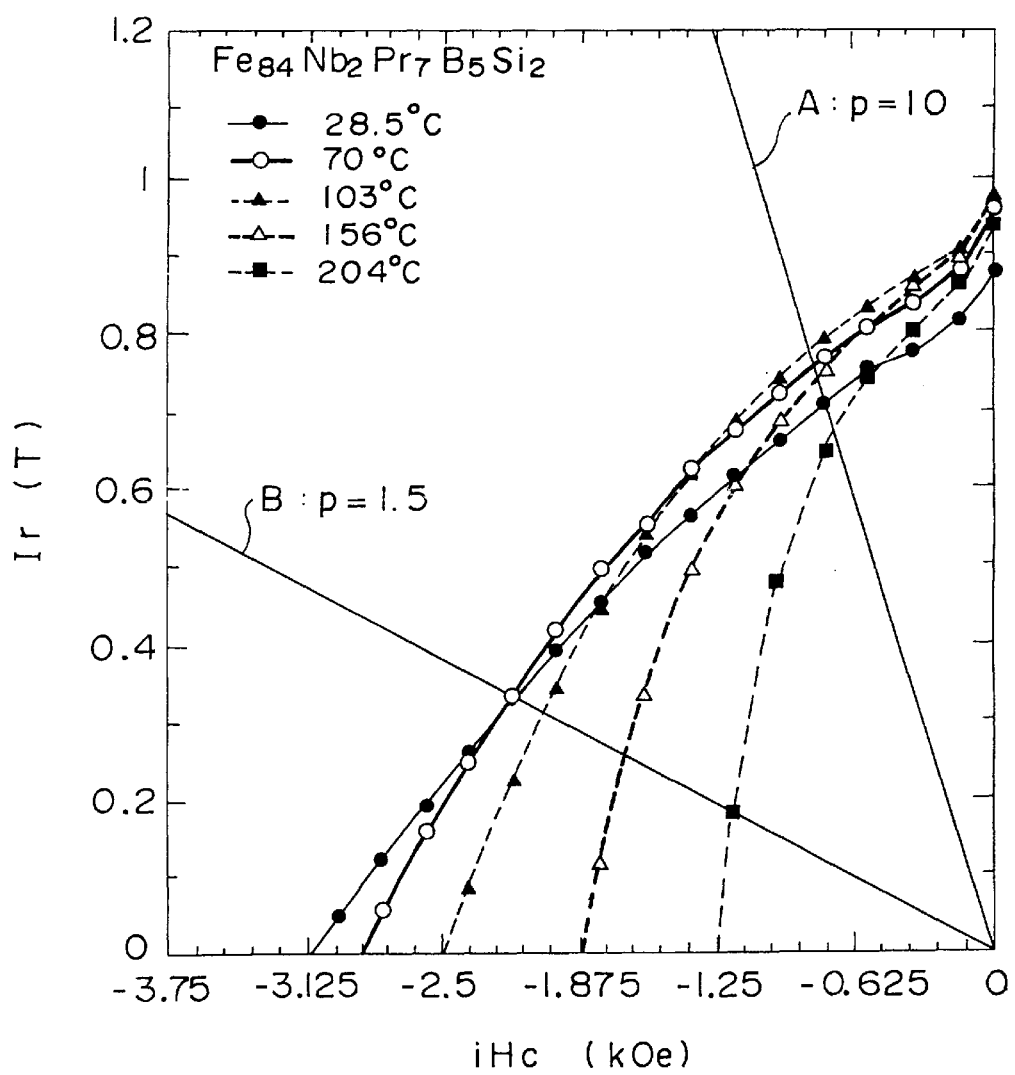
FIG. 10 is a graph of demagnetizing curves in the second quadrant of an alloy ribbon having a composition of $Fe_{84}Nb_2Pr_7B_5Si_2$ at 28.5° C. to 204° C.
Figure 11:
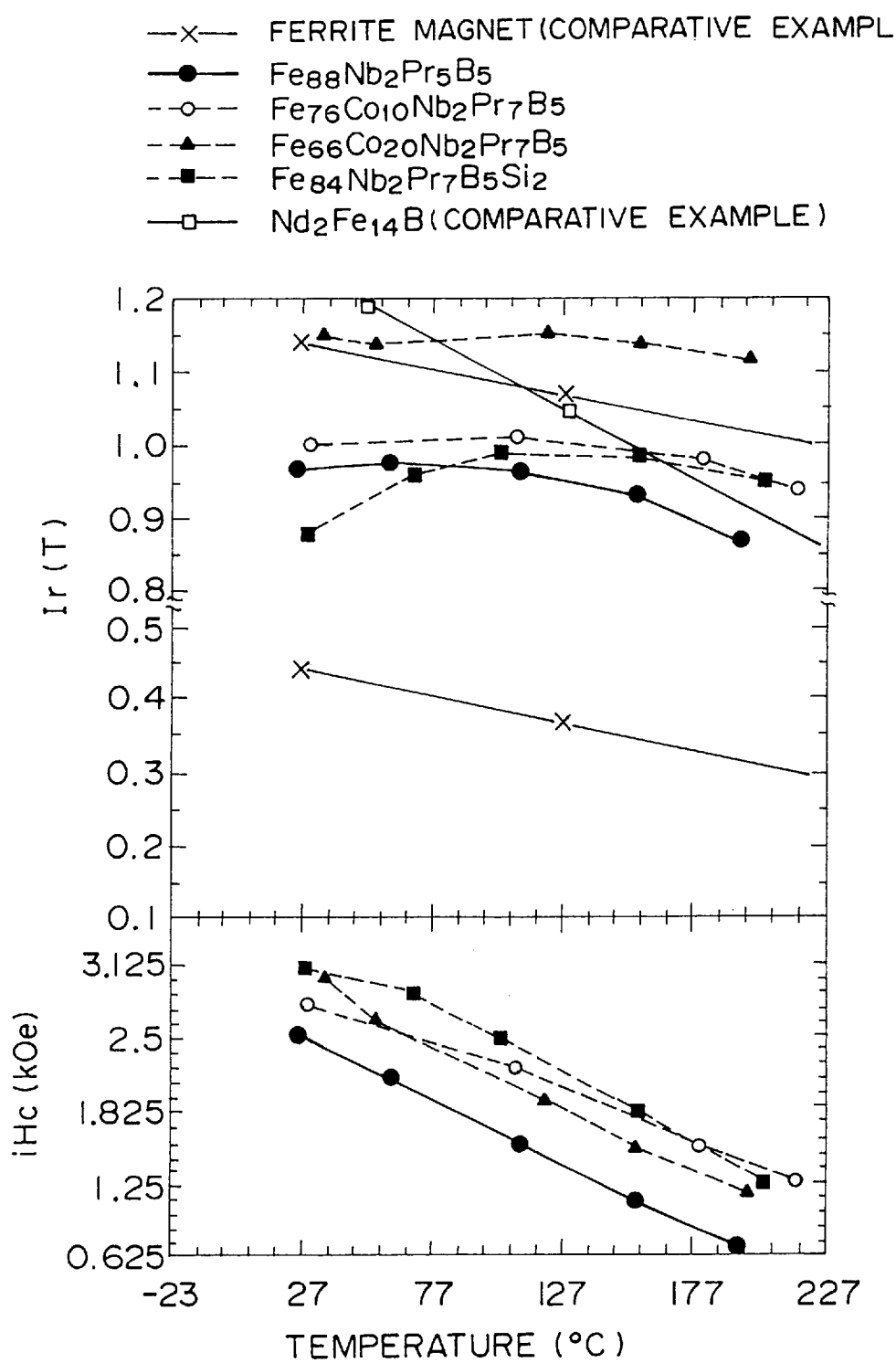
FIG. 11 is a graph illustrating the relationship between the magnetic characteristics and the temperature of alloy ribbons in accordance with the present invention and of a magnet of a comparative example.

The resulting alloy ribbons were heated in an infrared image furnace of $1 \times 10^{-2}$ Pa or less at a heating rate of 180° C./min. and annealed at an annealing temperature of 750° C. for 180 seconds to prepare annealed alloy ribbons of Example 1 in accordance with the present invention. The compositions of these alloy ribbons were $Fe_{76}Co_{10}Nb_2Pr_7B_5$, $Fe_{66}Co_{20}Nb_2Pr_7B_5$, and $Fe_{84}Nb_2Pr_7B_5Si_2$, respectively. FIGS. 8 to 10 are graphs of demagnetization curves in the second quadrant of the resulting alloy ribbons which were determined with a vibrating sample magnetometer (VSM) in an applied magnetic field of 10 kOe in a vacuum at room temperature to approximately 217° C. In FIGS. 8 to 10, line A represents a permeance factor p of 10 corresponding to a prismatic shape, and line B represents a permeance factor p of 1.5 corresponding to a disk shape. FIG. 11 is a graph illustrating changes in the remanent magnetization Ir and the coercive force iHc with temperature of the alloy ribbons which are determined by the demagnetization curves in the second quadrant. Table 1 shows magnetic characteristics of these alloy ribbons at room temperature. In Table 1, Ir/Is represents the ratio of the remanent magnetization Ir to the remanence magnetization Is, that is a remanence ratio. Table 2 shows the temperature coefficients of Ir and iHc of each alloy ribbon at a temperature of room temperature to 217° C., and the temperature coefficients of Ir when the alloy has shapes causing p=1.5 and p=10.

TABLE 1

Magnetic Characteristics (Room Temperature)

| Composition of hard magnetic material | Is (emu · g$^{-1}$) | Ir (emu · g$^{-1}$) | iHc (kOe) | Ir/Is |
|---|---|---|---|---|
| $Fe_{76}Co_{10}Nb_2Pr_7B_5$ | 147.2 | 114.8 | 3.1 | 0.78 |
| $Fe_{66}Co_{20}Nb_2Pr_7B_5$ | 156.3 | 127.1 | 3.11 | 0.81 |
| $Fe_{86}Nb_2Pr_7B_5Si_2$ | 139.3 | 105.2 | 3.62 | 0.75 |

TABLE 2

Temperature Coefficients of Ir and iHc
(Room temperature to Ca. 217° C.)

| | Composition of hard magnetic material | dIr/dT (%/°C) | diHc/dT (%/°C) | dI/dT(%/°C) at P = 1.5 | dI/dT(%/°C) at P = 10 |
|---|---|---|---|---|---|
| Example | $Fe_{88}Nb_2Pr_5B_5$ | −0.06 | −0.43 | −0.38 | −0.12 |
| | $Fe_{76}Co_{10}Nb_2Pr_7B_5$ | −0.02 | −0.28 | −0.20 | −0.10 |
| | $Fe_{66}Co_{20}Nb_2Pr_7B_5$ | −0.02 | −0.36 | −0.33 | −0.08 |
| | $Fe_{84}Nb_2Pr_7B_5Si_2$ | −0.02 | −0.32 | −0.17 | −0.05 |
| Comparative Example | $Fe_{77}Nd_{15}B_8$ | −0.16 | −0.4 | — | — |
| | $(Fe_{0.9}Co_{0.1})_{77}Nd_{15}B_8$ | −0.11 | −0.35 | — | — |
| | Ferrite magnet | −0.18 | — | — | — |

Relationships between the magnetic characteristics and the temperature of a conventional ferrite magnet and a conventional Nd-Fe-B-based ($Nd_2Fe_{14}B$) magnet are also shown as Comparative Examples. The temperature coefficients of Ir and iHc of these conventional magnets are also shown in Table 2.

The results shown in FIG. 11 and Table 2 demonstrate that the alloy ribbons in accordance with the present invention and the magnets of the comparative examples have a trend towards decreasing Ir and iHc with increased temperature. The temperature coefficient of iHc (diHc/dt) of the alloy ribbon of the Example having a composition of $Fe_{88}Nb_2Pr_5B_5$ is −0.43%/° C. which is very near that of the Nd-Fe-B-based magnet of the Comparative Example, that is, 0.4%/° C. The temperature coefficients of the alloy ribbons of the Example containing Co or Si, that is −0.28 to −0.36%/° C. are smaller than that of the Nd-Fe-B-based magnet. Such a decrease in the temperature coefficient of iHc by the addition of Co is probably due to an increase in the Curie temperature of the hard magnetic phase.

The temperature coefficient of Ir (dIr/dT) of the alloy ribbon of the Example having a composition of $Fe_{88}Nb_2Pr_5B_5$ is −0.06%/° C., which is low er than −0.11 to −0.16%/° C. of the Nd-Fe-B-based magnets of Comparative Examples having compositions of $Fe_{77}Nd_5B_5$ and $(Fe_{0.9}Co_{0.1})_{77}Nd_{15}B_8$, respectively. These results are probably due to the following reasons; the alloy ribbon of the Example have a nano-composite texture composed of a hard magnetic phase and a soft magnetic (bcc-Fe) phase having a small temperature coefficient of magnetization, whereas the magnets of the Comparative Examples have only the hard magnetic phase. The alloy ribbons containing Co or Si of the Example have a significantly low temperature coefficient of Ir, −0.02%/° C. FIG. 9 shows that the alloy ribbon having a composition of $Fe_{66}Co_{20}Nb_2Pr_7B_5$ has a particularly small change in magnetization with temperature at a region of p=10 or more.

Figure 12:
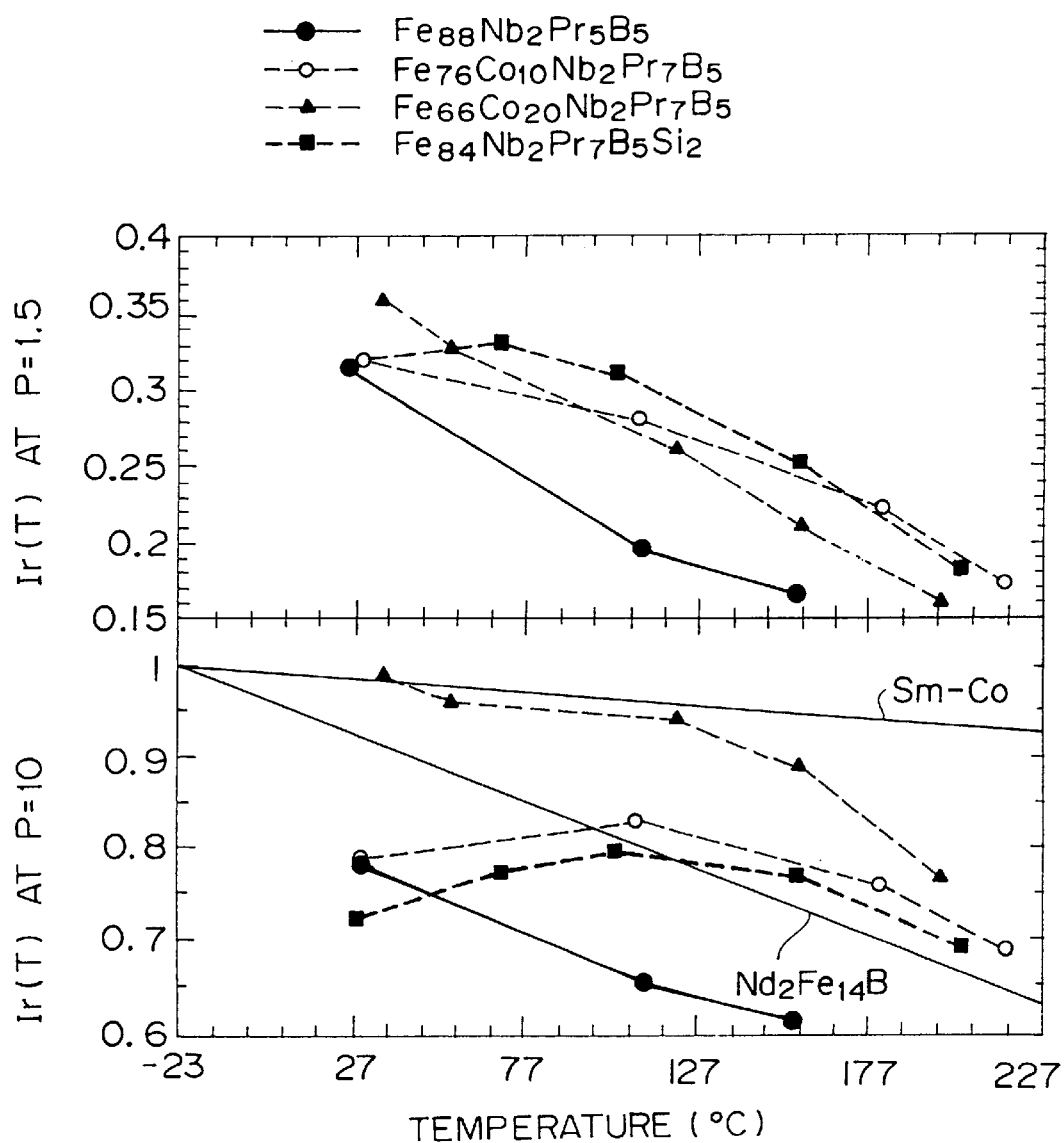
FIG. 12 is a graph illustrating the dependence of Ir on temperature when an alloy ribbon in accordance with the present invention and a magnet of a comparative example are used at a shape causing p=1.5 or P=10.

FIG. 12 is a graph of Ir of the alloy ribbons of the Example having a shape causing p=1.5 or p=10 at various temperatures, wherein the Ir value is determined from the demagnetization curves shown in FIGS. 8 to 10. FIG. 12 also shows the Ir values of a conventional Sm-Co-based magnet and a conventional Nd-Fe-B-based magnet having a composition of $Nd_2Fe_{14}B$ for comparison, wherein these magnets are used in a shape causing P=1.5 or P=10.

Figure 13:
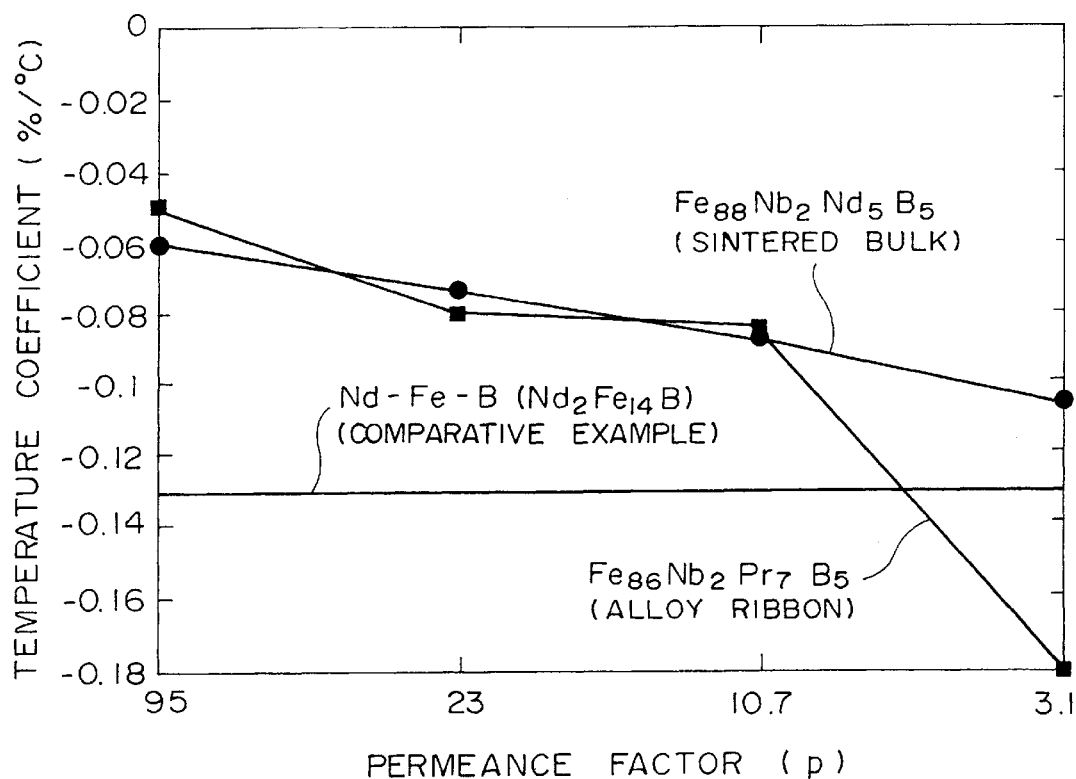
FIG. 13 is a graph of the relationship between the permeance factor and the temperature of a sintered alloy compact having a composition in accordance with the present invention, of a ribbon alloy having a composition in accordance with the present invention, and of a conventional Nd-Fe-B-based magnet.

FIG. 13 is a graph illustrating the relationship between the permeance factor and the temperature coefficient of the sintered bulk or alloy compact having a composition of $Fe_{88}Nb_2Nd_5B_5$ and an alloy ribbon having a composition of $Fe_{86}Nb_2Pr_7B_5$ in accordance with the present invention, as well as a conventional Nd-Fe-B-based magnet for comparison having a composition of $Nd_2Fe_{14}B$.

Table 2 and FIGS. 11 to 13 demonstrate that, at a low permeance factor, that is, p=1.5, the temperature coefficient of the $Fe_{84}Nb_2Pr_7B_5Si_2$ alloy ribbon containing Si is 0.17%/° C., the temperature coefficients of the $Fe_{76}Co_{10}Nb_2Pr_7B_5$ and $Fe_{66}Co_{20}Nb_2Pr_7B_5$ alloy ribbons containing Co, are −0.20%/° C. and −0.33%/° C., respectively, and the temperature coefficient of the $Fe_{88}Nb_2Pr_5B_5$ alloy ribbon is −0.38%/° C. Accordingly, alloy ribbons of the Example have relatively high temperature coefficients which are similar to that of the Comparative Example at the low permeance. At a high permeance of p=10, the temperature coefficient of the $Fe_{88}Nb_2Nd_5B_5$ alloy is −0.12%/° C., and is similar to that of the conventional Nd-Fe-B-based magnet. The $Fe_{84}Nb_2Pr_7B_5Si_2$ alloy containing Si and the $Fe_{66}Co_{20}Nb_2Pr_7B_5$ alloy containing Co have smaller changes in magnetic characteristics, that is, temperature coefficients of −0.05%/° C. and −0.08%/° C., respectively. The alloy ribbons of the Example, and particularly the $Fe_{66}Co_{20}Nb_2Pr_7B_5$ alloy ribbon has a small absolute value of the temperature coefficient within a practical temperature range of 27° C. to 157° C. when they are used as a shape causing p=10, which is similar to that of the Sm-Co-based magnet and smaller than that of the $Nd_2Fe_{14}B$ magnet of the Comparative Example.

Accordingly, the results shown in Table 2 and FIG. 11 to 13 demonstrate that each alloy of the Example has an absolute value of the temperature coefficient which is similar to or smaller than that of the $Nd_2Fe_{14}B$ magnet of the Comparative Example when they are used at a permeance factor of 2 or more, and is smaller than 0.1%/° C. and that of the $Nd_2Fe_{14}B$ magnet of the Comparative Example when they are used at a permeance factor of 10 or more.

Example 2

Figure 14:
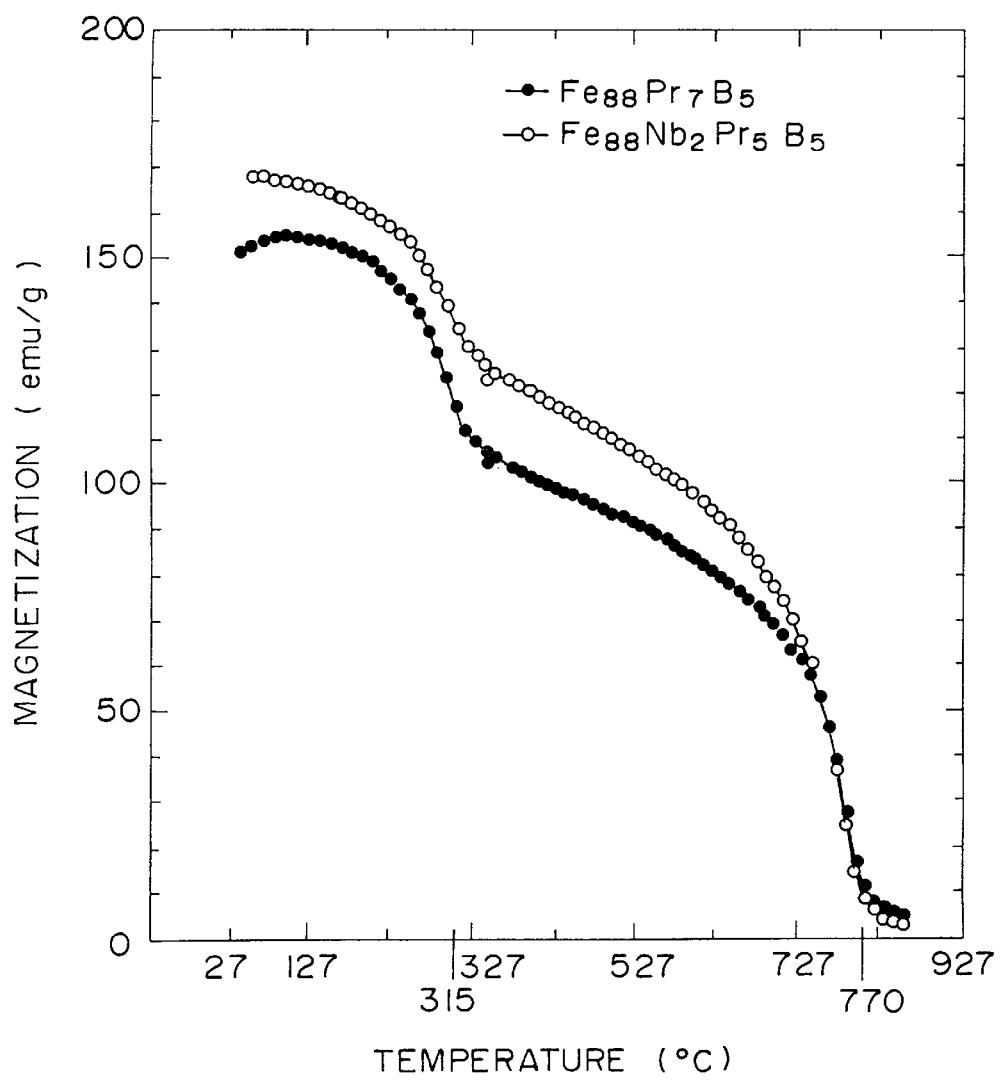
FIG. 14 is a graph illustrating the dependence of magnetization on temperature of two hard magnetic alloys having compositions of $Fe_{88}Nb_2Pr_5B_5$ and $Fe_{88}Pr_7B_5$, respectively.

A quenched amorphous alloy ribbon having a composition of $Fe_{88}Nb_2Pr_5B_5$ was annealed at an annealing temperature of 750° C. and the change in magnetization with temperature of the hard magnetic alloy was measured. Also, a quenched amorphous alloy ribbon having a composition of $Fe_{88}Pr_7B_5$ was annealed at an annealing temperature of 650° C. and the change in magnetization with temperature of the hard magnetic alloy was measured. These results are shown in FIG. 14. As shown in FIG. 14, each curve of magnetization decreasing with temperature has two steps, this demonstrates that two phases participate in magnetization of the hard magnetic alloy. The step near 315° C. indicates the Curie temperature of the $Nd_2Fe_{14}B$ phase, and the step near 770° C. indicates the Curie temperature of the bcc-Fe phase. No magnetization step due to an amorphous phase is found in the graph in FIG. 14, probably due to low magnetization and low volume fraction of the amorphous phase.

Figure 15:
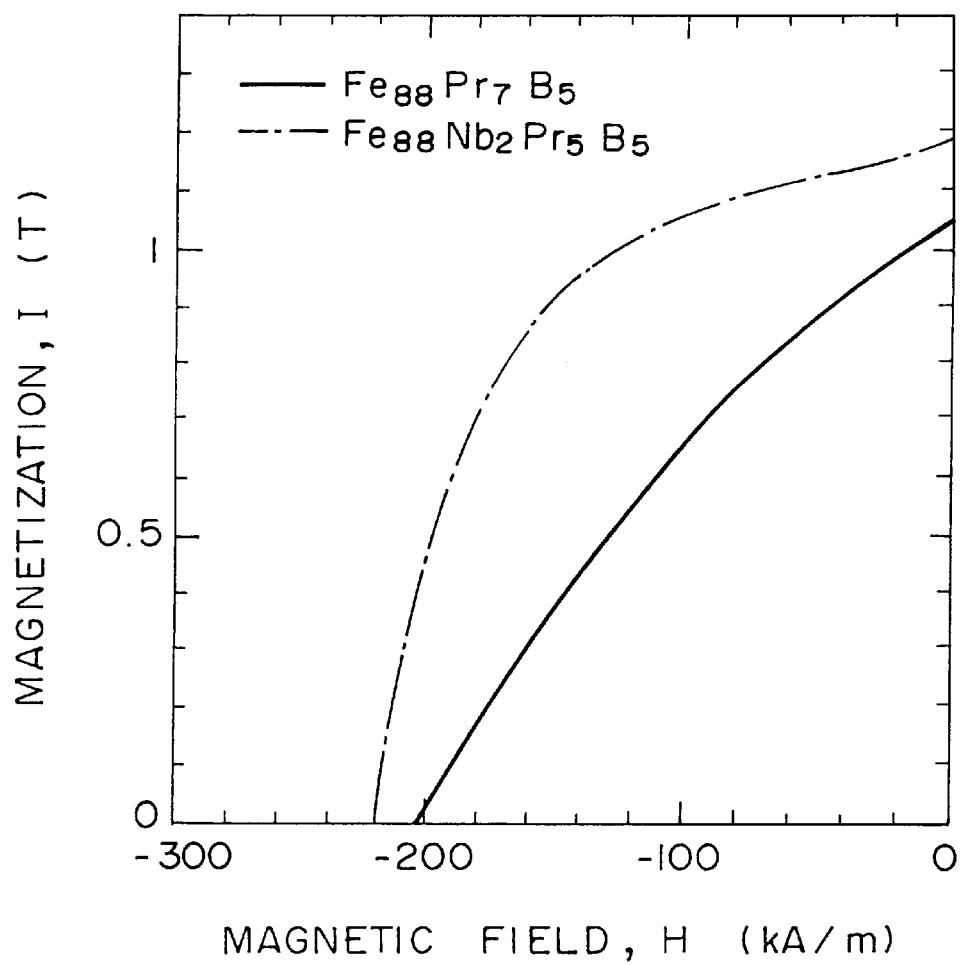
FIG. 15 is a graph of demagnetizing curves in the second quadrant of hard magnetic alloys having compositions of $Fe_{88}Nb_2Pr_5B_5$ and $Fe_{88}Pr_7B_5$.

The magnetization curves in the second quadrant of the $Fe_{88}Nb_2Pr_5B_5$ and $Fe_{88}Pr_7B_5$ hard magnetic alloys are shown in FIG. 15. The magnetization curves in FIG. 15 have no steps, that are observed in a magnetic material composed of a single phase. Accordingly, an exchange-coupled magnet, in which a fine soft or semi-hard magnetic phase and a hard magnetic phase is magnetically coupled, is obtained.

Example 3

Hard magnetic alloys were produced at various heating rates in the annealing step of quenched alloy ribbons having various compositions.

Ingots were produced by an arc melting process, and the melted ingots were sprayed onto a copper roll rotating in an Ar atmosphere through a slit nozzle with a slit width of approximately 0.3 mm to prepare quenched alloy ribbons with a thickness of approximately 20 $\mu$m.

The resulting alloy ribbons were heated in an infrared image furnace of $1 \times 10^{-2}$ Pa or less at a heating rate of 3 to 216° C./min. and annealed at an annealing temperature of 700° C. to 750° C. for approximately 180 seconds to prepare annealed alloy ribbons of Example 3 to observe the dependence of magnetic characteristics and nano-crystalline structures. The compositions of these alloy ribbons were $Fe_{88}Nb_2Pr_5B_5$ and $Fe_{88}Nb_2Nd_5B_5$, respectively. The results are shown in Tables 3 to 6, wherein Ir/Is represents the ratio of the remanent magnetization to the saturation magnetization. The magnetic characteristics of the alloy ribbons were determined with a vibrating sample magnetometer (VSM) in an applied magnetic field of 15 kOe at room temperature. In some alloys, the magnetization is not saturated at an applied magnetic field of 15 kOe, however, this is regarded as a saturated magnetization in the following description. In analysis of the nano-crystalline structure, the lattice constant and average crystal grain size of the bcc-Fe phase were calculated from the results of diffraction angles and half-width values of the X-ray diffraction peaks using the Sheller's equation, respectively.

TABLE 3

$Fe_{88}Nb_2Pr_5B_5$ (700° C.)

| Sample No. | Heating rate (° C./min.) | Residual magnetization (T) | Ir/Is | Coercive force kOe | Maximum magnetic energy product (kJ/m³) | Lattice constant (nm) | Average crystal grain size (nm) |
|---|---|---|---|---|---|---|---|
| 1(Example) | 180 | 1.36 | 0.77 | 2.17 | 85 | 0.2871 | 35 |
| 2(Example) | 102 | 1.45 | 0.82 | 1.79 | 74 | 0.2872 | 36 |
| 3(Example) | 36 | 1.38 | 0.78 | 2.33 | 82 | 0.28695 | 43 |
| 4(Example) | 18 | 1.39 | 0.78 | 1.90 | 67 | 0.28719 | 46 |
| 5(Comparative Example) | 6 | 1.33 | 0.76 | 1.99 | 59 | 0.28731 | 48 |
| 6(Comparative Example) | 3 | 1.28 | 0.73 | 1.88 | 55 | — | — |

TABLE 4

$Fe_{88}Nb_2Pr_5B_5$ (750° C.)

| Sample No. | Heating rate (° C./min.) | Residual magnetization (T) | Ir/Is | Coercive force kOe | Maximum magnetic energy product (kJ/m³) | Lattice constant (nm) | Average crystal grain size (nm) |
|---|---|---|---|---|---|---|---|
| 7(Example) | 180 | 1.37 | 0.76 | 2.44 | 81 | 0.28727 | 35.2 |
| 8(Example) | 102 | 1.28 | 0.74 | 1.91 | 52 | 0.28727 | 34.7 |
| 9(Example) | 36 | 1.33 | 0.74 | 2.43 | 75 | 0.28707 | 37.2 |
| 10(Example) | 18 | 1.26 | 0.70 | 1.64 | 37 | 0.28714 | 45.6 |
| 11(Comparative Example) | 6 | 1.15 | 0.64 | 1.32 | 23 | 0.28711 | 46 |
| 12(Comparative Example) | 3 | 1.11 | 0.62 | 1.26 | 21 | — | — |

TABLE 5

$Fe_{88}Nb_2Nd_5B_5$ (700° C.)

| Sample No. | Heating rate (° C./min.) | Residual magnetization (T) | Ir/Is | Coercive force kOe | Maximum magnetic energy product (kJ/m³) | Lattice constant (nm) | Average crystal grain size (nm) |
|---|---|---|---|---|---|---|---|
| 13(Example) | 180 | 1.23 | 0.75 | 1.86 | 74 | 0.2871 | 27 |
| 14(Example) | 102 | 1.34 | 0.81 | 1.90 | 81 | 0.28682 | 26 |
| 15(Example) | 36 | 1.32 | 0.79 | 1.85 | 75 | 0.28705 | 33 |
| 16(Example) | 18 | 1.17 | 0.70 | 1.54 | 39 | 0.28719 | 42 |
| 17(Comparative Example) | 6 | 1.22 | 0.73 | 2.00 | 63 | 0.2875 | 37 |
| 18(Comparative Example) | 3 | 1.05 | 0.69 | 1.82 | 23 | — | — |

TABLE 6

$Fe_{88}Nb_2Nd_5B_5$ (750° C.)

| Sample No. | Heating rate (° C./min.) | Residual magnetization (T) | Ir/Is | Coercive force kOe | Maximum magnetic energy product (kJ/m³) | Lattice constant (nm) | Average crystal grain size (nm) |
|---|---|---|---|---|---|---|---|
| 19(Example) | 180 | 1.5 | 0.81 | 2.46 | 119 | 0.2873 | 28.9 |
| 20(Example) | 102 | 1.48 | 0.80 | 2.37 | 102 | 0.28714 | 32.4 |
| 21(Example) | 36 | 1.32 | 0.71 | 2.05 | 54 | 0.28714 | 37.4 |
| 22(Example) | 18 | 1.36 | 0.73 | 2.21 | 83 | 0.28715 | 29.5 |
| 23(Comparative Example) | 6 | 1.35 | 0.72 | 2.16 | 53 | 0.2873 | 35.1 |
| 24(Comparative Example) | 3 | 1.31 | 0.70 | 2.01 | 39 | — | — |

Figure 16:
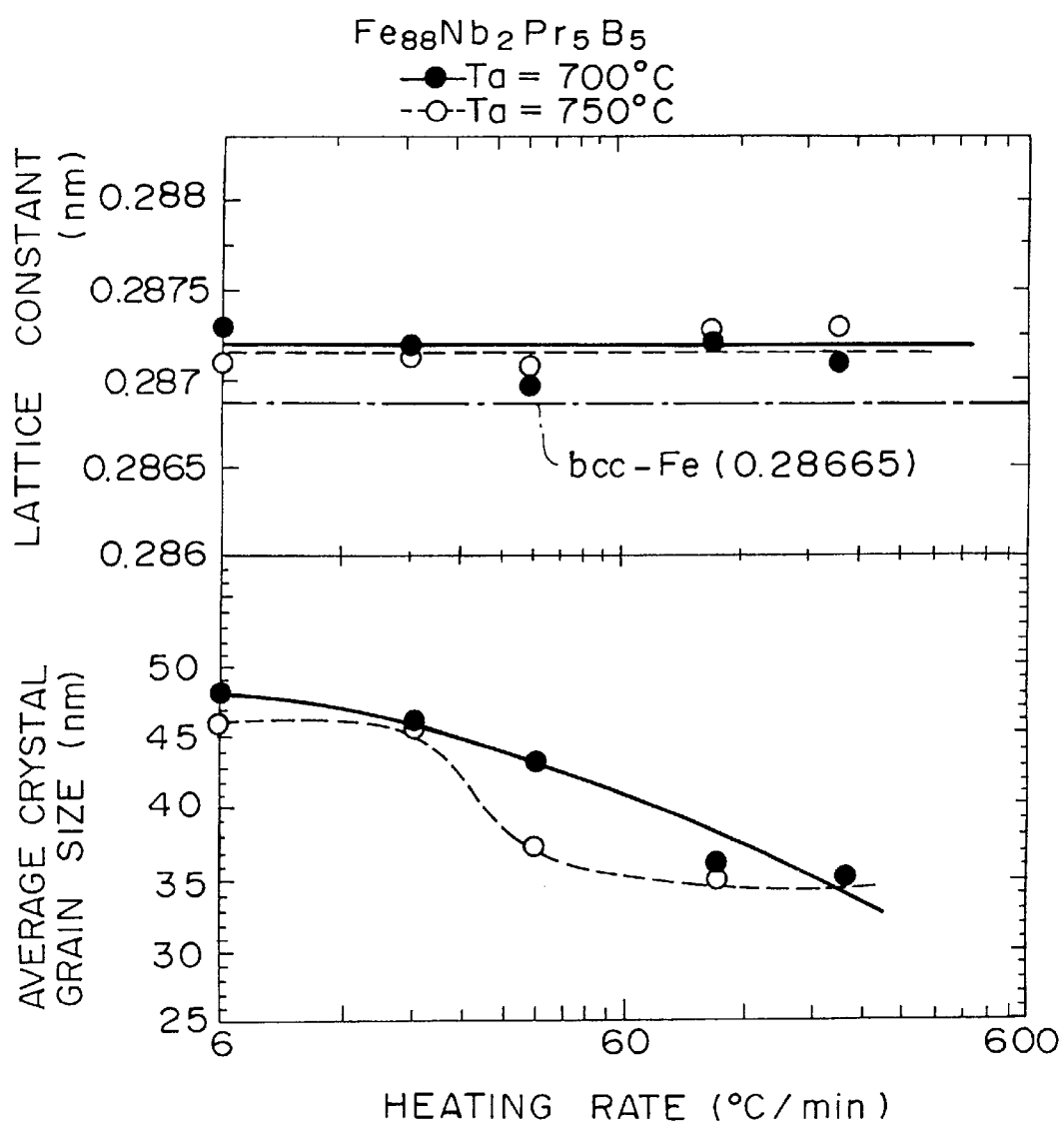
FIG. 16 is a graph illustrating the dependence of the lattice constant and average crystal grain size on the heating rate of the bcc-Fe phase in an $Fe_{88}Nb_2Pr_5B_5$ alloy annealed at 700° C. to 750° C.
Figure 17:
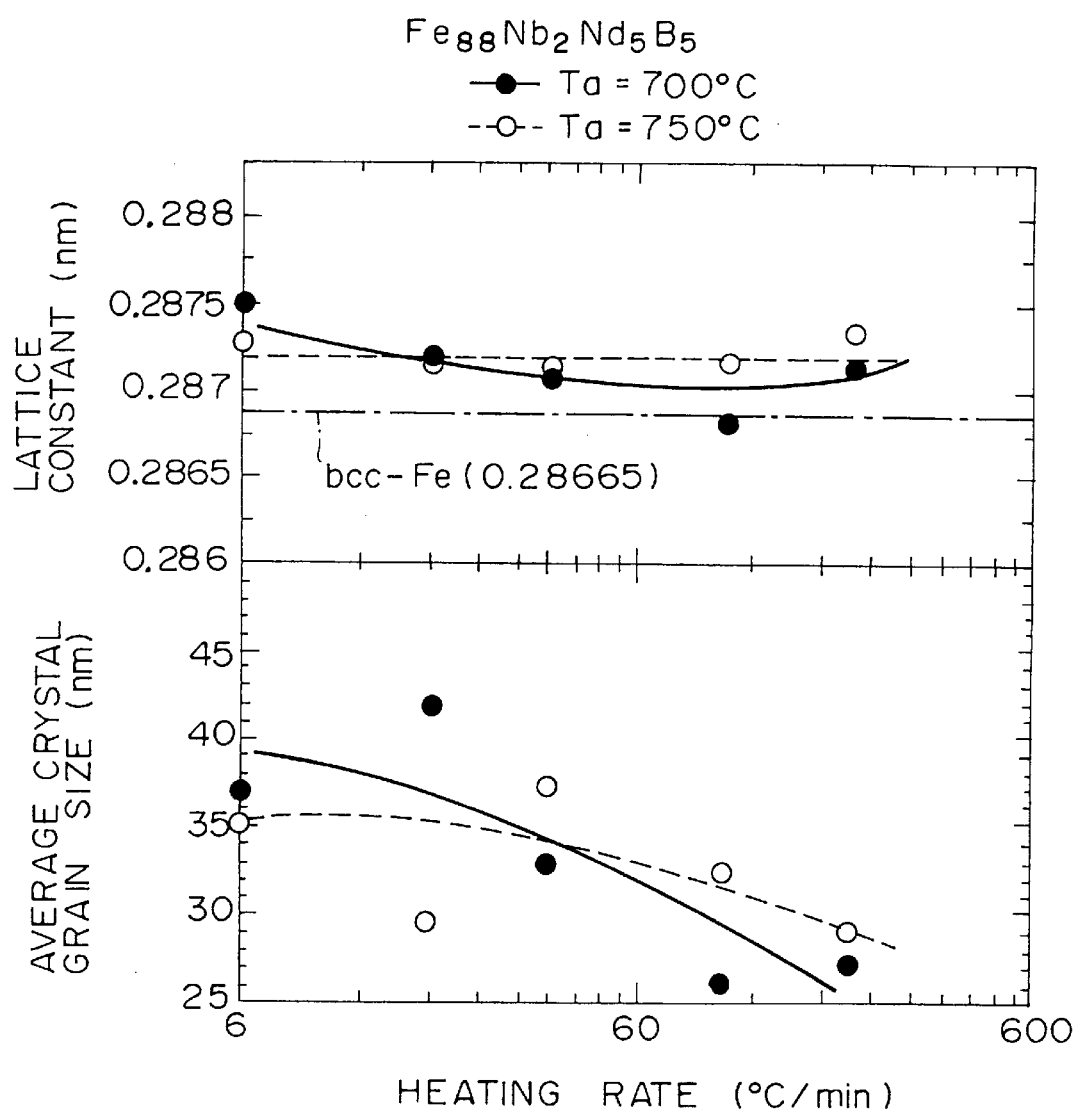
FIG. 17 is a graph illustrating the dependence of the lattice constant and average crystal grain size on the heating rate of the bcc-Fe phase in an $Fe_{88}Nb_2Nd_5B_5$ alloy annealed at 700° C. to 750° C.
Figure 18:
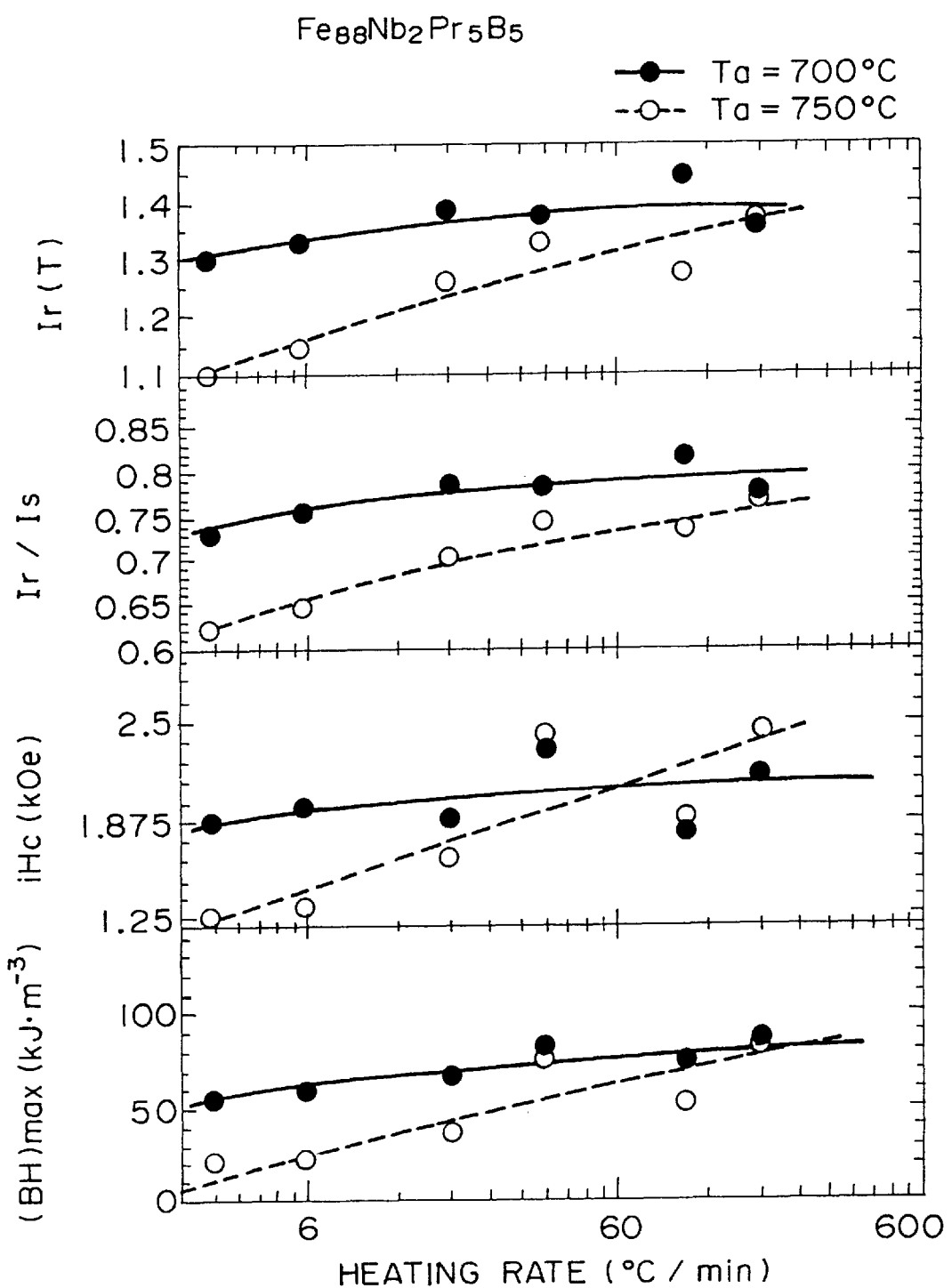
FIG. 18 is a graph illustrating the dependence of the magnetic characteristics on the heating rate in an $Fe_{88}Nb_2Pr_5B_5$ alloy which is annealed at 700° C. to 750° C. for 5 minutes and cooled at a cooling rate which is the same as the heating rate.
Figure 19:
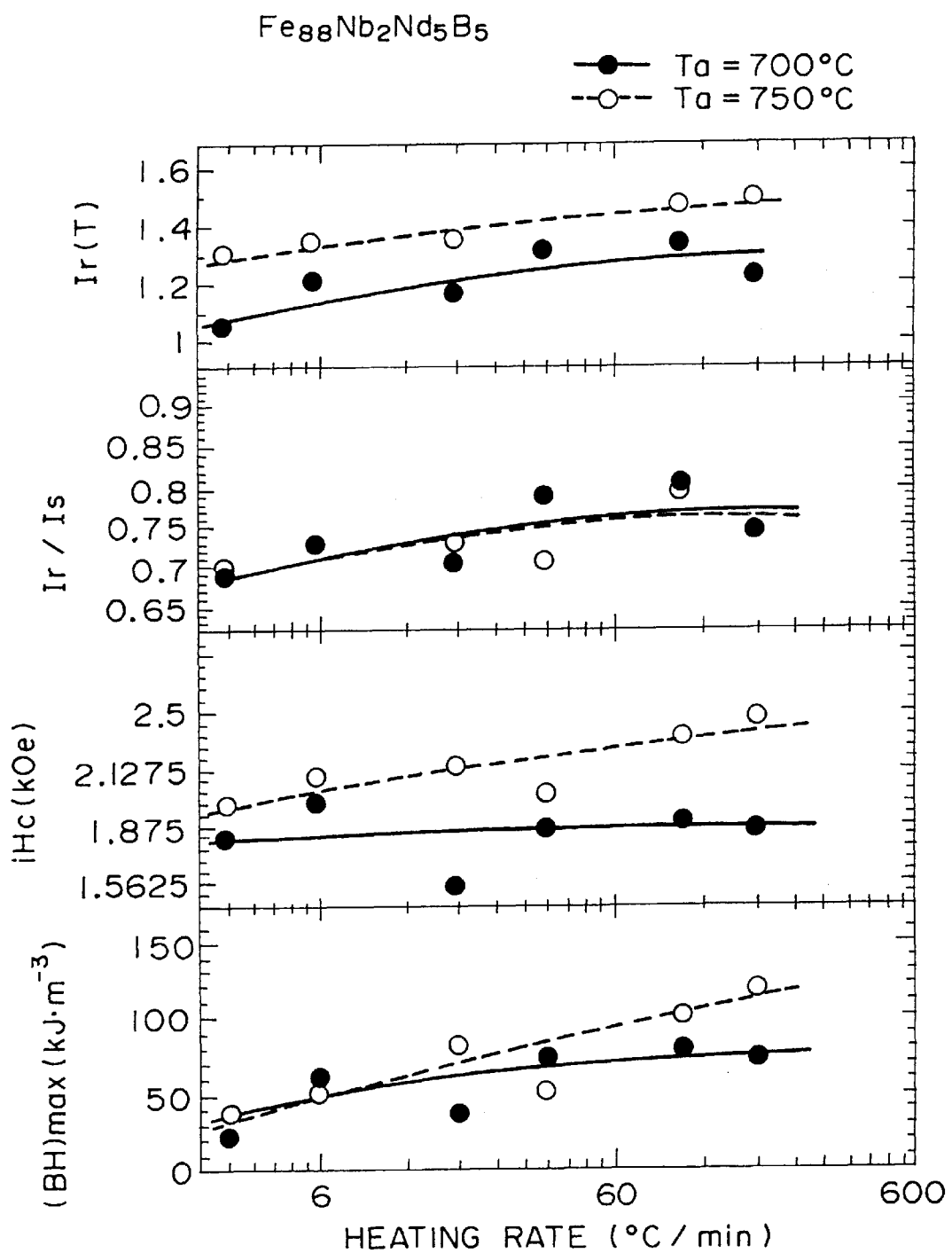
FIG. 19 is a graph illustrating dependence of the magnetic characteristics on the heating rate in an $Fe_{88}Nb_2Nd_5B_5$ alloy which is annealed at 700° C. to 750° C. for 5 minutes and cooled at a cooling rate which is the same as the heating rate.
Figure 20:
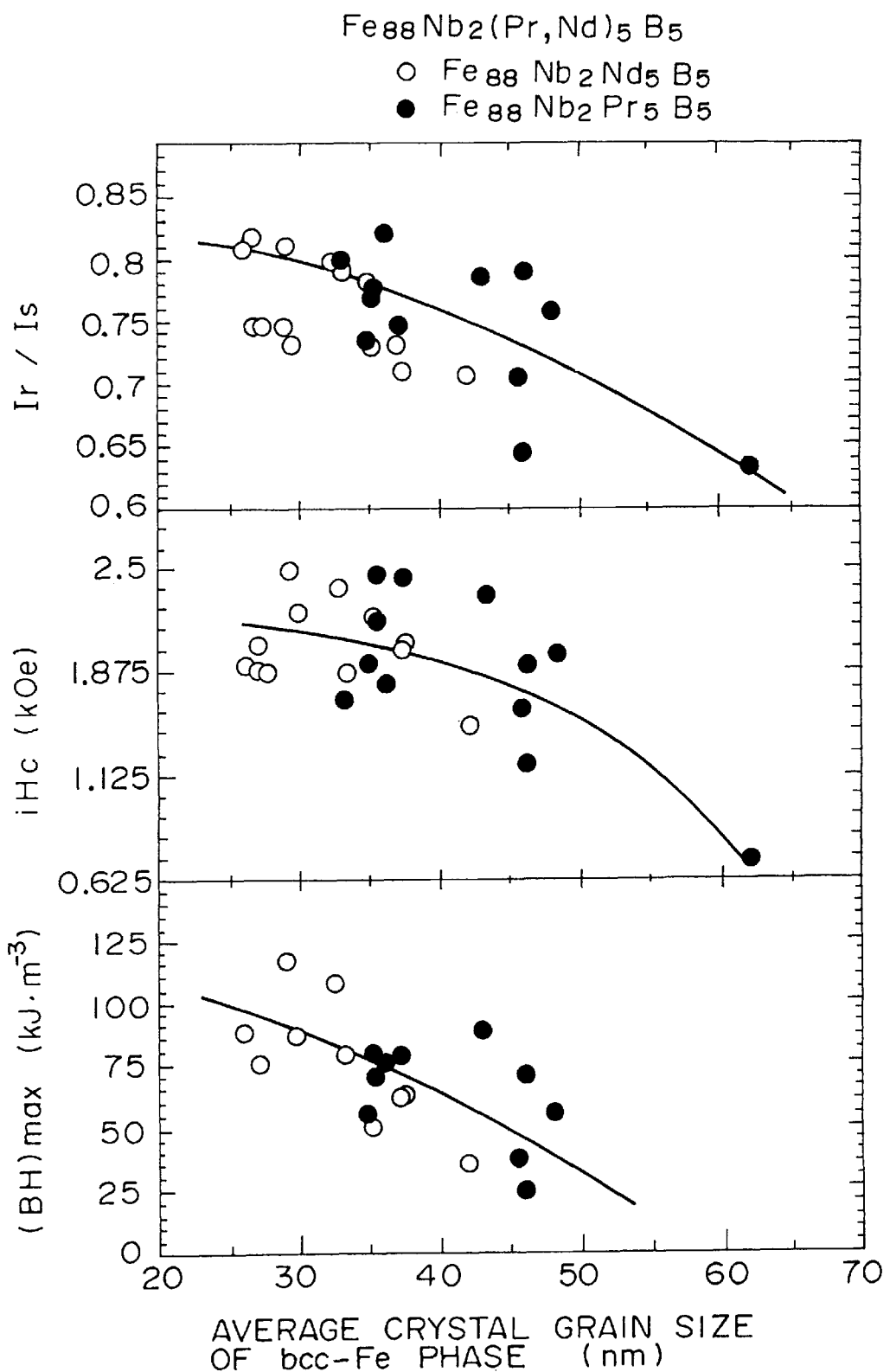
FIG. 20 is a graph illustrating the dependence of the magnetic characteristics on the average crystal grain size of the bcc-Fe phase in $Fe_{88}Nb_2(Pr,Nd)_5B_5$ alloys.

FIGS. 16 and 17 are graphs illustrating the dependence of the lattice constant and average crystal grain size on temperature of the bcc-Fe phase of each of the alloys having the compositions of $Fe_{88}Nb_2Pr_5B_5$ and $Fe_{88}Nb_2Nd_5B_5$ after annealing at 700° C. to 750° C. FIGS. 18 and 19 are graphs illustrating the dependence of the remanent magnetization Ir, remanence ratio Ir/Is, coercive force iHc, and maximum magnetic energy product $(BH)_{max}$ on temperature of each of the alloys having the compositions of $Fe_{88}Nb_2Pr_5B_5$ and $Fe_{88}Nb_2Nd_5B_5$ which were annealed at 700° C. to 750° C. for 5 minutes and then cooled at a cooling rate which was the same as the heating rate. FIG. 20 is a graph illustrating the relationship between the magnetic characteristics and the average crystal grain sizes, determined from the half-width of the X-ray diffraction pattern, of the bcc-Fe phase of the alloy ribbons having compositions of $Fe_{88}Nb_2(Pr,Nd)_5B_5$. In FIGS. 16 to 20, Ta represents the annealing temperature, and each dotted line in FIGS. 16 and 17 represents the relationship between the lattice constant of the bcc-Fe (pure Fe) and the heating rate, for comparison.

As shown in Tables 3 to 6 and FIGS. 16 and 17, the lattice constants of the bcc phases in the $Fe_{88}Nb_2Pr_5B_5$ and $Fe_{88}Nb_2Nd_5B_5$ alloy ribbons annealed at 700° C. to 750° C. do not depend on the heating rate, and are greater than the lattice constant, 0.28665 nm of the pure Fe, whereas the average crystal grain sizes of the bcc-Fe phases decreases with the heating rate. The average crystal grain sizes of the bcc-Fe phases in the $Fe_{88}Nb_2Pr_5B_5$ and $Fe_{88}Nb_2Nd_5B_5$ alloy ribbons annealed at the maximum heating rate, 216° C./min., are approximately 35 nm, and 27 to 29 nm, respectively.

As shown in Tables 3 and 4, and FIG. 18, both the Ir values and the Ir/Is ratios of the $Fe_{88}Nb_2Pr_5B_5$ alloy ribbons annealed at 700° C. and at 750° C. increase with the heating rate during the annealing. The increase is particularly noticeable in the annealing at 750° C. compared with the annealing at 700° C. Although the iHc value of the $Fe_{88}Nb_2Pr_5B_5$ alloy ribbon is not dependent on the heating rate when the ribbon is annealed at 700° C., but is dependent on the heating rate when annealed at 750° C. Such increases in Ir and iHc values are probably because of improved exchange coupling characteristics caused by the decreased average crystal grain size. No distinct difference in the dependence of the average crystal grain size of the bcc-Fe phase on the heating rate between the alloy ribbon annealed at 700° C. and the alloy ribbon annealed at 750° C. is, however, observed. It is therefore presumed that large dependence of Ir and iHc values on the heating temperature in the alloy ribbon annealed at 750° C. is due to any factors other than the crystal grain size of the bcc-Fe phase. The dependence of the $(BH)_{max}$ value on the heating rate is observed in the $Fe_{88}Nb_2Pr_5B_5$ alloy ribbons annealed at 700° C. and 750° C., and noticeably in the alloy ribbon annealed at 750° C.

As shown in Tables 3 and 4 and FIG. 19, both the Ir values and Ir/Is ratios of the $Fe_{88}Nb_2Nd_5B_5$ alloy ribbons annealed at 700° C. and 750° C. increase when the heating rate is increased during the annealing, although the increases are not noticeable compared with the $Fe_{88}Nb_2Pr_5B_5$ alloy ribbons. The iHc value of this alloy ribbon substantially does not change with the heating rate in these annealing temperatures. On the other hand, the $(BH)_{max}$ values are dependent on the heating rate in the $Fe_{88}Nb_2Pr_5B_5$ alloy ribbons annealed at 700° C. and more noticeably at 750° C. In the $Fe_{88}Nb_2Pr_5B_5$ alloy ribbons annealed at 700° C. and 750° C., the crystal grain size of the bcc-Fe phase is small as a whole, hence the crystal grain size does not greatly contribute to the magnetic characteristics, such as Ir and iHc values.

As shown in FIG. 20, the Ir/Is ratio and $(BH)_{max}$ tend to decrease with the increased crystal grain size of the bcc-Fe phase in both the $Fe_{88}Nb_2Pr_5B_5$ and $Fe_{88}Nb_2Nd_5B_5$ alloy ribbons.

These experimental results suggest that the alloy ribbon in accordance with the present invention heated at a high heating rate and annealed at a temperature of 700° C. to 750° C. has excellent hard magnetic characteristics and a fine crystalline structure with an average crystal grain size of 100 nm or less. The average crystal grain size of the bcc-Fe phase decreases at a heating rate of 10° C. or More and hard magnetic characteristics such as iHc and $(BH)_{max}$ are improved, hence the heating rate during the annealing is set to 10° C./min. or more in the present invention. The heating rate is preferably 36° C./min. or more for achieving more excellent hard magnetic characteristics, and more preferably 100° C./min. or more. In the $Fe_{88}Nb_2Pr_5B_5$ and $Fe_{88}Nb_2Nd_5B_5$ alloy ribbons heated at a heating rate of 100° C./min. or more, the crystal grain sizes of the bcc-Fe phase are approximately 35 to 36 nm, and approximately 26 to 43.5 nm, respectively, and the coercive forces are approximately 1.8 to 2.45 kOe, and approximately 1.85 to 2.45 kOe, respectively.

Example 4

Quenched alloy ribbons were annealed at various annealing times to obtain hard magnetic alloy ribbons.

Figure 21:
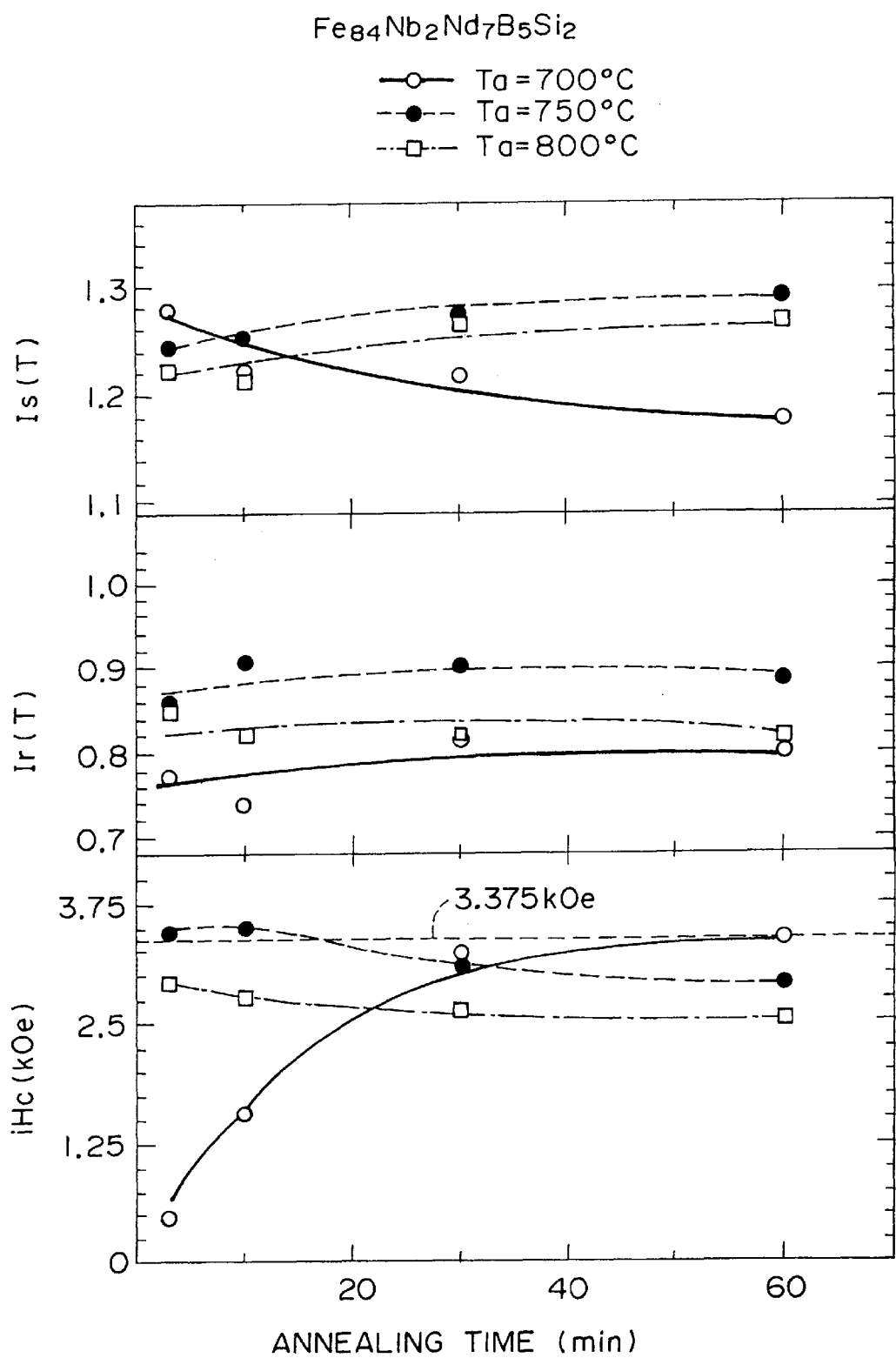
FIG. 21 is a graph illustrating the dependence of the magnetic characteristics on the annealing time (holding time) in an $Fe_{84}Nb_2Nd_7B_5Si_2$ alloy.
Figure 22:
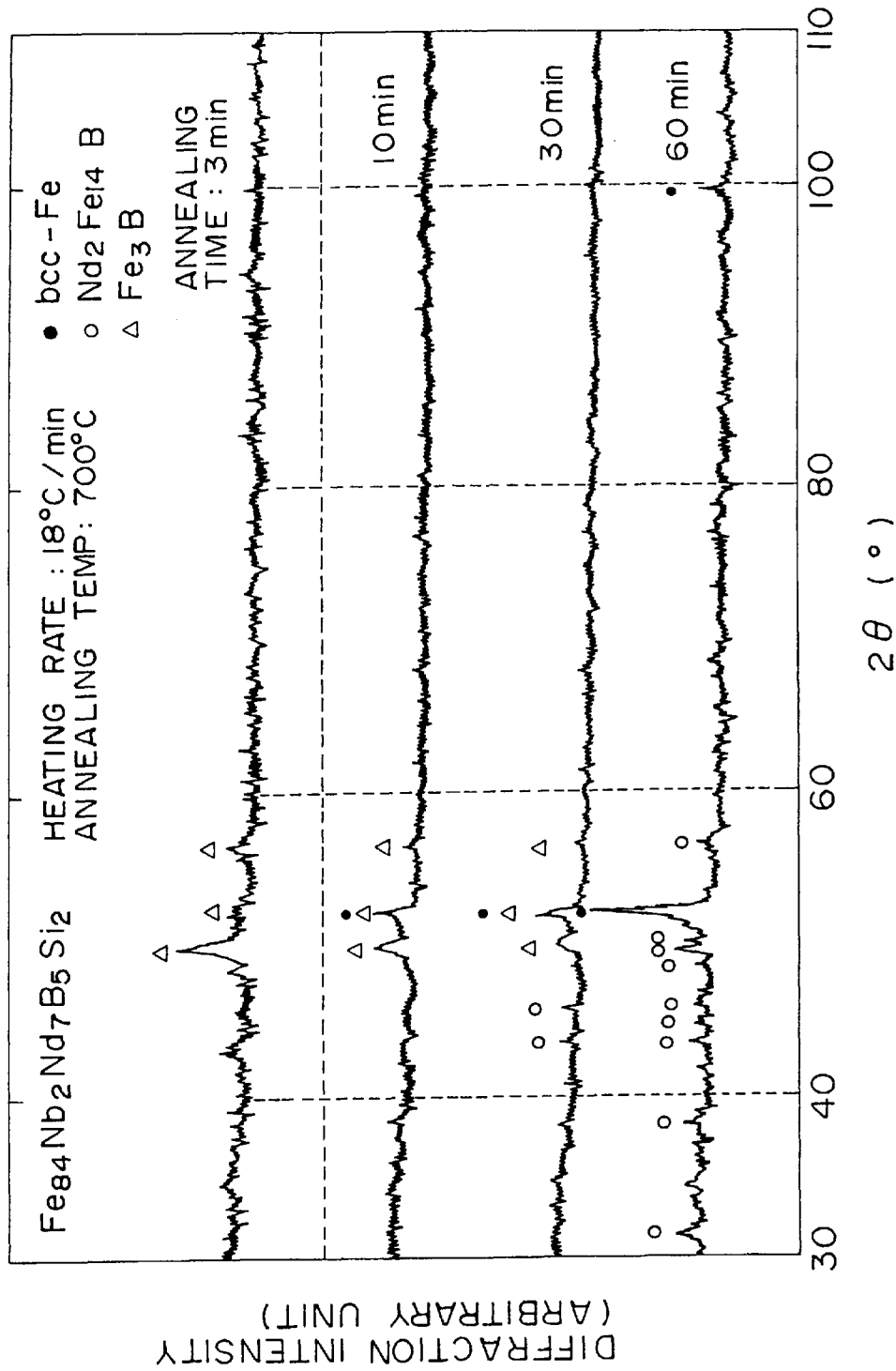
FIG. 22 is a graph of X-ray diffraction patterns at various annealing times (holding times) of an $Fe_{84}Nb_2Nd_7B_5Si_2$ alloy which is heated at a heating rate of 18° C./min. and annealed at 700° C.
Figure 23:
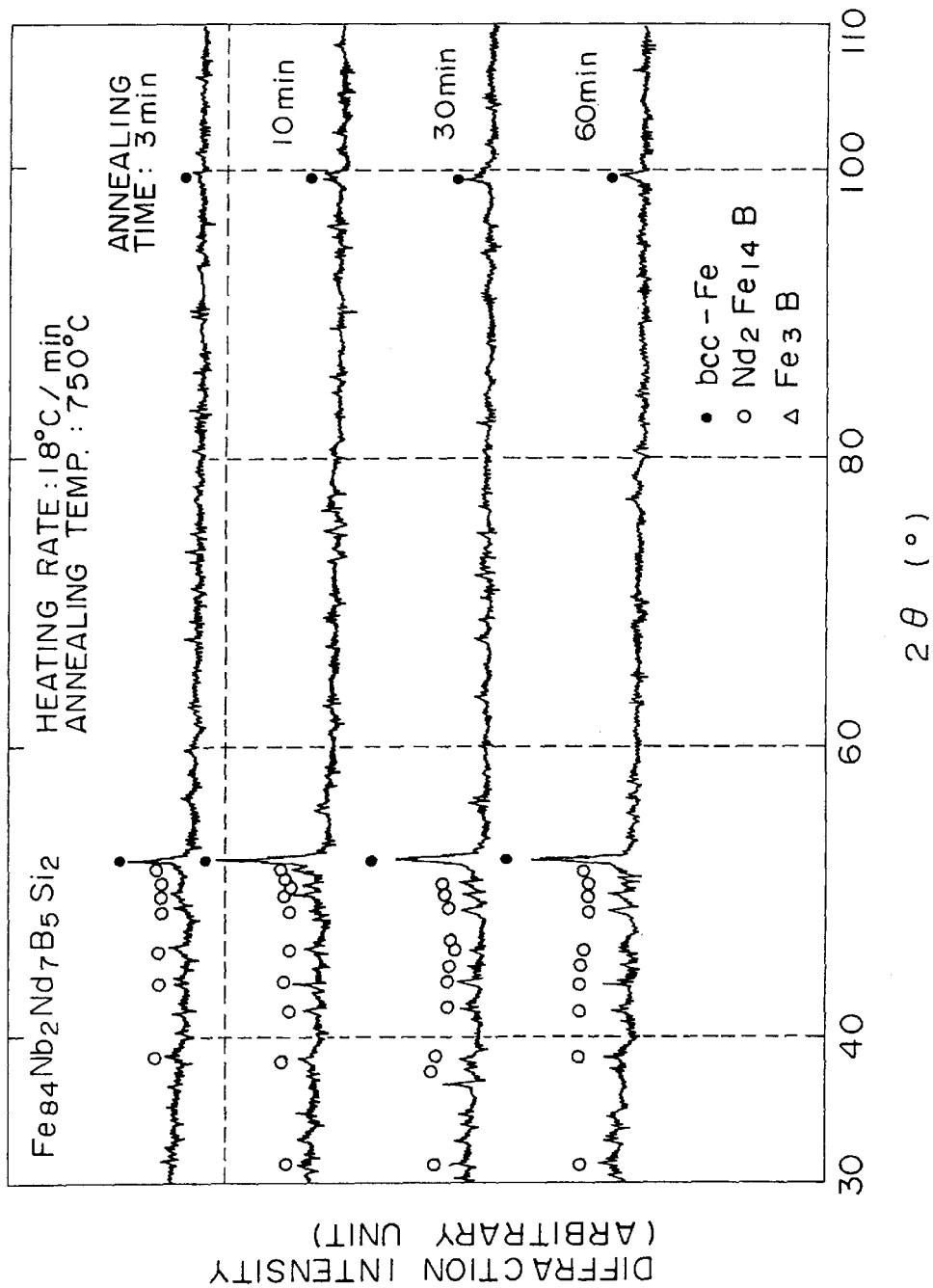
FIG. 23 is a graph of X-ray diffraction patterns at various annealing times (holding times) of an $Fe_{84}Nb_2Nd_7B_5Si_2$ alloy which is heated at a heating rate of 18° C./min. and annealed at 750° C.
Figure 24:
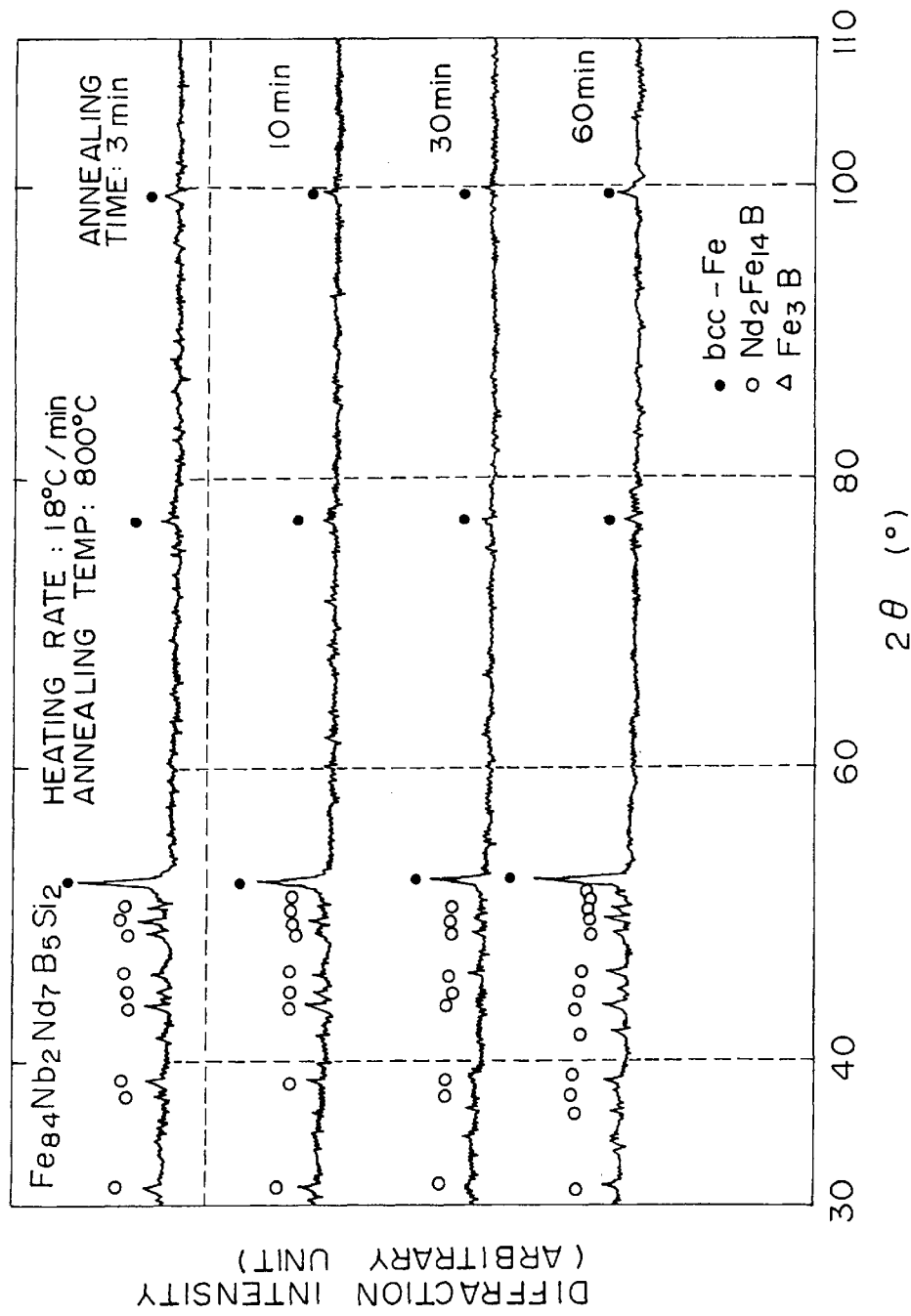
FIG. 24 is a graph of X-ray diffraction patterns at various annealing times (holding times) of an $Fe_{84}Nb_2Nd_7B_5Si_2$ alloy which is heated at a heating rate of 18° C./min. and annealed at 800° C.

A quenched alloy ribbon with a thickness of approximately 20 μm was prepared as in Example 1, and the quenched alloy ribbon was cut to prepare twenty alloy ribbon cut pieces with a thickness of 2 cm. The cut pieces were heated in an infrared image furnace under a pressure of $1\times10^{-5}$ Pa or less at a heating rate of 18° C./min. and annealed at an annealing temperature of 700° C. to 800° C. for 3 to 60 minutes to observe change in magnetic characteristics. The alloy ribbon had a composition of $Fe_{84}Nb_2Nd_7B_5Si_2$ in accordance with the present invention. The results are shown in Table 7. FIG. 21 is a graph illustrating the dependence of magnetic characteristics of the alloy ribbon on the annealing time. FIGS. 22 to 24 are graphs illustrating the dependence of X-ray diffraction patterns of the alloy ribbons, which are annealed at various annealing temperatures, on the annealing time, wherein the X-ray diffraction patterns were measured with a Cu-Kα X-ray diffractometer.

TABLE 7

| Annealing temperature (°C) | iHc (kOe) at a holding time of 3 min. | iHc (kOe) at a holding time of 10 min. | iHc (kOe) at a holding time of 30 min. | iHc (kOe) at a holding time of 60 min. |
| --- | --- | --- | --- | --- |
| 700 | 0.48 | 1.56 | 3.2 | 3.36 |
| 750 | 3.44 | 3.5 | 3.09 | 2.89 |
| 800 | 2.93 | 2.78 | 2.6 | 2.51 |

As shown in Table 7 and FIG. 21, the maximum coercive force, 3.5 kOe, of the $Fe_{84}Nb_2Nd_7B_5Si_2$ alloy ribbon heated at a heating rate of 18° C./min. is obtained when the quenched alloy ribbon is annealed at 750° C. for 60 min. Excellent hard magnetic characteristics, that is, a coercive force of 3.38 kOe is achieved under annealing conditions of 700° C. for 60 min. and 750° C. for 3 min. When the annealing temperature is 800° C., the coercive force is not greater than 3 kOe at any of the annealing times.

The X-ray diffraction pattern, shown in FIG. 22, of the $Fe_{84}Nb_2Nd_7B_5Si_2$ alloy ribbon heated at the heating rate of 18° C./min. and annealed at 700° C. suggests that at a shorter annealing time of 3 to 30 minutes the $Fe_3B$ phase not contributing to hard magnetic characteristics is precipitated, but the $Nd_2Fe_{14}B$ phase having hard magnetic characteristics is not substantially precipitated. The coercive force is therefore not high as shown in Table 7 and FIG. 21. On the other hand, at a long annealing time of 60 minutes, the $Nd_2Fe_{14}B$ phase is precipitated, and a high coercive force is achieved.

The X-ray diffraction pattern, shown in FIG. 23, of the $Fe_{84}Nb_2Nd_7B_5Si_2$ alloy ribbon heated at the heating rate of 18° C./min. and annealed at 750° C. suggests that at all annealing times the $Nd_2Fe_{14}B$ phase is precipitated. In particular, at annealing times of 3 minutes and 10 minutes, high hard magnetic characteristics are obtained as shown in Table 7 and FIG. 21, whereas at longer annealing times of 30 minutes and 60 minutes, the hard magnetic characteristics decrease, because the crystal grains of the soft magnetic phase (bcc-Fe phase) continue growing during the excessive annealing time over the optimum annealing time of 3 to 10 minutes.

The X-ray diffraction pattern, shown in FIG. 24, of the $Fe_{84}Nb_2Nd_7B_5Si_2$ alloy ribbon heated at the heating rate of 18° C./min. and annealed at 800° C. suggests that at all annealing times the $Nd_2Fe_{14}B$ phase is precipitated. The hard magnetic characteristics are, however, not excellent as shown in Table 7 and FIG. 21, because of the crystal grain growth in the soft magnetic phase (bcc-Fe phase) due to such a high annealing temperature.

Example 5

Hard magnetic alloy ribbons were produced by changing annealing conditions.

A quenched alloy ribbon with a thickness of approximately 20 μm having a composition of $Fe_{84}Nb_2Nd_7B_5Si_2$ was prepared as in Example 1, and twenty cut pieces with a length of 2 cm (the total weight of approximately 20 mg) were produced from the quenched alloy ribbon. The twenty cut pieces and four quenched alloy ribbons (the total weight of 10 g) were annealed in an infrared image furnace with a pressure of $1\times10^{-5}$ Pa or less under the following annealing conditions for achieving satisfactory hard magnetic characteristics, (1) at 700° C. for 60 minutes, (2) at 750° C. for 3 minutes, and (3) 750° C. for 10 minutes, wherein the heating rate was 18° C./min. in these annealing conditions. The coercive forces of the annealed alloy ribbons are shown in Table 8.

TABLE 8

| Size and number of alloy ribbon | iHc(kOe) at 700° C., 60 min. | iHc(kOe) at 750° C., 3 min. | iHc(kOe) at 750° C., 10 min. |
| --- | --- | --- | --- |
| 2 cm × 20 | 3.36 | 3.44 | 3.5 |
| 2.5 g × 4 | 3.73 | 3.33 | 3.49 |

Table 8 demonstrates that the $Fe_{84}Nb_2Nd_7B_5Si_2$ alloy ribbons annealed under the above-mentioned conditions have high coercive forces regardless of the total weight of the annealed ribbons. Accordingly, the preferable annealing temperature ranges from 700° C. to 750° C., and the preferable annealing time ranges from 3 minutes to 60 minutes.

Example 6

A quenched alloy ribbon having a composition of $Fe_{88}Nb_2Nd_5B_5$ in accordance with the present invention, produced as in Example 3, was heated in an infrared image furnace of $1.3 \times 10^{-3}$ Torr or less at a heating rate ($\alpha$) of 3 to 180° C./min. and annealed at 700° C. to 750° C. for approximately 180 seconds to study the effect of the annealing on the magnetic characteristics and nano-crystalline structure. The microstructure of the annealed alloy ribbon was observed with an X-ray diffractometer and a transmission electron microscope (TEM), and magnetic characteristics were measured by a VSM at room temperature while applying a magnetic field of 1.5 T to the alloy ribbon in the longitudinal direction.

Figure 25:
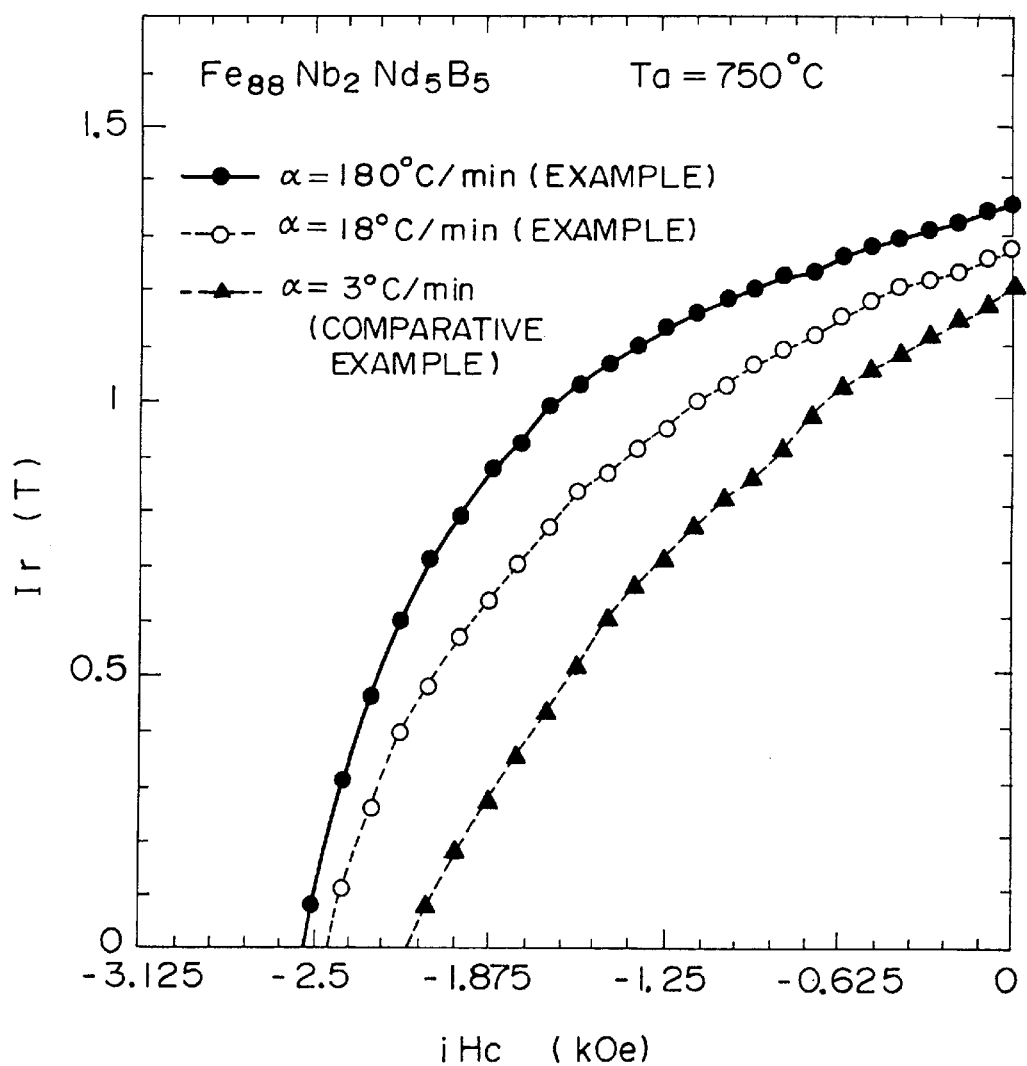
FIG. 25 is a graph illustrating the dependence of demagnetization curves in the second quadrant on the heating rate in an $Fe_{88}Nb_2Nd_5B_5$ alloy, which is annealed at 750° C. for 180 seconds and then quenched.

FIG. 25 is a graph illustrating the dependence of the demagnetization curves in the second quadrant of the $Fe_{88}Nb_2Nd_5B_5$ alloy ribbon, which is annealed at 750° C. for 180 seconds and quenched in the infrared image furnace, on the heating rate. FIG. 25 demonstrates that the heating rates in accordance with the present invention, that is, 180° C./min. and 18° C./min. (Example) cause increased Ir, iHc and thus increased $(BH)_{max}$ compared with the heating rate of 3° C./min. (Comparative Example).

Figure 26:
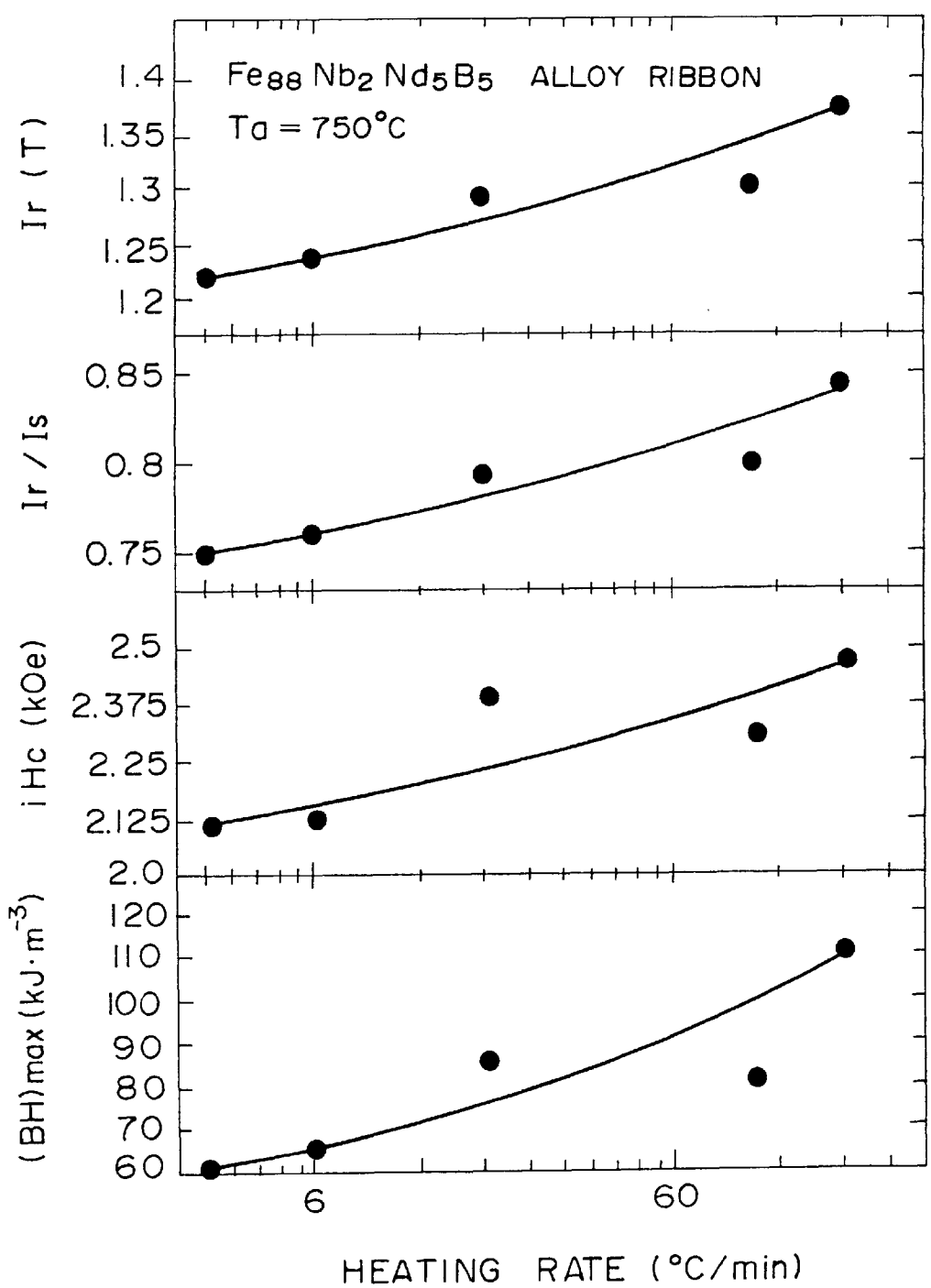
FIG. 26 is a graph illustrating the dependence of magnetic characteristics on the heating rate in an $Fe_{88}Nb_2Nd_5B_5$ alloy, which is annealed at 750° C. for 180 seconds and then quenched.

FIG. 26 is a graph illustrating the dependence of Ir, Ir/Is, iHc, and (BH)max of the resulting $Fe_{88}Nb_2Nd_5B_5$ alloy ribbon on the heating temperature. FIG. 26 demonstrates that the Ir, Ir/Is, iHc, and (BH)max values of the alloy ribbon annealed at 750° C. for 180 seconds significantly increase with the heating rate during the annealing.

Figure 27:
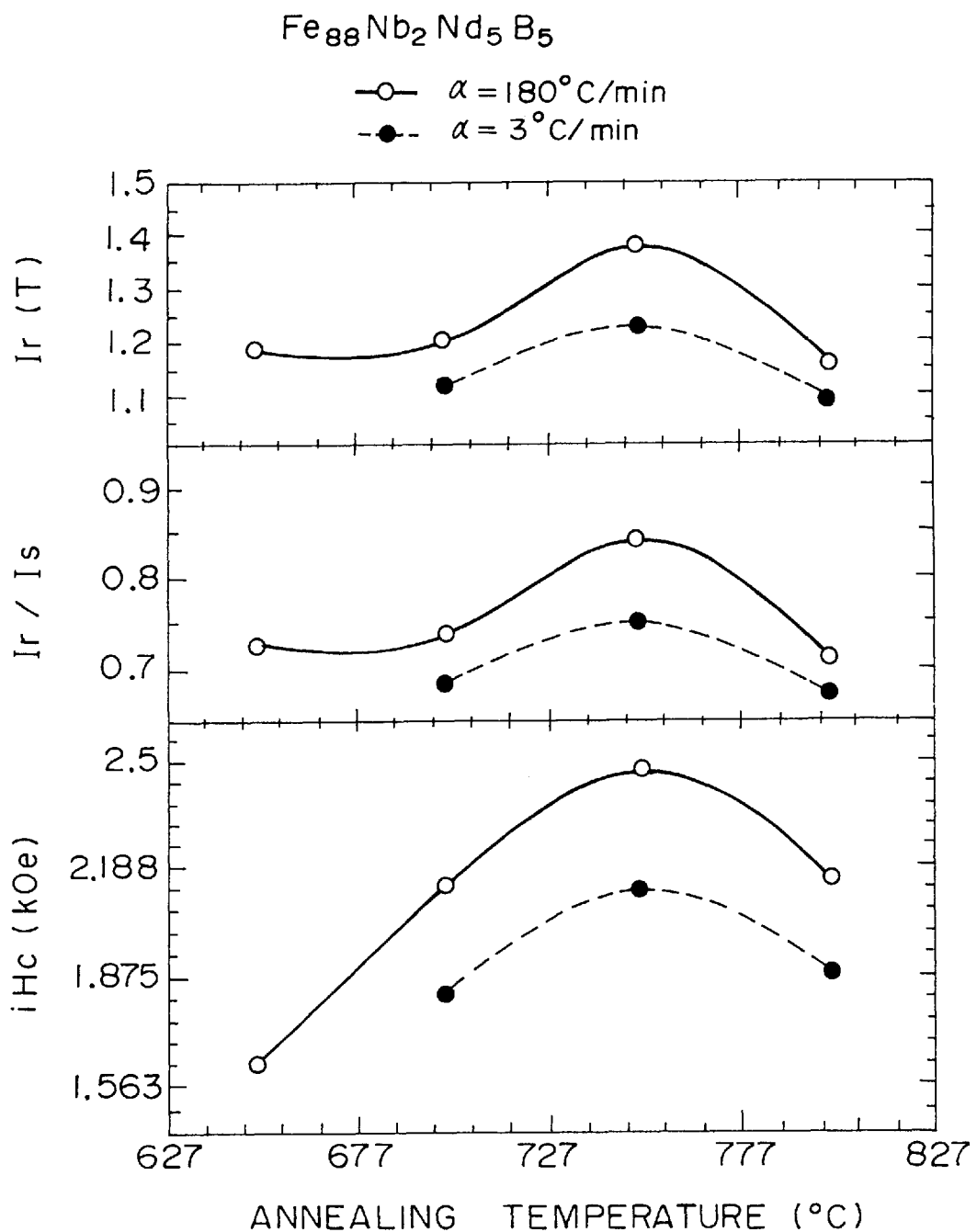
FIG. 27 is a graph illustrating the dependence of magnetic characteristics on the annealing temperature (holding temperature) in an $Fe_{88}Nb_2Nd_5B_5$ alloy, which is heated at a heating rate of 3 to 180° C./min., and annealed for 180 seconds and then quenched.

FIG. 27 is a graph illustrating the dependence of Ir, Ir/Is, and iHc values of the $Fe_{88}Nb_2Nd_5B_5$ alloy ribbon on the heating temperature, which is heated at a heating rate of 3 to 180° C., annealed for 180 seconds and quenched in the infrared image furnace. FIG. 27 demonstrates that superior magnetic characteristics are achieved at an annealing rate of 750° C. In particular, the alloy in accordance with the present invention heated at a heating rate of 180° C./min. and annealed at a temperature of 700° C. to 800° C. has superior magnetic characteristics to the alloy ribbon for comparison heated at a heating rate of 3° C./min.

Figure 28:
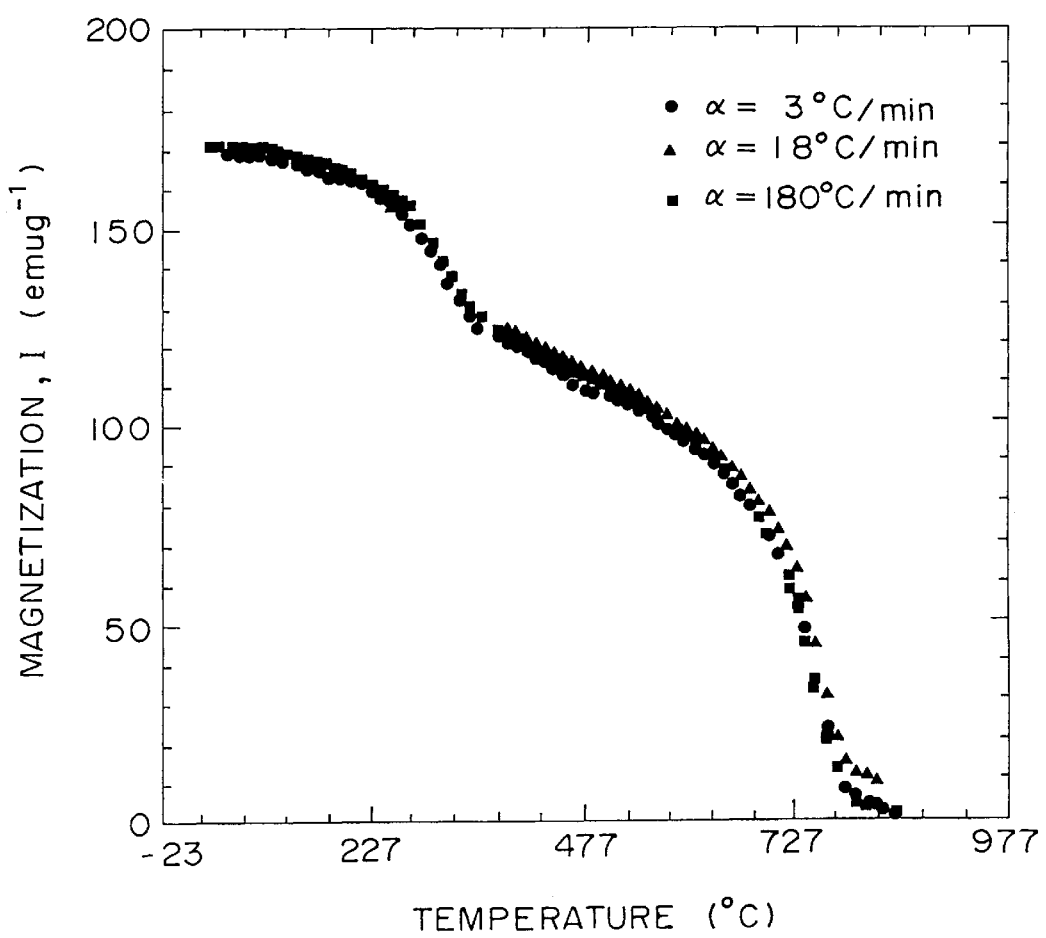
FIG. 28 is a graph illustrating the dependence of magnetization on the temperature in an $Fe_{88}Nb_2Nd_5B_5$ alloy, which is heated at a heating rate of 3 to 180° C., and annealed at 750° C. for 180 seconds and then quenched.

FIG. 28 is a graph illustrating the dependence of magnetization on temperature of the $Fe_{88}Nb_2Nd_5B_5$ alloy ribbon, which is heated at a heating rate of 3 to 180° C., annealed at a temperature of 750° C. for 180 seconds, and quenched. FIG. 28 demonstrates that magnetization of the alloy ribbon decreases with the temperature rise regardless of the heating rate.

Figure 29:
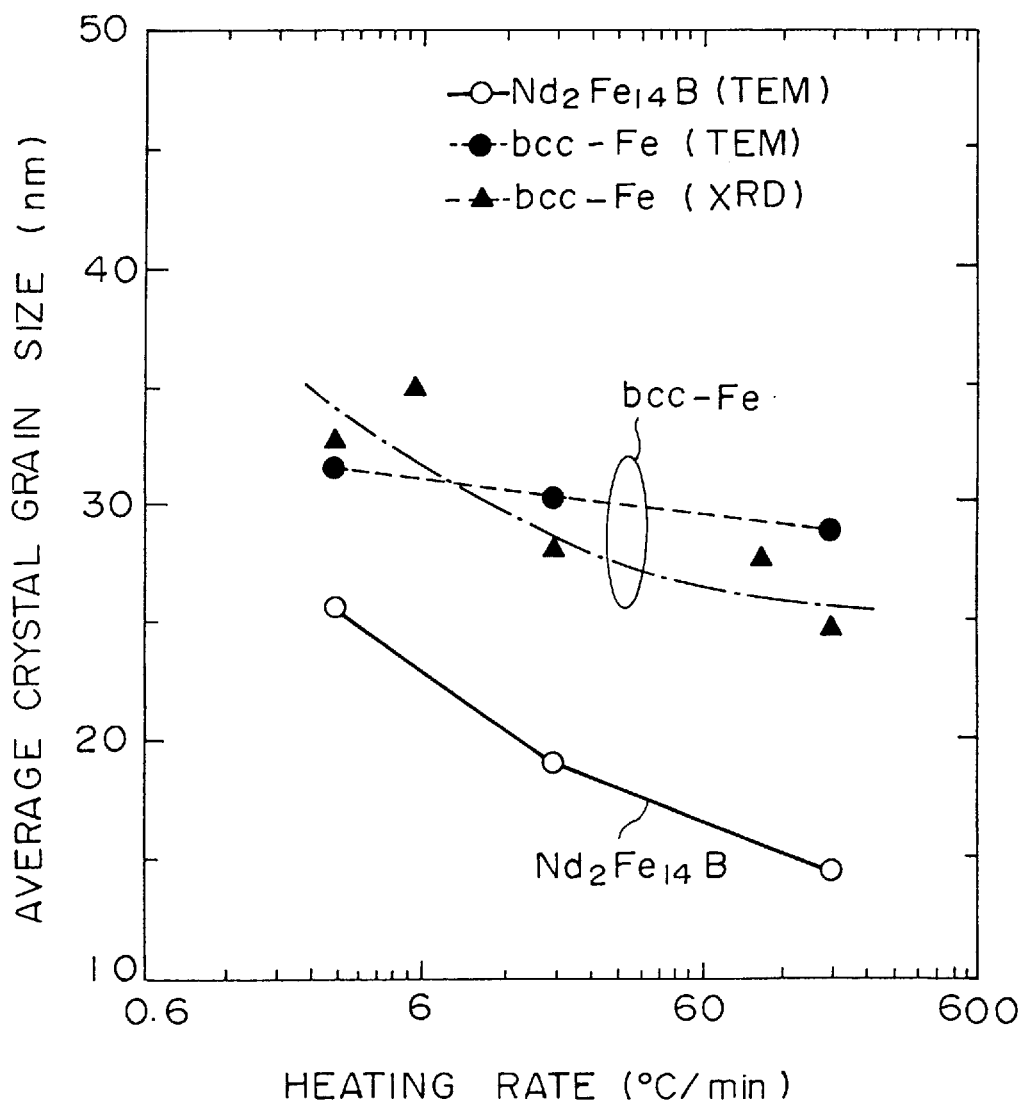
FIG. 29 is a graph illustrating the dependence of the crystal grain size on the heating rate in the bcc-Fe phase and the $Nd_2Fe_{14}B$ phase in an $Fe_{88}Nb_2Nd_5B_5$ alloy, which is annealed at 750° C. for 180 seconds and then quenched.

FIG. 29 is a graph illustrating the dependence of the average crystal grain sizes of the bcc-Fe phase and the $Nd_2Fe_{14}B$ phase on the heating temperature in the $Fe_{88}Nb_2Nd_5B_5$ alloy ribbon, which is annealed at 750° C. for 180 seconds and quenched, wherein the bcc-Fe (TEM) and the $Nd_2Fe_{14}B$ (TEM) refers to particle sizes determined from TEM photographs, and the bcc-Fe (XRD) refers the particle size determined from the X-ray diffraction pattern. FIG. 29 clearly shows that the average crystal grain sizes of the bcc-Fe phase and the $Nd_2Fe_{14}B$ phase decrease with the increased heating rate. In particular, the $Nd_2Fe_{14}B$ phase has a smaller average crystal grain size than that of the bcc-Fe phase, and is more largely dependent on the heating rate than the bcc-Fe phase.

FIGS. 28 and 29 suggest that the dependence of the magnetic characteristics of the $Fe_{88}Nb_2Nd_5B_5$ alloy ribbon on the heating temperature is originated from fining of the crystal grain size. A smaller average grain size of the $Nd_2Fe_{14}B$ crystalline phase causes an increased probability of a bcc-Fe crystal grain and a $Nd_2Fe_{14}B$ crystal grain lying side by side, that is increased coupling of the bcc-Fe crystal grains with the $Nd_2Fe_{14}B$ crystal grains. As a result, exchange coupling characteristics are improved by exchange coupling between the bcc-Fe soft magnetic phase and the $Nd_2Fe_{14}B$ hard magnetic phase.

Figure 30:
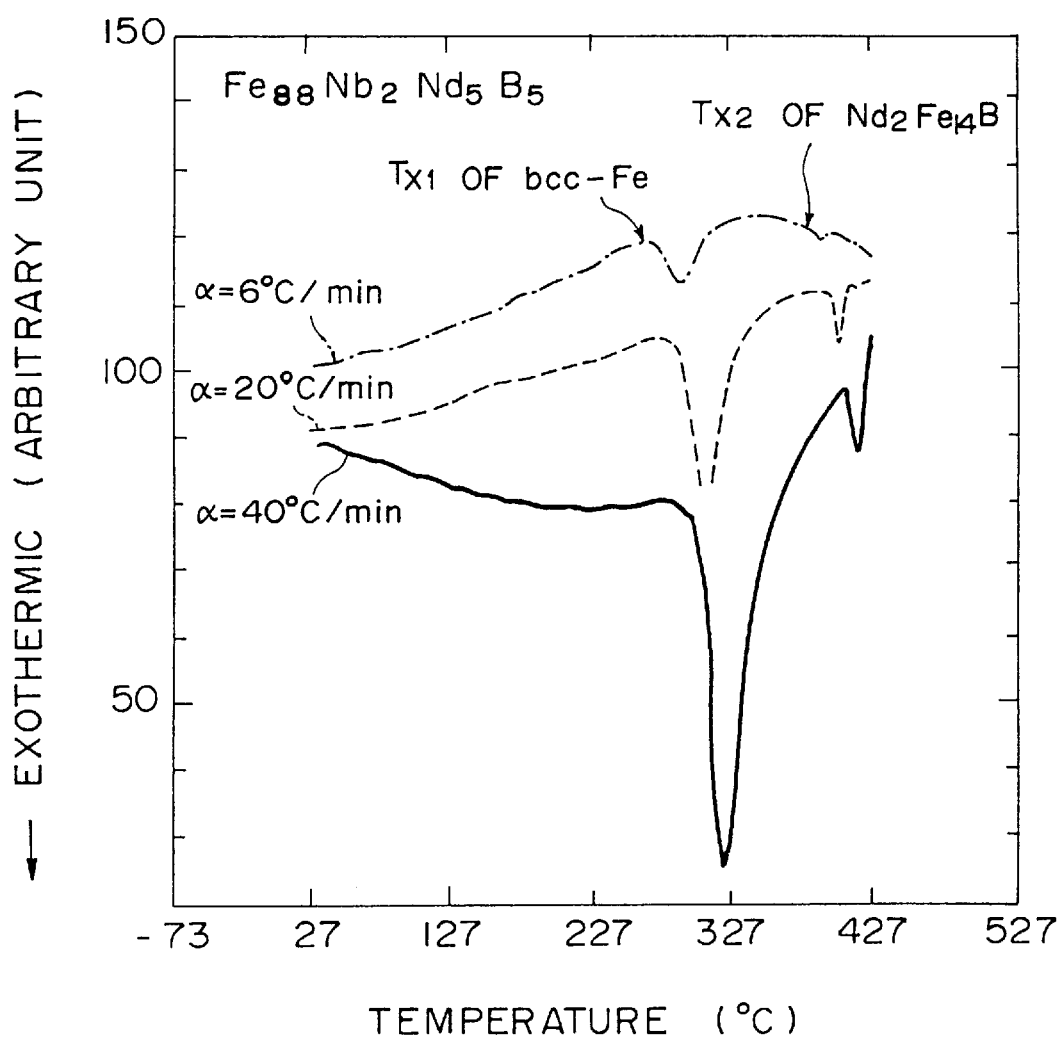
FIG. 30 is differential scanning calorimetric (DSC) thermograms of an amorphous alloy ribbon having a composition of $Fe_{88}Nb_2Nd_5B_5$, which is obtained by a quenching process.
Figure 31A:
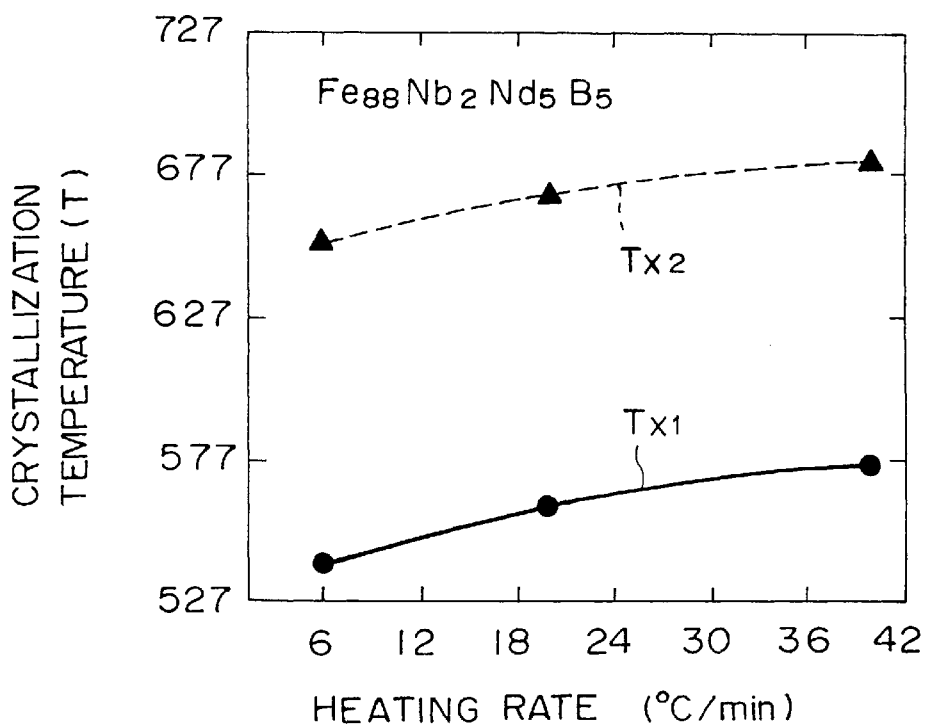
FIG. 31A is a graph illustrating crystallization temperatures $T_{x1}$ and $T_{x2}$, respectively, of the bcc-Fe phase and $Nd_2Fe_{14}B$ phase at various heating rates, which are determined by the DSC thermograms shown in FIG. 30.
Figure 31B:
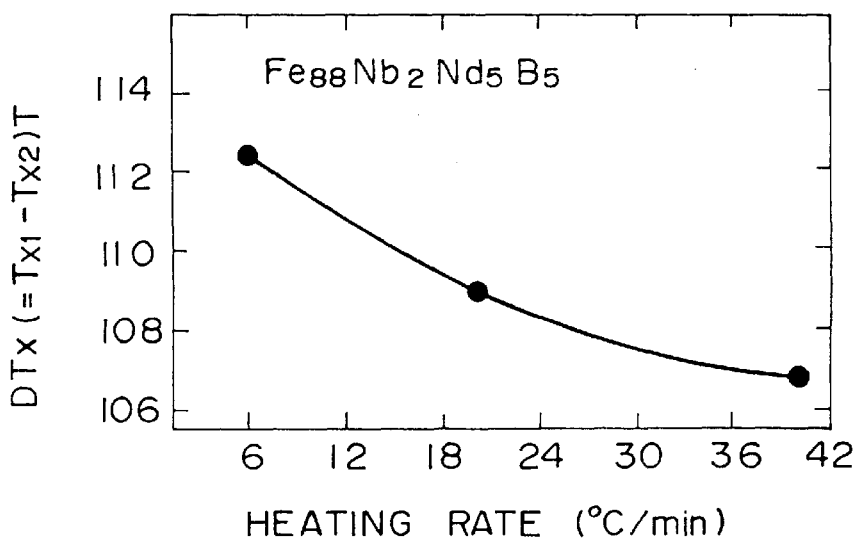
FIG. 31B is a graph illustrating the difference ($D_{tx}=T_{x2}-T_{x1}$) between the crystallization temperatures $T_{x1}$ and $T_{x2}$, respectively, of the bcc-Fe phase and $Nd_2Fe_{14}B$ phase at various heating rates, which are determined by the DSC thermograms shown in FIG. 30.

FIG. 30 is a graph of DSC thermograms of an amorphous $Fe_{88}Nb_2Nd_5B_5$ alloy ribbon obtained by a liquid quenching process at different heating rates. The start point of the first peak in each DSC thermogram corresponds to the crystallization temperature ($T_{x1}$) of the bcc-Fe phase, and the start point of the second peak corresponds to the crystallization temperature ($T_{x2}$) of the $Nd_2Fe_{14}B$ phase. FIG. 31A is a graph illustrating the $T_{x1}$ and $T_{x2}$ determined from the DSC thermograms as shown in FIG. 30 vs. the heating rate, and FIG. 31B is a graph showing the difference between the $T_{x1}$ and $T_{x2}$, $DT_x = T_{x2} - T_{x1}$, in FIG. 31A.

FIGS. 29 to 31 suggest that the difference $DT_x$ decreases with the increased heating rate during annealing, hence the average crystal grain sizes of both the bcc-Fe and $Nd_2Fe_{14}B$ phases decrease with the increased heating rate. At a higher heating rate, both the bcc-Fe and $Nd_2Fe_{14}B$ phases are simultaneously crystallized and prevent coarsening of other phases.

Example 7

Hard magnetic alloy compacts were prepared as follows.

(Preparation of Amorphous Alloy)

Amorphous alloys having the compositions shown in Table 9 were prepared as follows. Alloy ingots based on the compositions were produced by an arc melting process, and each alloy melt was sprayed onto a copper roll rotating in an Ar atmosphere to prepare a quenched alloy ribbon with a thickness of approximately 20 μm. The quenched alloy ribbon was pulverized with a rotor speed mill to prepare an amorphous alloy powder with a particle size of 50 μm to 150 μm.

(Production of Alloy Compact)

The crystallization temperature $T_x$ (° C.) of each amorphous alloy powder was determined by differential scanning calorimetry (DSC). The alloy powder was placed into a mold and sintered with a hot press under a sintering pressure of 636 Mpa, and at a sintering time of 8 minutes while varying the sintering temperature $T_s$ (° C.) to form an alloy compact.

(Measurement of Magnetic Characteristics)

The relative density (%) and the remanent magnetization Ir (T), remanence ratio Ir/Is, and coercive force iHc (kOe) of the resulting compact were measured. The relative density (%) corresponds to the true density of approximately 7.5 g/cm³. The remanent magnetization Ir (T) is represented by the following equation:

$$Ir\ (T) = 4\pi \times 7.5 \times (\text{relative density}) \times Ir\ (\text{emu/g})/10000$$

Figure 32:
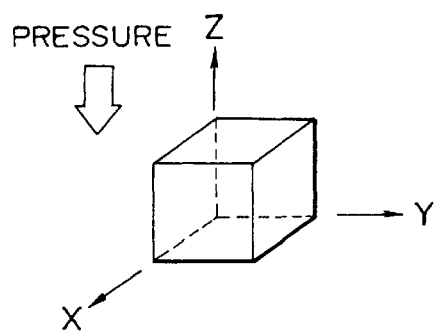
FIG. 32 is an isometric view illustrating the direction of the sintering pressure applied during production of a compact.

Table 9 shows the composition of each amorphous alloy, the sintering temperature $T_s$ (° C.), the sintering pressure $P_s$ (MPa), the annealing temperature (° C.), and saturated magnetization Is (T) values, remanent magnetization Ir (T) values, remanence ratios Ir/Is, coercive forces iHc (kOe), maximum energy products $(BH)_{max}$ and densities (g/cm³) in the X, Y, and Z direction in FIG. 32 when the sintering pressure is applied in the Z direction.

TABLE 9

| Alloy composition and sintering condition | Annealing temperature | Direction | Is (T) | Ir (T) | iHc (kOe) | $(BH)_{max}$ ($kJm^{-3}$) | Ir/Is | Density ($g/cm^3$) |
|---|---|---|---|---|---|---|---|---|
| $Fe_{90}Nb_2Nd_5B_3$ | 750° C. | X | 1.598 | 1.146 | 2.862 | 64.8 | 0.717 | 7.31 |
| Ts = 600° C. | | Y | 1.592 | 1.139 | 2.875 | 64.5 | 0.715 | 7.31 |
| Ps = 636 MPa | | Z | 1.573 | 1.147 | 2.875 | 73.1 | 0.729 | 7.31 |
| $Fe_{89}Nb_2Nd_5B_4$ | 750° C. | X | 1.593 | 1.191 | 3.063 | 79.6 | 0.748 | 7.44 |
| Ts = 600° C. | | Y | 1.584 | 1.183 | 3.063 | 78.5 | 0.745 | 7.44 |
| Ps = 636 MPa | | Z | 1.583 | 1.17 | 3.063 | 79.8 | 0.739 | 7.44 |
| $Fe_{89}Nb_2Nd_4B_5$ | 750° C. | X | 1.636 | 1.211 | 2.95 | 74.5 | 0.74 | 7.44 |
| Ts = 600° C. | | Y | 1.632 | 1.207 | 2.94 | 74.5 | 0.74 | 7.44 |
| Ps = 636 MPa | | Z | 1.624 | 1.212 | 2.85 | 82 | 0.75 | 7.44 |
| $Fe_{88}Nb_2Nd_5B_5$ | 750° C. | X | 1.521 | 1.109 | 3.525 | 78.6 | 0.729 | 7.70 |
| Ts = 600° C. | | Y | 1.52 | 1.109 | 3.512 | 78.8 | 0.73 | 7.70 |
| Ps = 636 MPa | | Z | 1.521 | 1.102 | 3.5 | 80.3 | 0.725 | 7.70 |
| $Fe_{76}Co_{10}Nb_2Nd_7B_5$ | 750° C. | X | 1.391 | 0.884 | 4.138 | 61.1 | 0.636 | 7.65 |
| Ts = 600° C. | | Y | 1.388 | 0.886 | 4.125 | 61.6 | 0.638 | 7.65 |
| Ps = 636 MPa | | Z | 1.403 | 0.92 | 4.163 | 71.5 | 0.656 | 7.65 |
| $Fe_{84}Nb_2Nd_7B_5Si_2$ | 750° C. | X | 1.284 | 0.83 | 4.813 | 55.7 | 0.646 | 7.55 |
| Ts = 600° C. | | Y | 1.286 | 0.831 | 3.55 | 55.6 | 0.646 | 7.55 |
| Ps = 636 MPa | | Z | 1.29 | 0.866 | 4.88 | 65.6 | 0.671 | 7.55 |
| $Fe_{66}Co_2Cr_5Nd_{5.5}B_{18.5}$ | 700° C. | X | 1.176 | 0.797 | 6.338 | 63.4 | 0.678 | 7.51 |
| Ts = 600° C. | | Y | 1.175 | 0.797 | 6.325 | 64.1 | 0.678 | 7.51 |
| Ps = 636 MPa | | Z | 1.166 | 0.796 | 6.338 | 67 | 0.683 | 7.51 |

Ts = sintering temperature
Ps = sintering pressure

The results shown in Table 9 demonstrate that dense alloy compacts having excellent hard magnetic characteristics are produced by compacting the amorphous alloy powders while crystallizing the amorphous alloys or growing the crystal grains. The Is, Ir, Ir/Is values are relatively higher in the Z direction, and all the alloy compacts show high $(BH)_{max}$ values. Accordingly, crystallization or crystal growth under stress causes an anisotropic hard magnetic phase, and thus improved hard magnetic characteristics.

Figure 33A:
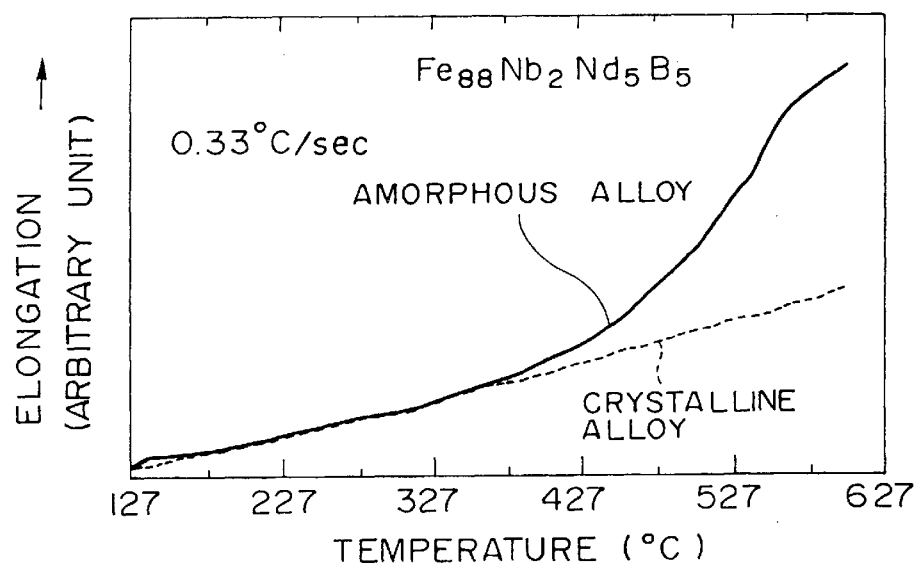
FIG. 33A includes TMA curves (A) and FIG. 33B a DSC thermogram (B) of an amorphous alloy in accordance with the present invention and of a crystalline alloy not containing an amorphous component.
Figure 33B:
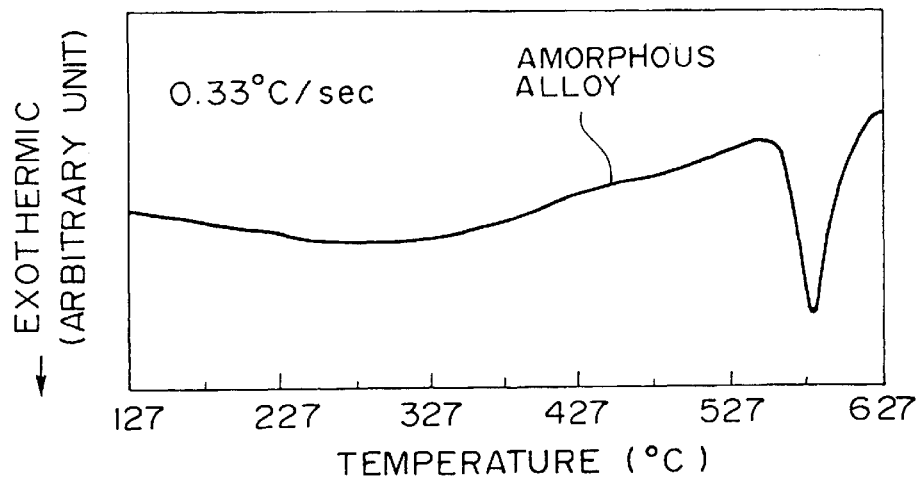

FIG. 33A is a graph of the thermal mechanical analysis (TMA) thermogram of the $Fe_{88}Nb_2Nd_5B_5$ amorphous alloy ribbon, and FIG. 33B is a graph of the DSC thermogram of the amorphous alloy ribbon, wherein both thermograms were obtained at a heating rate of 0.33° C./sec. In the DSC thermogram in FIG. 33B, an exothermic peak observed at approximately 850° C. suggests the crystallization of the bcc-Fe or FeB phase. On the other hand, as shown in the TMA thermogram in FIG. 33B, the elongation of the amorphous alloy ribbon significantly increases from the temperature region near 427° C. which is approximately 200° C. lower than the crystallization temperature. Such a phenomenon suggests a softening of the alloy near the crystallization temperature. FIG. 33A also includes a TMA thermogram of the crystalline alloy having the same composition for comparison. FIG. 33A suggests that softening of the crystalline alloy does not occur.

Particles of the amorphous alloy powder are closely bonded to each other by being pressurized at the softening temperature region to form a dense alloy compact with decreased pores.

Figure 34A:
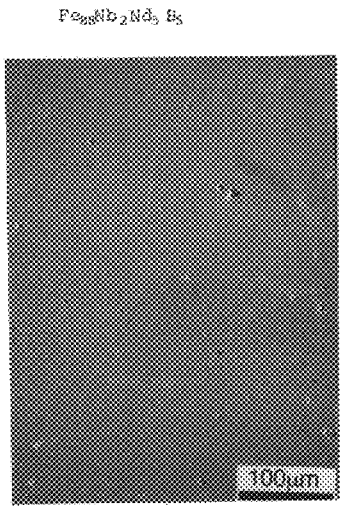
FIGS. 34A to 34C are photographs by microscopy of a compact obtained by varying the sintering temperature of an amorphous alloy in accordance with the present invention.
Figure 34B:
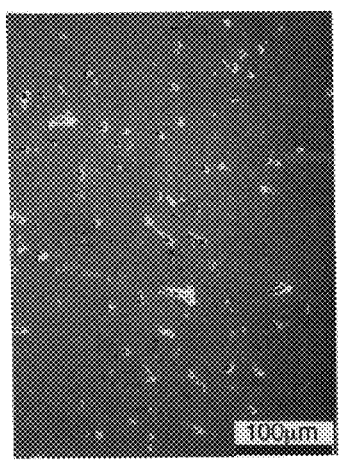
Figure 34C:
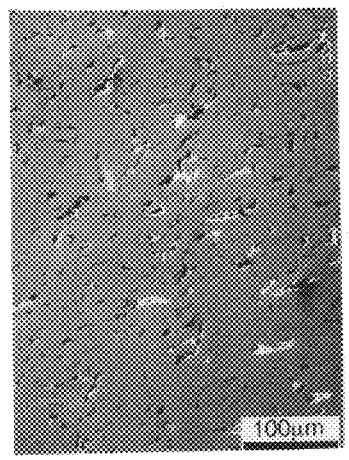

FIGS. 34A to 34C are schematic photographs observed by microscopy of the texture in the alloy compact which is sintered at a sintering pressure of 636 MPa, a sintering time of 8 minutes, and sintering temperatures of 400° C., 500° C. and 600° C., respectively. A more dense alloy compact with decreased pores can be obtained when the sintering temperature is raised, and an alloy compact sintered at 600° C. is sufficiently dense.

At least part of the amorphous phase is crystallized when being heated to the crystallization temperature.

Figure 35:
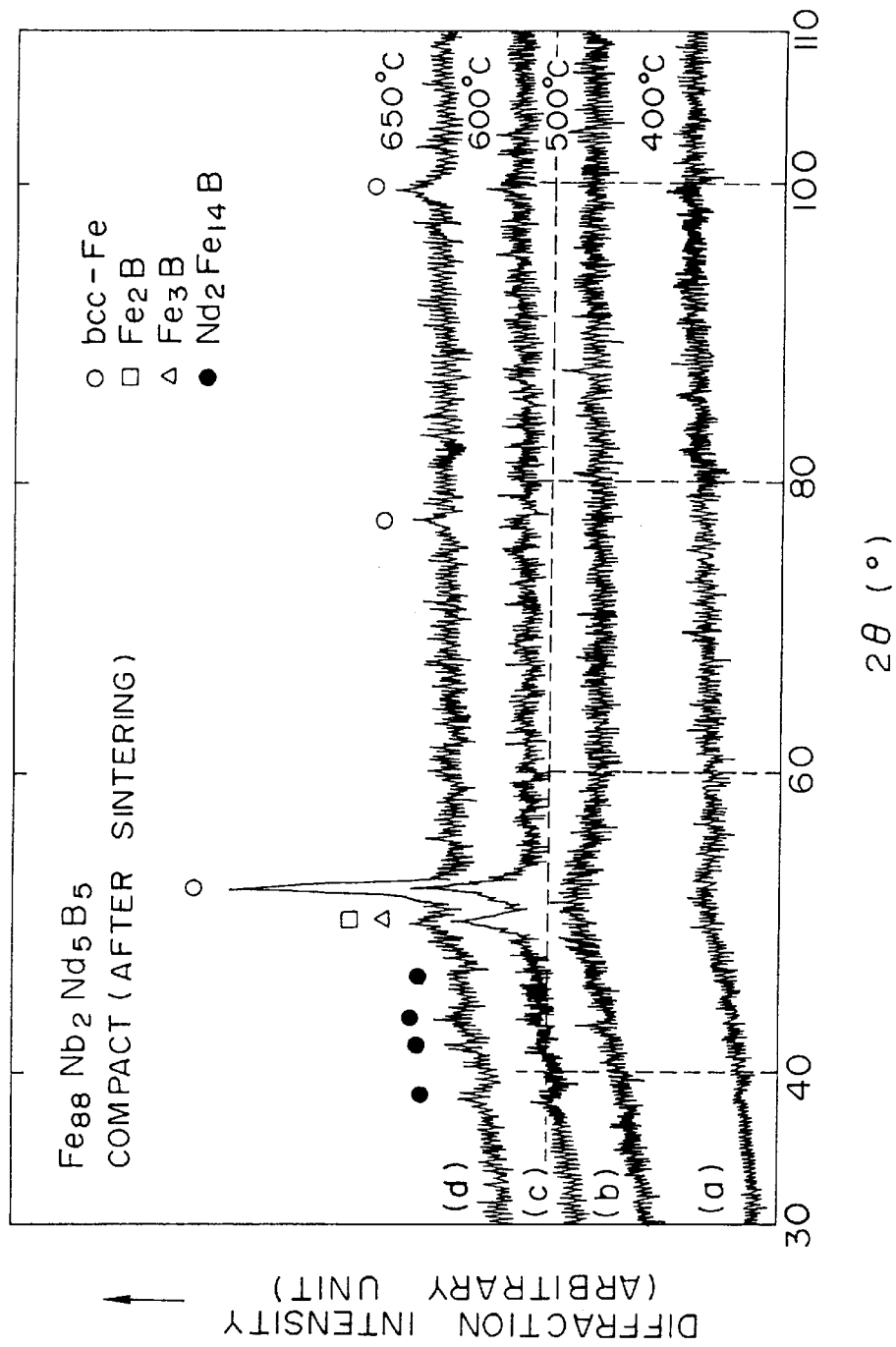
FIG. 35 is a graph of X-ray diffraction patterns of a compact obtained by various sintering temperatures of an amorphous alloy in accordance with the present invention.

FIG. 35 is a graph of X-ray diffraction patterns of the alloy compact immediately after sintering at a sintering pressure of 636 MPa, a sintering time of 8 minutes, and various sintering temperatures. In FIG. 35, patterns (a), (b), (c), and (d) correspond to sintering temperatures of 400° C., 500° C., 600° C., and 650° C., respectively. In these patterns, the hallow pattern at 2θ=ca. 44.5° suggests the presence of the bcc-Fe crystalline phase.

FIG. 35 demonstrates that at a sintering temperature of 500° C. or less only the hallow pattern is observed as shown in patterns (a) and (b) and thus the bcc-Fe crystalline phase does not substantially form, whereas at a sintering temperatures of 600° C. to 650° C., a bcc-Fe crystalline phase, a $Nd_2F_{14}B$ phase, and an Fe-B compound phase, supporting hard magnetic characteristics, form as shown in patterns (c) and (d).

Figure 36:
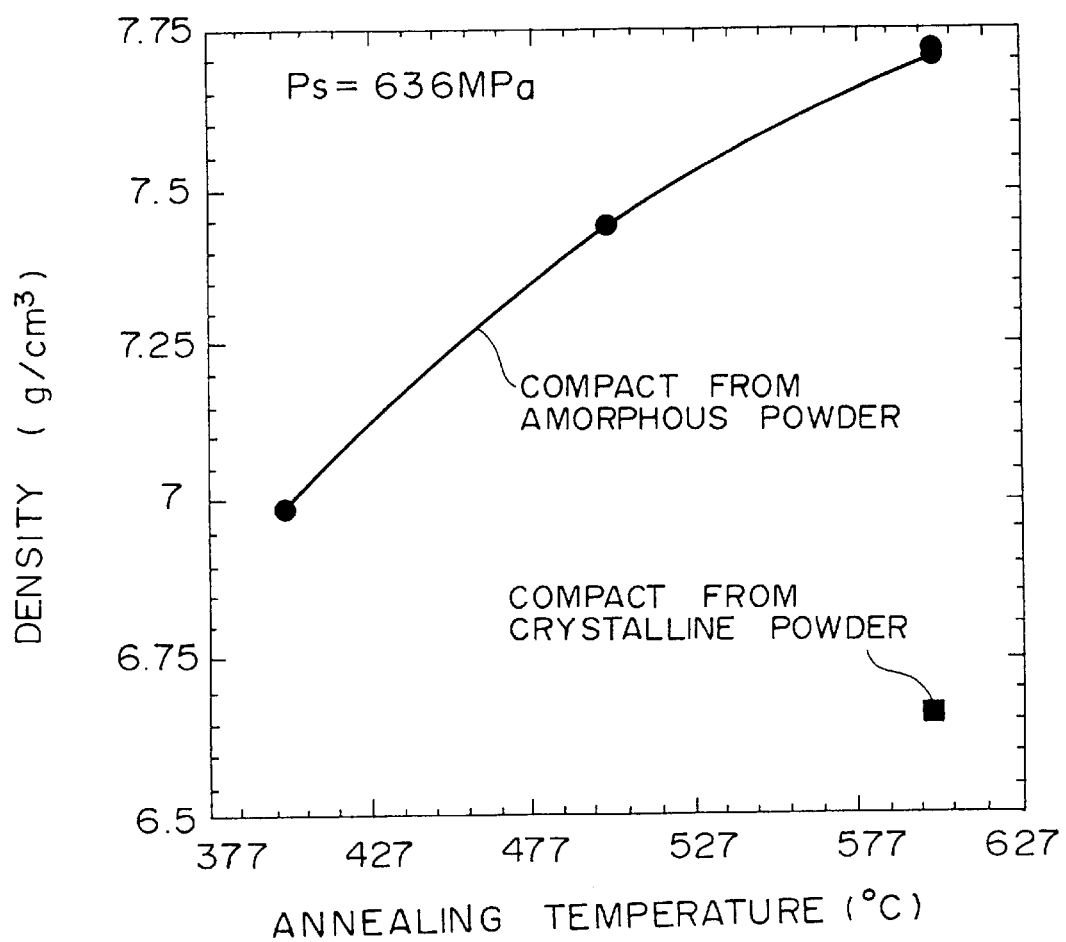
FIG. 36 is a graph illustrating the relationship between the density and the sintering temperature in a compact in accordance with the present invention and a compact in a comparative example.

FIG. 36 is a graph of the density of the alloy compact which is sintered at a sintering pressure of 636 MPa, a sintering time of 8 minutes, and different sintering temperature. FIG. 36 demonstrates that the density increases with the sintering temperature, and a high density of 7.45 $g/cm^3$ or more is achieved at a sintering temperature of higher than 500° C.

The results shown in FIG. 36 in view of the X-ray diffraction patterns suggest that the amorphous alloy compact sintered at 500° C. or less has a relatively low density, whereas the alloy compact sintered at 600° C. or more contains the bcc-Fe crystalline phase and has a sufficiently high density. These results suggest that when the amorphous alloy powder is molded under stress by utilizing the softening phenomenon before the crystallization, the alloy powder is simultaneously crystallized and sintered, and thus the alloy compact has a high density, and excellent mechanical and hard magnetic characteristics.

For comparison, a crystalline powder, obtained by crystallizing an amorphous powder at 750° C. and then annealing for 3 minutes, was sintered at a sintering pressure of 636 MPa, a sintering time of 8 min. and a sintering temperature of approximately 600° C. The density of this alloy compact is also shown in FIG. 36. The alloy compact from the crystalline powder has a small density, i.e., approximately 6.70 $g/cm^3$. Accordingly, a dense alloy compact cannot be obtained by the sintering of the crystalline powder.

Figure 37:
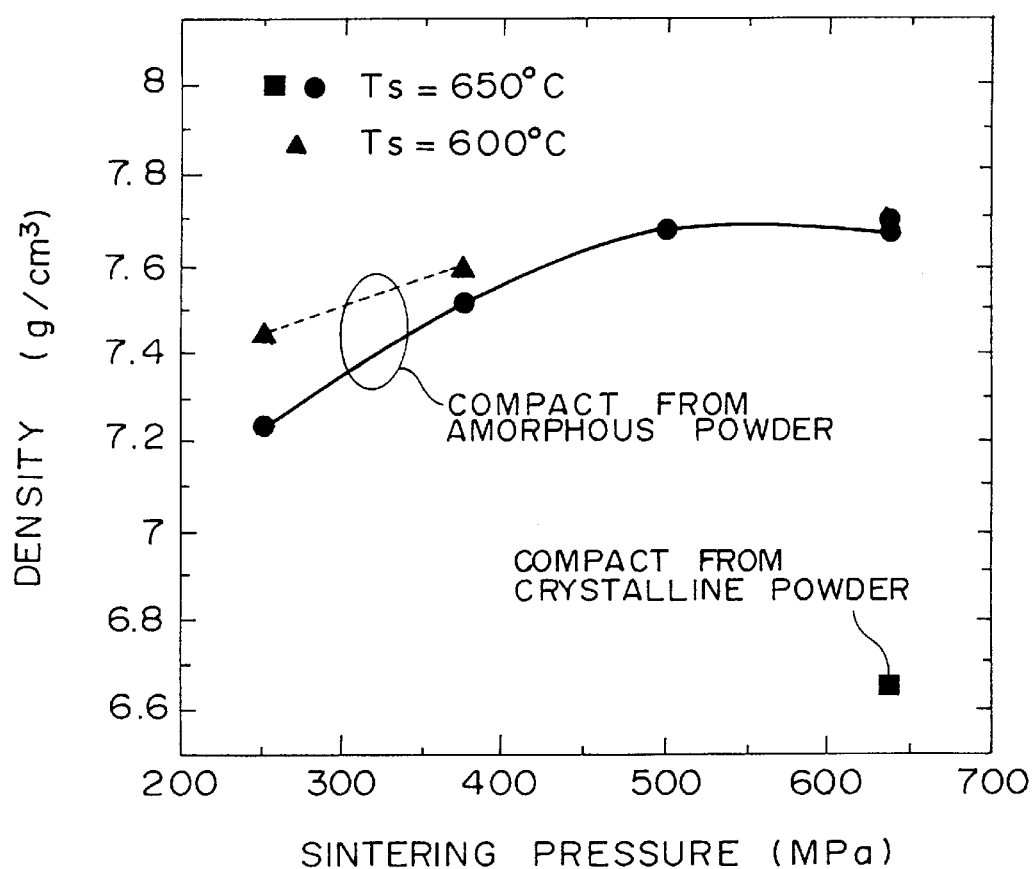
FIG. 37 is a graph illustrating the relationship between the density and the sintering pressure in a compact in accordance with the present invention and a compact in a comparative example.

FIG. 37 is a graph illustrating the density of the compact which is obtained at a sintering temperature of 600° C. or 650° C., and a sintering pressure of 260 to 636 MPa, as well as the density of an alloy compact, which is produced by sintering a crystalline powder at a sintering temperature of 600° C., at a sintering pressure of 636 MPa, and a holding time of 3 minutes, in which the crystalline powder is prepared by crystallizing an amorphous powder at 750° C. and then annealing for 3 minutes.

FIG. 37 demonstrates that the density of the compact from the amorphous alloy powder increases with the sintering pressure and reaches the true density at a sintering pressure of 500 MPa or more. In contrast, the compact from the crystalline powder has a significantly low density regardless of a high sintering pressure of 636 MPa.

As a preferable embodiment of a method for producing the compact in accordance with the present invention, an Fe-Nd-Nb-B-based alloy compact was produced by a spark plasma sintering process using a sintering dice with a punch diameter of 18 mm, and the magnetic characteristics of the resulting compact were observed.

(Preparation of Quenched Amorphous Alloy Ribbon)

Two amorphous alloys having compositions of $Fe_{88}Nb_2Nd_5B_5$ and $Fe_{86}Nb_2Nd_7B_5$, respectively, were prepared as follows. An ingot of each alloy was produced by an arc melting process, the alloy melt was sprayed onto a copper single roll rotating in an Ar atmosphere through a quartz nozzle with a slit having a thickness of 0.3 mm and a width of 14 mm to obtain a quenched alloy ribbon having a thickness of approximately 20 $\mu$m. The conditions for quenching the alloy melt were as follows:

Weight of the melt: 15 to 20 g

Degree of attained vacuum: $6\times10^3$ Pa or less

Pressure of Ar atmosphere: 15 cmHg

Spraying pressure: 0.4 kgf/cm$^3$

Rotation rate of roll: 4,000 rpm

Spraying temperature: 1,450° C.

(Preparation of Alloy Powder)

The quenched alloy ribbon was pulverized with a rotor speed mill, and the alloy powder was classified. The particle size of the alloy powder primarily ranges from 37 to 105 $\mu$m. In particular, the $Fe_{88}Nb_2Nd_5B_5$ powder is primarily composed of 53 to 105 $\mu$m particles and the $Fe_{86}Nb_2Nd_7B_5$ powder is primarily composed of 37 to 53 $\mu$m particles. The results suggest that the higher-Nd alloy is more fragile than the lower-Nd alloy, and can be easily pulverized.

For comparison, an Fe-(Nb,Zr)-B amorphous alloy ribbon containing no rare earth metal was prepared and pulverized. The yield of the powder having a particle size ranging from 53 to 105 $\mu$m was less than 10%.

Accordingly, the Fe-Nb-Nd-B amorphous alloy can be easily pulverized compared with the Fe-(Nb,Zr)-B amorphous alloy.

(X-ray Diffractometry of Alloy Powder)

Figure 38:
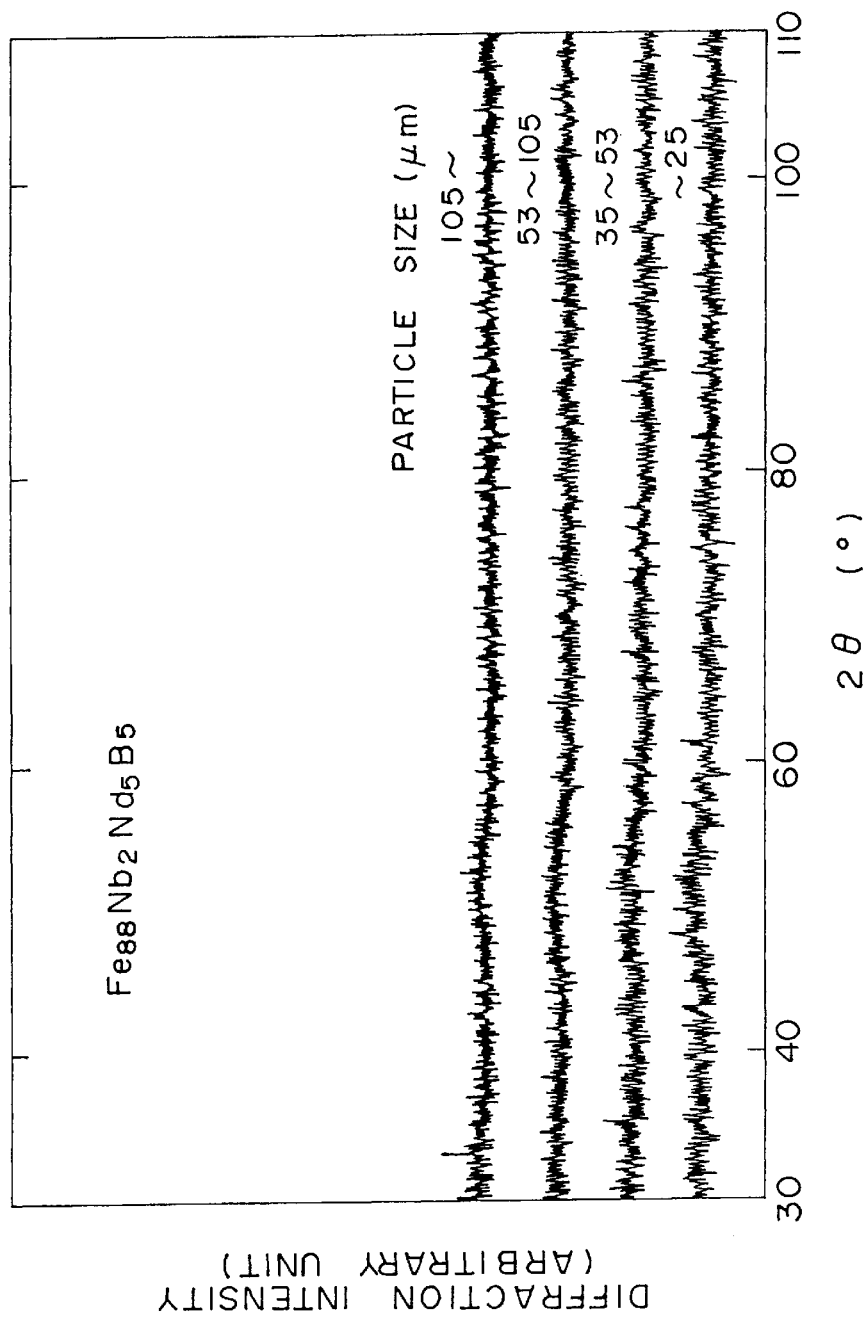
FIG. 38 is a graph of X-ray diffraction patterns of an amorphous alloy powder in accordance with the present invention.
Figure 39:
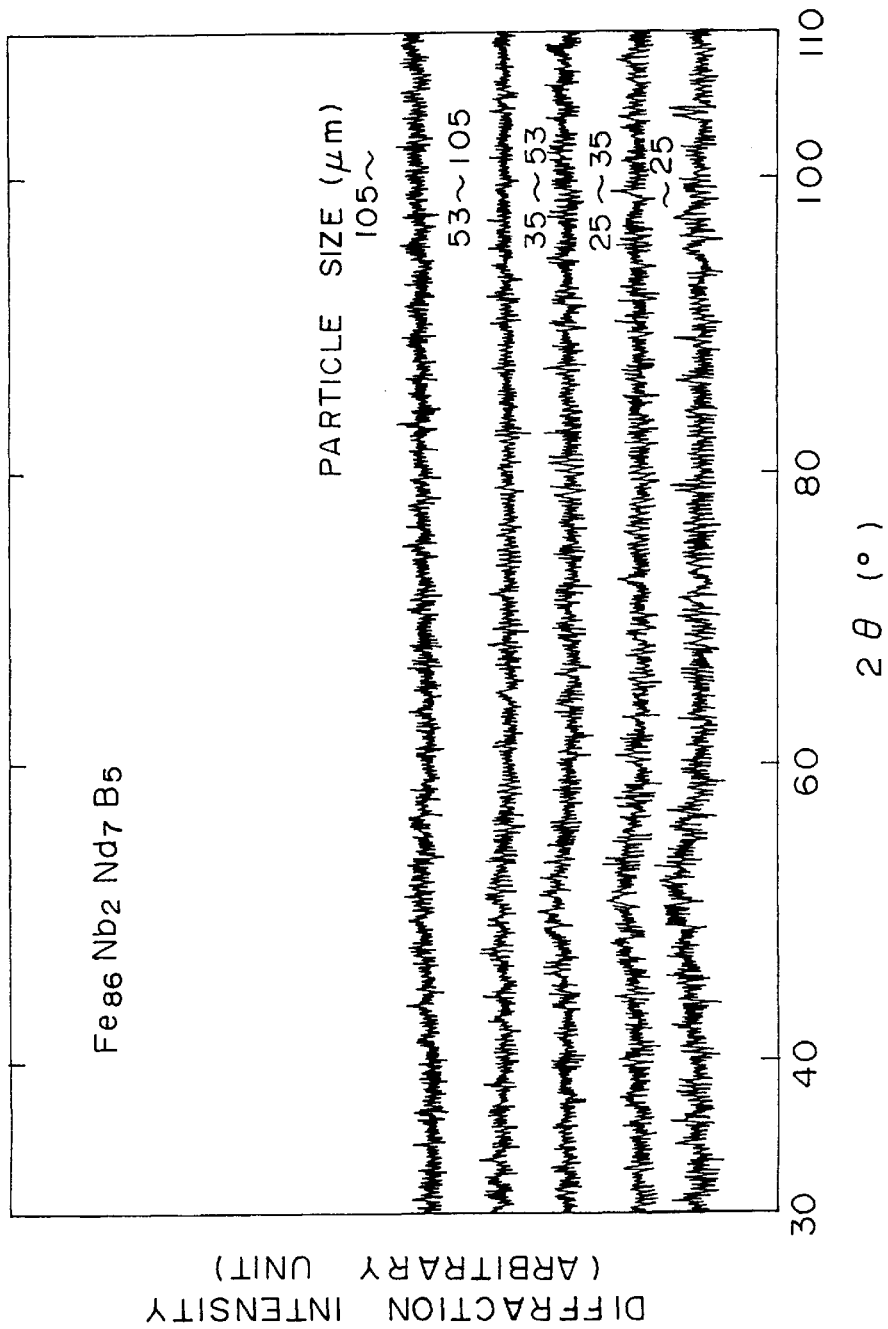
FIG. 39 is a graph of X-ray diffraction patterns of an amorphous alloy powder in accordance with the present invention.

FIGS. 38 and 39 are graphs of X-ray diffraction patterns of the $Fe_{88}Nb_2Nd_5B_5$ and $Fe_{86}Nb_2Nd_7B_5$ powders, respectively. The hallow peak near $2\theta=50°$, observed in all the diffraction patterns, suggests formation of the amorphous phase in the powders. For comparison, the X-ray diffraction patterns of the powder from the $Fe_{84}Nb_7B_9$ amorphous alloy ribbon containing no rare earth element were also observed. Diffraction peaks based on a crystalline phase were observed in the powder with a particle size ranging from 25 to 53 $\mu$m. The amorphous powder may be crystallized during pulverizing, or a crystalline material is mixed in the pulverizer.

Accordingly, the Fe-Nb-Nd-B amorphous alloy in accordance with the present invention can be easily pulverized without deteriorating the amorphous phase, and the powder has a desirable particle size distribution.

(Production of Alloy Compact)

Each of the amorphous $Fe_{88}Nb_2Nd_5B_5$ and $Fe_{86}Nb_2Nd_7B_5$ powders with a particle size range of 37 to 105 $\mu$m was placed between the upper and lower punches 2 and 3 of the spark plasma sintering system shown in FIG. 3, and the system was evacuated so that the atmosphere in the chamber 13 was $3\times10^{-3}$ Pa or less, while pressing the punches 2 and 3 from both sides and applying electrical current pulses for heating the powder. The powder was sintered together with crystallization or crystal grain growth and a compact was formed under the conditions of a sintering pressure of 636 MPa, a heating rate of 1.8° C./sec., a sintering temperature of 500° C. to 600° C., and a holding time of 8 minutes. The resulting compact was annealed in an atmosphere of $1.3\times10^{-3}$ Pa or less at a heating rate of 3° C./sec., an annealing temperature of 550° C. to 800° C., and an annealing time of 3 minutes.

Figure 40:
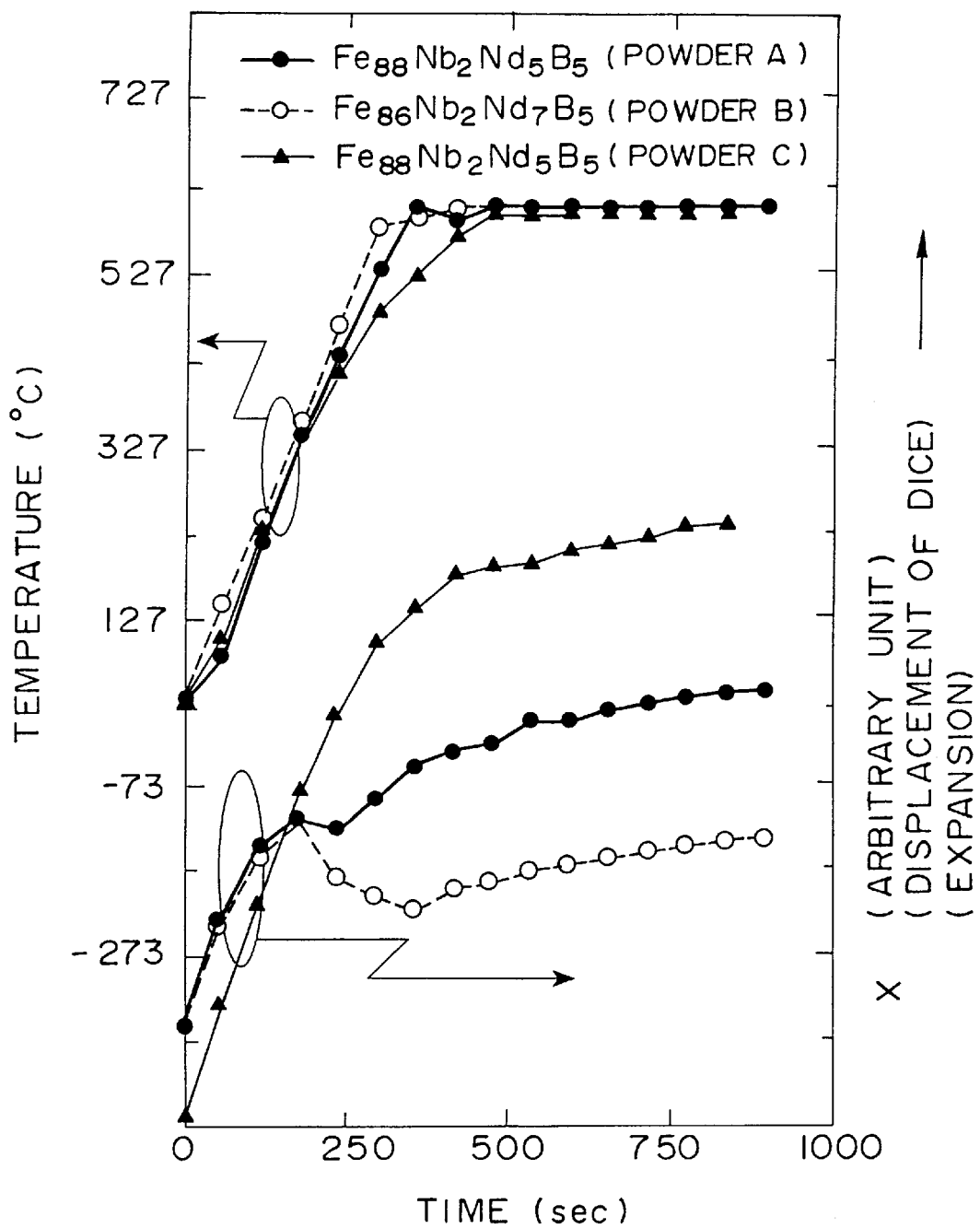
FIG. 40 is a graph illustrating the relationship between the sintering time and the temperature and between the sintering time and the expansion when sintering amorphous $Fe_{88}Nb_2Nd_5B_5$ and $Fe_{86}Nb_2Nd_7B_5$ powders, and a nanocrystalline $Fe_{88}Nb_2Nd_5B_5$ powder.

FIG. 40 is a graph illustrating the relationship between the time, the temperature of the powder, and the distance X between the two dices (or expansion), wherein powders A and B represent the amorphous $Fe_{88}Nb_2Nd_5B_5$ and $Fe_{86}Nb_2Nd_7B_5$ powders, respectively, powder C represents a nano-crystallized $Fe_{88}Nb_2Nd_5B_5$ powder annealed at 750° C., and these powders were sintered at a heating rate of 1.8° C./sec. and a sintering temperature of 600° C. The temperature of the powder was measured with a thermocouple 7 attached to the dice, and the distance X between the dices was determined by the distance between the upper and lower punches 2 and 3, as shown in FIG. 1.

As shown in FIG. 40, the distance X of the nano-crystallized $Fe_{88}Nb_2Nd_5B_5$ powder (powder C) causes monotone increase with a rise in temperature, whereas the expansion of the amorphous $Fe_{88}Nb_2Nd_5B_5$ and $Fe_{86}Nb_2Nd_7B_5$ powders (powders A and B) is completed at approximately 327° C. or 240 seconds, and on the contrary, powders shrink at further times. Such a phenomenon suggests that these amorphous alloy powders (powders A and B) are softened near their crystallization temperature, i.e., 327° C., respectively, resulting in the increased densities of the compacts.

(Structure and Magnetic Characteristics of Compact)

Figure 41:
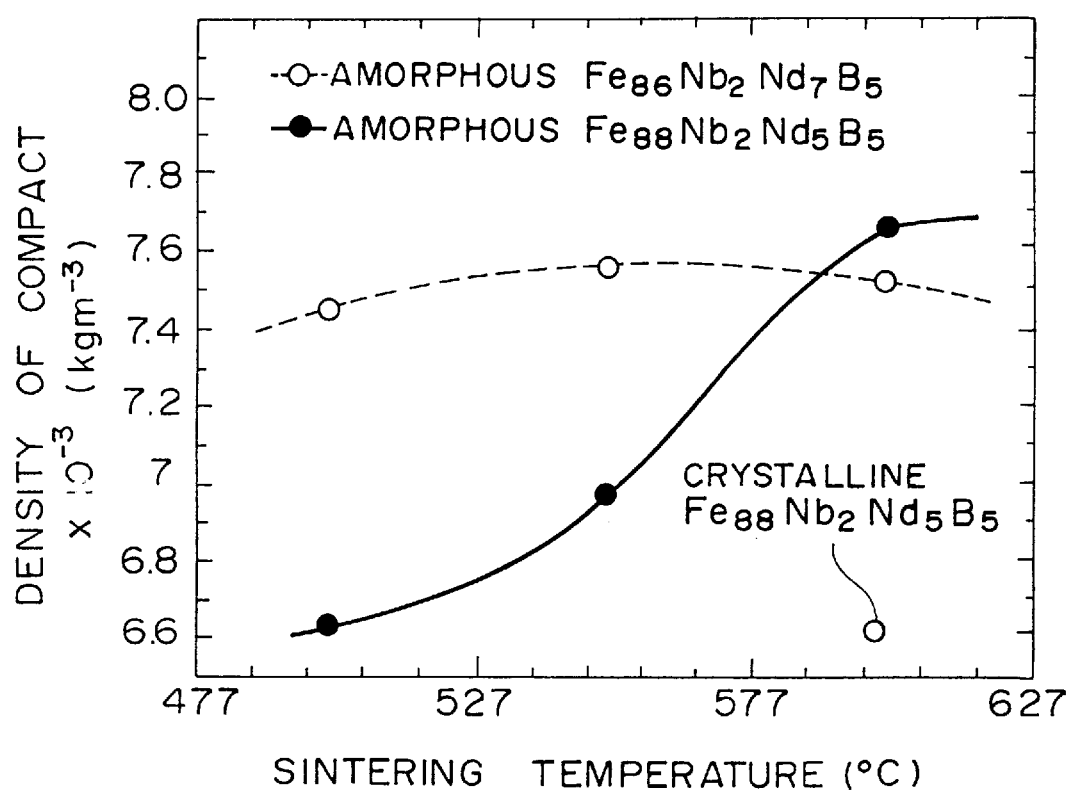
FIG. 41 is a graph illustrating the relationship between the compacted density and the sintering temperature of compacts obtained by molding an amorphous $Fe_{88}Nb_2Nd_5B_5$ powder, an amorphous $Fe_{86}Nb_2Nd_7B_5$ powder, and a crystalline $Fe_{88}Nb_2Nd_5B_5$ powder.

FIG. 41 is a graph illustrating the densities of the compacts which were formed by sintering the amorphous $Fe_{88}Nb_2Nd_5B_5$ and $Fe_{86}Nb_2Nd_7B_5$ powders, as well as the crystalline $Fe_{88}Nb_2Nd_5B_5$ powder for comparison, at a sintering pressure of 636 MPa, a heating rate of 1.8° C./sec., a sintering temperature of 500° C. to 600° C., and a holding time of 8 minutes. As shown in FIG. 41, the density of the compacts obtained by sintering the amorphous $Fe_{88}Nb_2Nd_5B_5$ and $Fe_{86}Nb_2Nd_7B_5$ powders at a relatively high temperature of 600° C. is approximately $7.5\times10^{-3}$ kg/m$^3$, which is almost the same as the true density, whereas the density of the compact obtained by the crystalline $Fe_{88}Nb_2Nd_5B_5$ powder at the same sintering temperature is approximately $6.6\times10^{-3}$ kg/m$^3$. Such high densities of the amorphous alloy powders also suggests the solidification of the amorphous alloy powder accompanied by softening near the crystallization temperature. The density of the $Fe_{86}Nb_2Nd_7B_5$ compact slightly decreases at a lower sintering temperature, whereas the $Fe_{88}Nb_2Nd_5B_5$ compact has a high density of $7.5\times10^{-3}$ kg/m$^3$ even at a low sintering temperature of 500° C. According to DSC with a heating rate of 0.67° C./sec., the $Fe_{88}Nb_2Nd_5B_5$ and $Fe_{86}Nb_2Nd_7B_5$ alloys have crystallization temperatures of 619° C. and 643° C., respectively. The reason for the $Fe_{88}Nb_2Nd_5B_5$ compact having a high density at a relatively low temperature is probably its low crystallization temperature.

Figure 42:
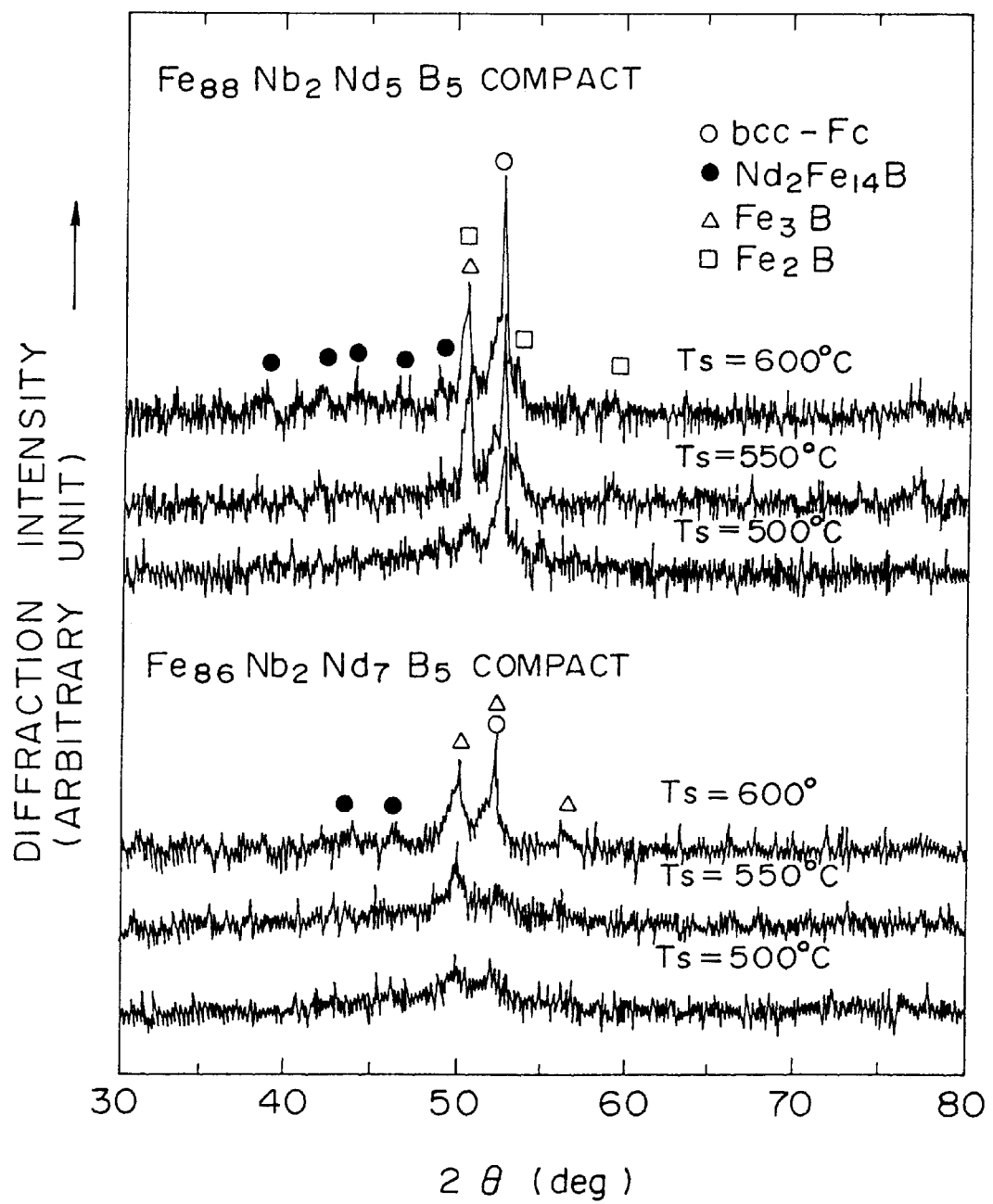
FIG. 42 is a graph of X-ray diffraction patterns of an $Fe_{86}Nb_2Nd_7B_5$ compact and an $Fe_{88}Nb_2Nd_5B_5$ compact immediately after sintering.

FIG. 42 is a graph illustrating X-ray diffraction patterns of the $Fe_{88}Nb_2Nd_5B_5$ and $Fe_{86}Nb_2Nd_7B_5$ compacts immediately after the spark plasma sintering process, wherein each phase in the alloys were identified by the characteristic peaks of the X-ray diffraction patterns obtained by the Co-Kα line. As shown in FIG. 42, the diffraction pattern of the $Fe_{88}Nb_2Nd_5B_5$ compact after sintering includes a peak (○) based on the bcc-Fe phase, peaks (□) based on the $Fe_2B$ phase, and peaks (■) based on the $Nd_2Fe_{14}B$ phase, and the diffraction pattern of the $Fe_{86}Nb_2Nd_7B_5$ compact include peaks (Δ) based on the $Fe_3B$ phase, as well as the peaks based on the bcc-Fe phase, $Fe_2B$ phase, and $Nd_2Fe_{14}B$ phase. The diffraction intensities of the peaks based on the crystalline phases of each amorphous compact increase with the sintering temperature, and this suggests prompt crystallization. The $Fe_{86}Nb_2Nd_7B_5$ compact sintered at 500° C. or 550° C. has a relatively broad diffraction pattern, which suggests a mixture of crystalline amorphous phases. Such a compact has a relatively low density, that is, 6.6 to $7.0 \times 10^{-3}$ $kg/m^3$ as shown in FIG. 13. FIGS. 41 and 42 demonstrate that a high density of the compact is achieved by simultaneous solidification and crystallization of the amorphous alloy powder.

Figure 43:
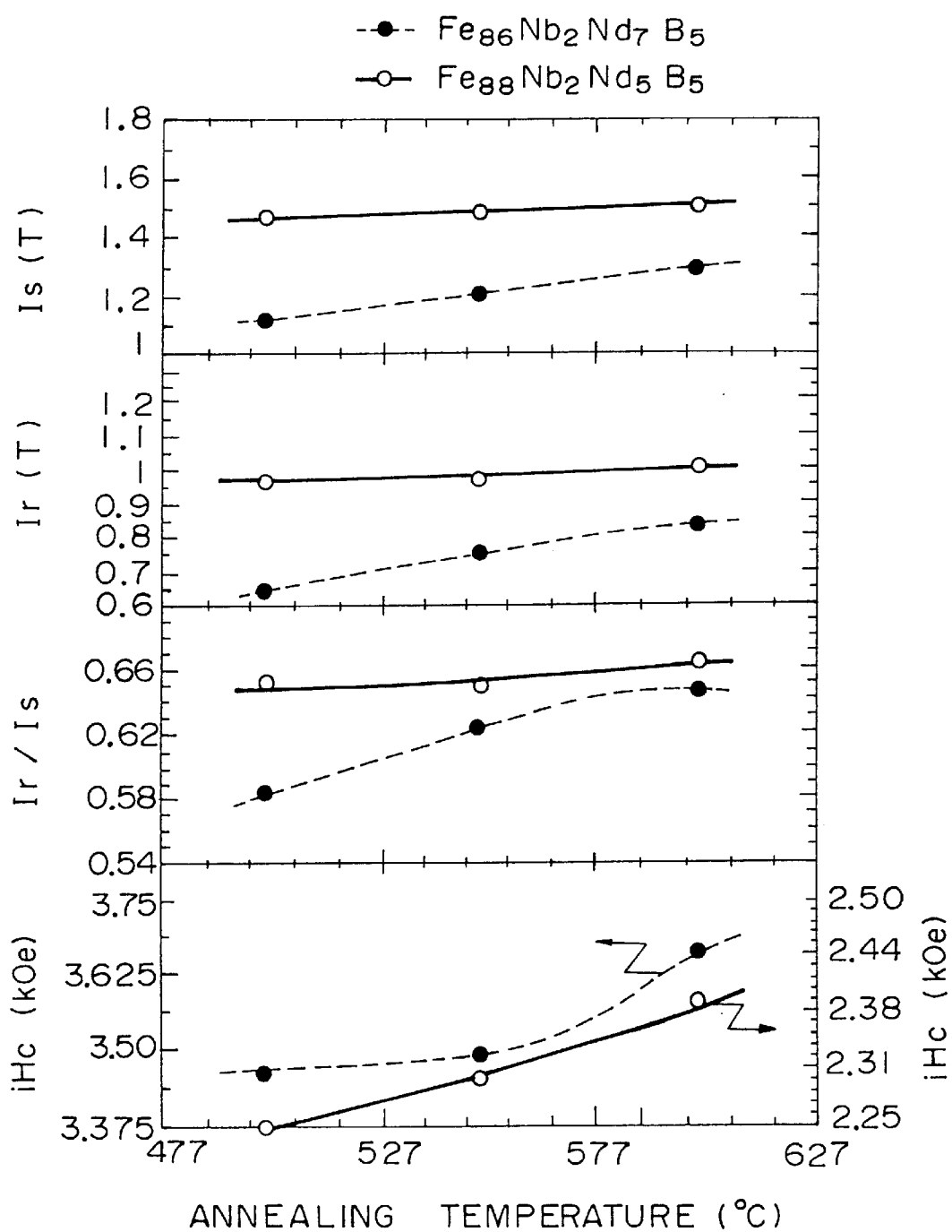
FIG. 43 is a graph of the relationship between the magnetic characteristics and the sintering temperature when sintering an amorphous $Fe_{88}Nb_2Nd_5B_5$ powder and an amorphous $Fe_{86}Nb_2Nd_7B_5$ powder under a pressure of 636 MPa.

FIG. 43 is a graph illustrating the magnetic characteristics of the amorphous $Fe_{88}Nb_2Nd_5B_5$ and $Fe_{86}Nb_2Nd_7B_5$ compacts which were sintered at a sintering pressure of 736 Mpa, a heating rate of 1.8° C./sec., a sintering temperature of 500° C. to 600° C., and a holding time of 8 minutes, and are annealed at a heating rate of 3° C./min, at an annealing temperature of 750° C., and an annealing time of 180 seconds. The magnetic characteristics were measured with a VSM at room temperature while applying a magnetic field of 1.5 T to the test piece (a thickness of 0.5 mm, a width of 1.5 mm, and a length of 6 mm) in the longitudinal direction. As shown in FIG. 43, the remanent magnetization and remanence ratio of the $Fe_{88}Nb_2Nd_5B_5$ compact slightly changes with the sintering temperature, whereas the remanent magnetization, remanence ratio, and coercive force of the $Fe_{86}Nb_2Nd_7B_5$ compact increase with the sintering temperature, and the compact has excellent magnetic characteristics at a sintering temperature of 600° C.

Figure 44:
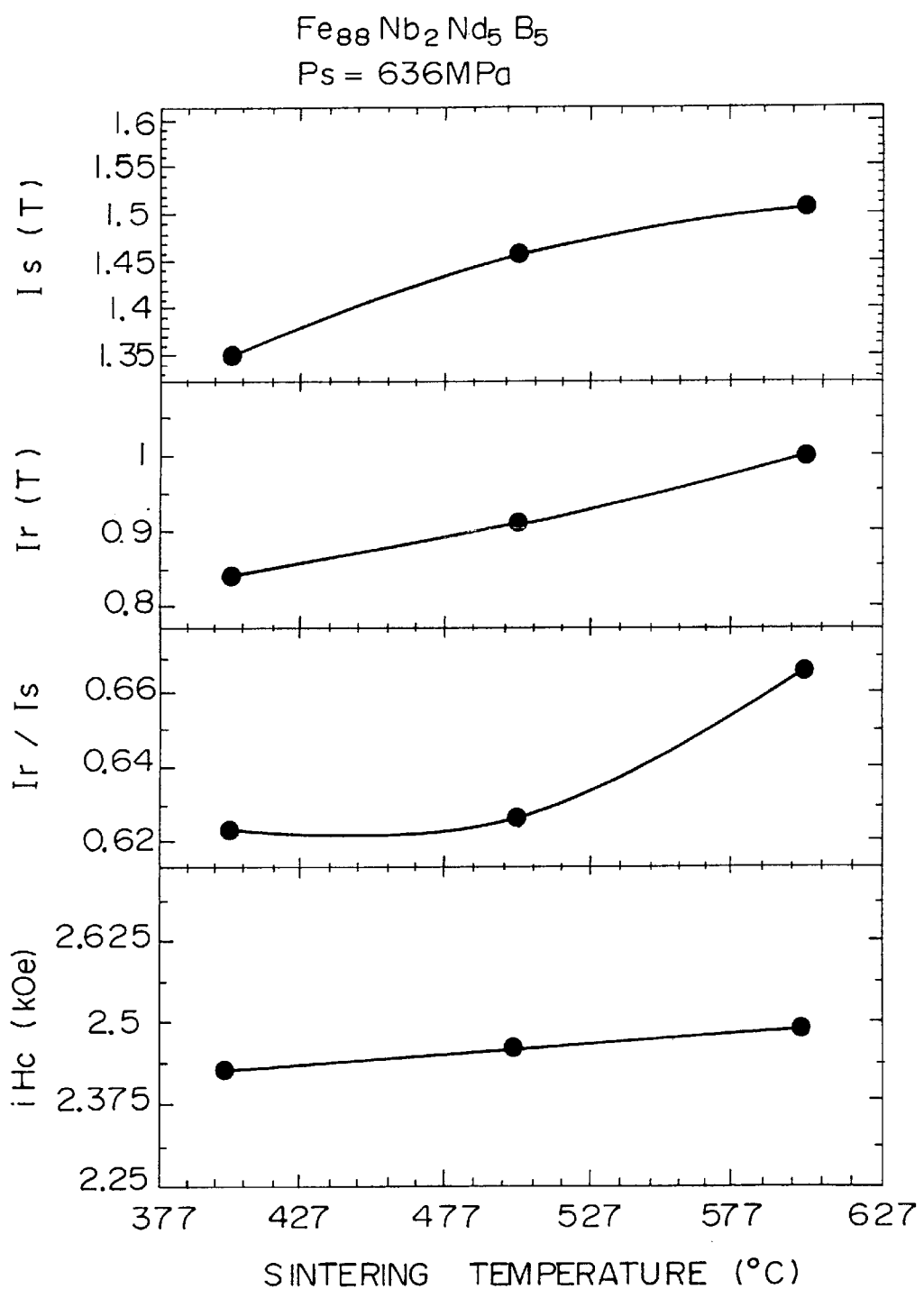
FIG. 44 is a graph of the relationship between the magnetic characteristics and the sintering temperature when sintering an amorphous $Fe_{88}Nb_2Nd_5B_5$ powder under a pressure of 636 MPa.

FIG. 44 is a graph illustrating the relationship between the magnetic characteristics and the sintering temperature of the $Fe_{88}Nb_2Nd_5B_5$ compact which was sintered with a sintering dice having a diameter of 10 mm at a sintering pressure of 636 Mpa. FIG. 44 demonstrates that the saturation magnetization Is, remanent magnetization Ir, and the remanence ratio Ir/Is of the compact decrease with a decreased sintering temperature.

Figure 45:
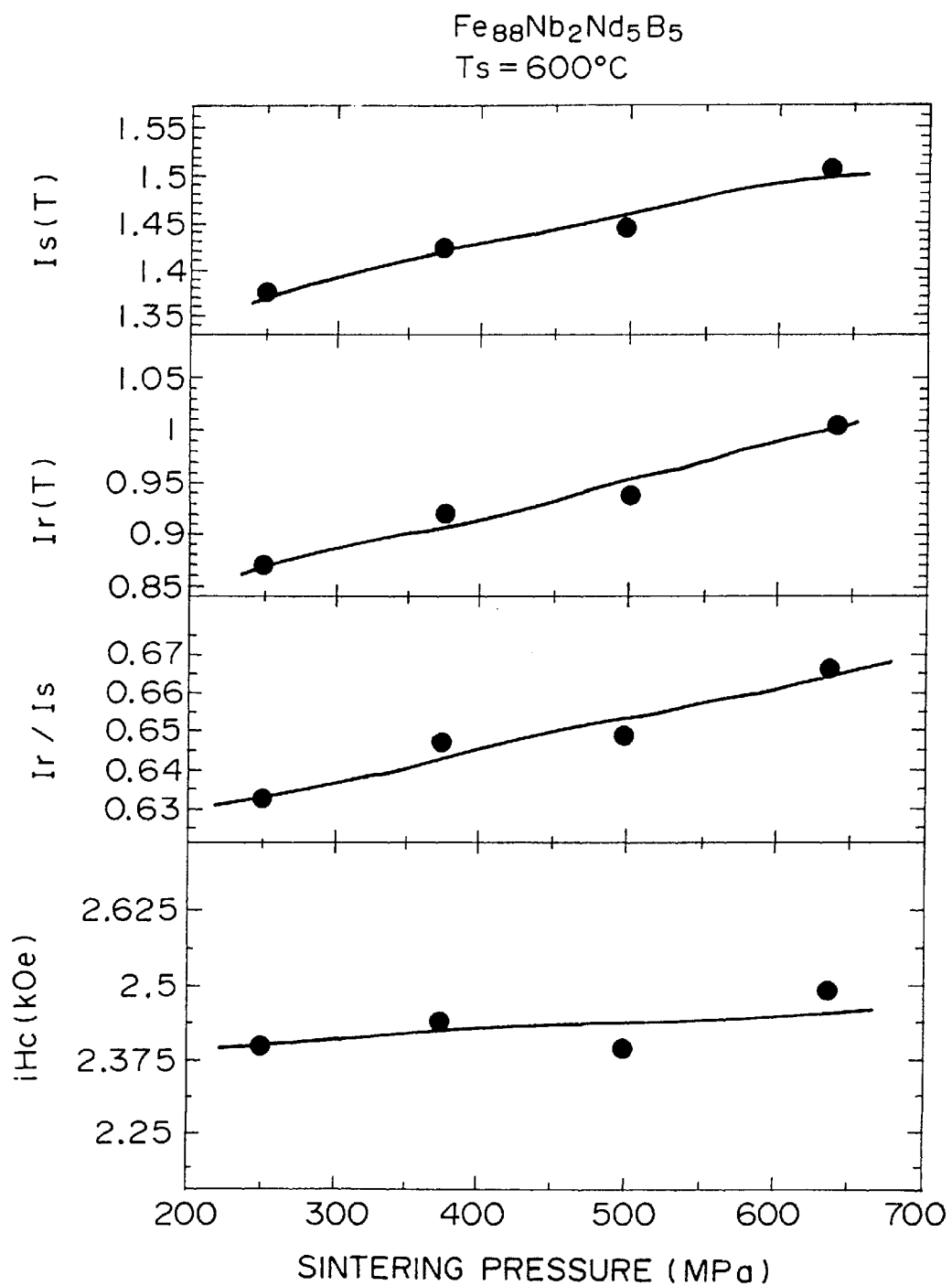
FIG. 45 is a graph of the relationship between the magnetic characteristics and the sintering pressure when sintering an amorphous $Fe_{88}Nb_2Nd_5B_5$ powder at a temperature of 600° C.

FIG. 45 is a graph illustrating the relationship between the magnetic characteristics and the sintering pressure of the $Fe_{88}Nb_2Nd_5B_5$ compact which is sintered at a sintering temperature of 600° C. FIG. 45 demonstrates that the saturation magnetization Is, remanent magnetization Ir, and the remanence ratio Ir/Is of the compact decrease with a decreased sintering pressure. As shown in FIGS. 36 and 37, the density of the compact decreases with a decreased sintering temperature or decreased sintering pressure, hence a decreased density of the compact will adversely affect the magnetic characteristics.

Figure 46:
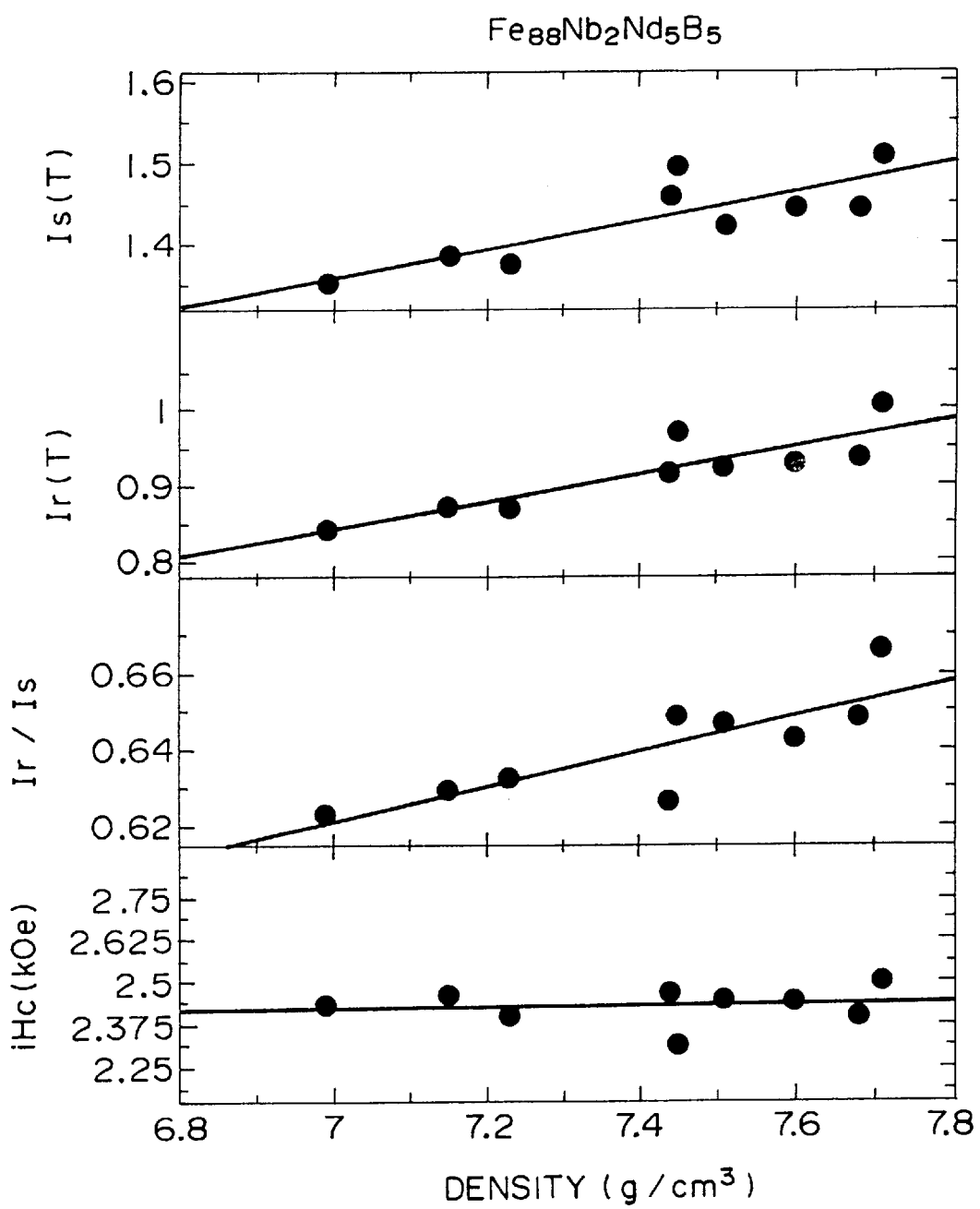
FIG. 46 is a graph of the relationship between the magnetic characteristics and the density of a compact when molding an amorphous $Fe_{88}Nb_2Nd_5B_5$ powder.

FIG. 46 is a graph illustrating the relationship between the magnetic characteristics and the density of the $Fe_{88}Nb_2Nd_5B_5$ compact. As shown in FIG. 46, the saturation magnetization Is, remanent magnetization Ir, and remanence ratio Ir/Is decrease with a decreased density. Accordingly, a higher density of the compact is essential for achieving higher magnetic characteristics.

Figure 47:
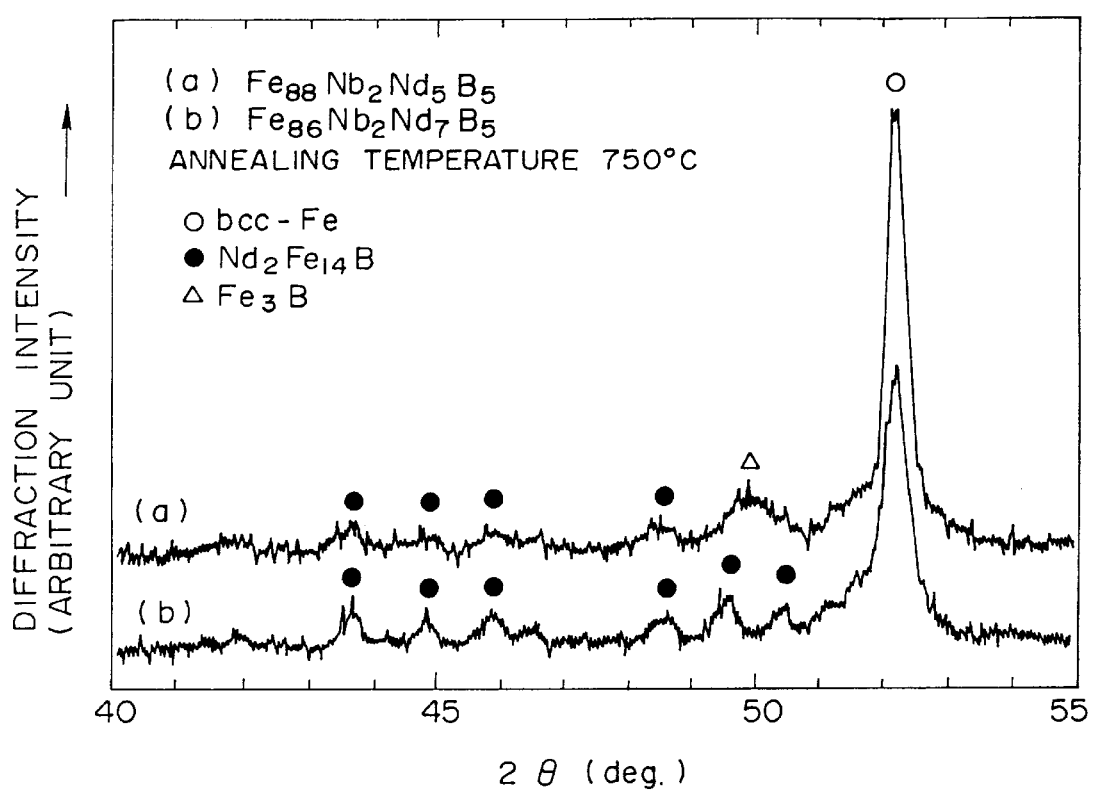
FIG. 47 is a graph of X-ray diffraction patterns after annealing at 750° C. of an $Fe_{88}Nb_2Nd_5B_5$ compact and an $Fe_{86}Nb_2Nd_7B_5$ compact which are sintered under a pressure of 636 MPa at a sintering temperature of 600° C.

FIG. 47 is a graph of X-ray diffraction patterns of the $Fe_{88}Nb_2Nd_5B_5$ and $Fe_{86}Nb_2Nd_7B_5$ compacts which were sintered at a sintering pressure of 736 Mpa, a heating rate of 1.8° C./sec., and a holding time of 8 minutes, and were annealed at an annealing temperature of 750° C. As shown in FIG. 47, the diffraction pattern of the $Fe_{88}Nb_2Nd_5B_5$ compact after sintering includes a peak (○) based on the bcc-Fe phase, peaks (●) based on the $Nd_2Fe_{14}B$ phase, and peaks (Δ) based on the $Fe_3B$ phase, and the diffraction pattern of the $Fe_{86}Nb_2Nd_7B_5$ compact include the peaks based on the bcc-Fe phase and $Nd_2Fe_{14}B$ phase. These compacts therefore contain mixtures of soft and hard magnetic phases. The crystal grain sizes, determined from the half-width values of the (100) diffraction peak of the bcc-Fe phase of the $Fe_{88}Nb_2Nd_5B_5$ and $Fe_{86}Nb_2Nd_7B_5$ compacts are approximately 20 nm, and 30 nm, respectively, which are the same as those of the corresponding alloy ribbons. Also, in the high-resolution transmission electron microscope photographs of the $Fe_{88}Nb_2Nd_5B_5$ compact after annealing at 750° C., bcc-Fe phases with grain sizes of 20 to 40 nm and $Nd_2Fe_{14}B$ phases with a grain size of 20 nm are observed. These results illustrate the formation of the nano-crystalline composite texture in the hard magnetic alloy compact in accordance with the present invention after annealing at 750° C., as in the alloy ribbon.

Figure 48:
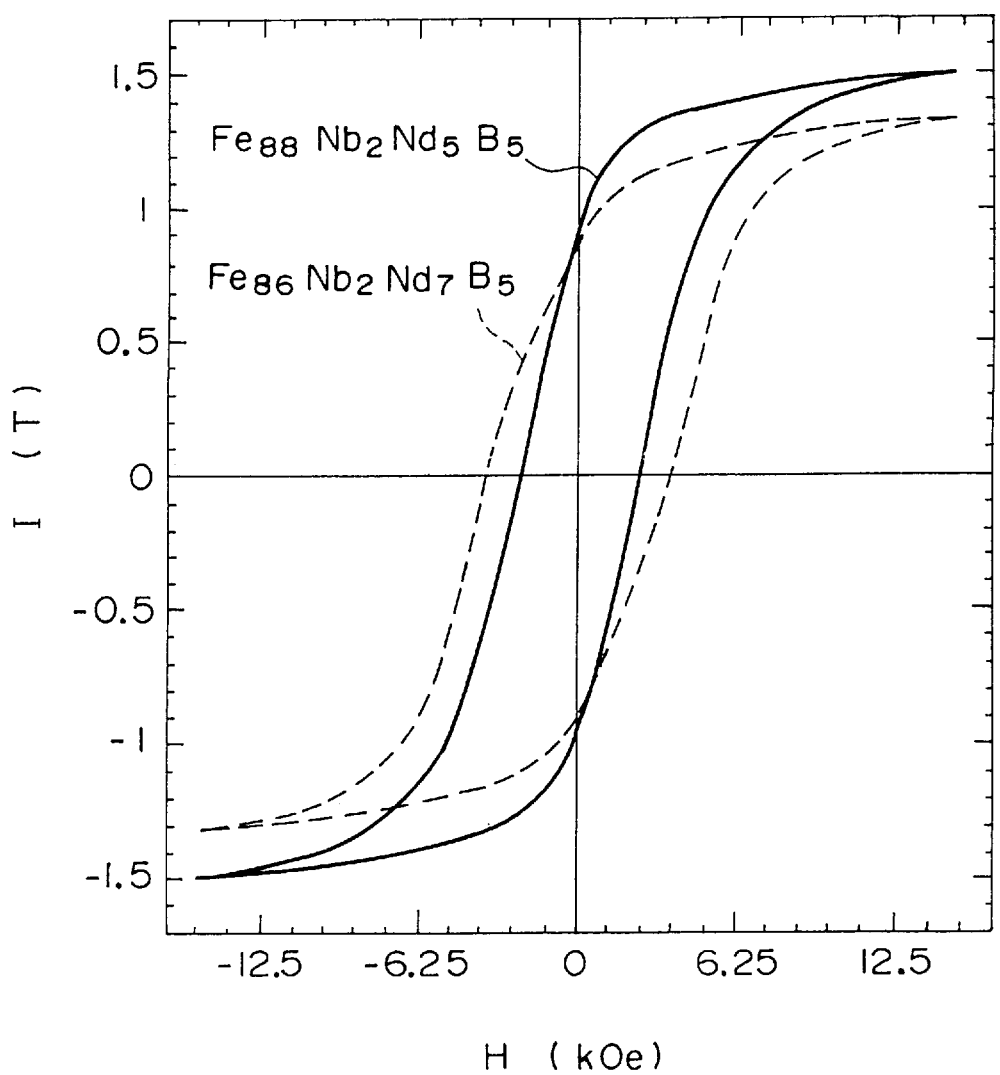
FIG. 48 is a graph of magnetization curves after annealing at 750° C. of an $Fe_{88}Nb_2Nd_5B_5$ compact and an $Fe_{86}Nb_2Nd_7B_5$ compact which are molded under a pressure of 636 MPa at a sintering temperature of 600° C.

FIG. 48 is a graph illustrating magnetization curves of the $Fe_{88}Nb_2Nd_5B_5$ (solid line) and $Fe_{86}Nb_2Nd_7B_5$ (broken line) compacts which were sintered at a sintering pressure of 636 MPa, a heating rate of 1.8° C./sec., a sintering temperature of 600° C., and a holding time of 8 minutes, and annealed at 750° C. These two compacts show smooth magnetization curves as in a magnetic material composed of a single phase. Such a magnetization curve, which is shown in a hard magnetic material composed of a single hard magnetic phase, demonstrates that the fine soft or semi-hard magnetic phase and the fine hard magnetic phase are magnetically coupled with each other in the compact, and thus the compact has exchange coupled magnetic characteristics.

The remanent magnetization Ir (T), remanence ratio Ir/Is, coercive force iHc (kOe), and maximum energy product $(BH)_{max}$ ($kJ/m^3$) of the $Fe_{88}Nb_2Nd_5B_5$ and $Fe_{86}Nb_2Nd_7B_5$ compacts were measured. For comparison, the magnetic characteristics of the alloy ribbons having the same compositions and annealed at 750° C. were also measured. The results are shown in Table 10.

TABLE 10

| Alloy Composition | | Ir (T) | Ir/Is | iHc (kOe) | $(BH)_{max}$ $(kJm^{-3})$ |
|---|---|---|---|---|---|
| Compact | $Fe_{88}Nb_2Nd_5B_5$ | 1.0 | 0.67 | 2.38 | 43 |
| | $Fe_{86}Nb_2Nd_7B_5$ | 0.83 | 0.65 | 3.66 | 49 |
| Ribbon | $Fe_{88}Nb_2Nd_5B_5$ | 1.12 | 0.75 | 2.9 | 67 |
| | $Fe_{86}Nb_2Nd_7B_5$ | 0.90 | 0.72 | 4.15 | 64 |

The results in Table 10 suggest that the alloy compacts have similar coercive forces to those of the alloy ribbons having the same compositions. The maximum magnetic energy products $(BH)_{max}$ of the alloy compact are lower than those of the corresponding alloy ribbons, probably because of the decreased remanence ratios.

Figure 49:
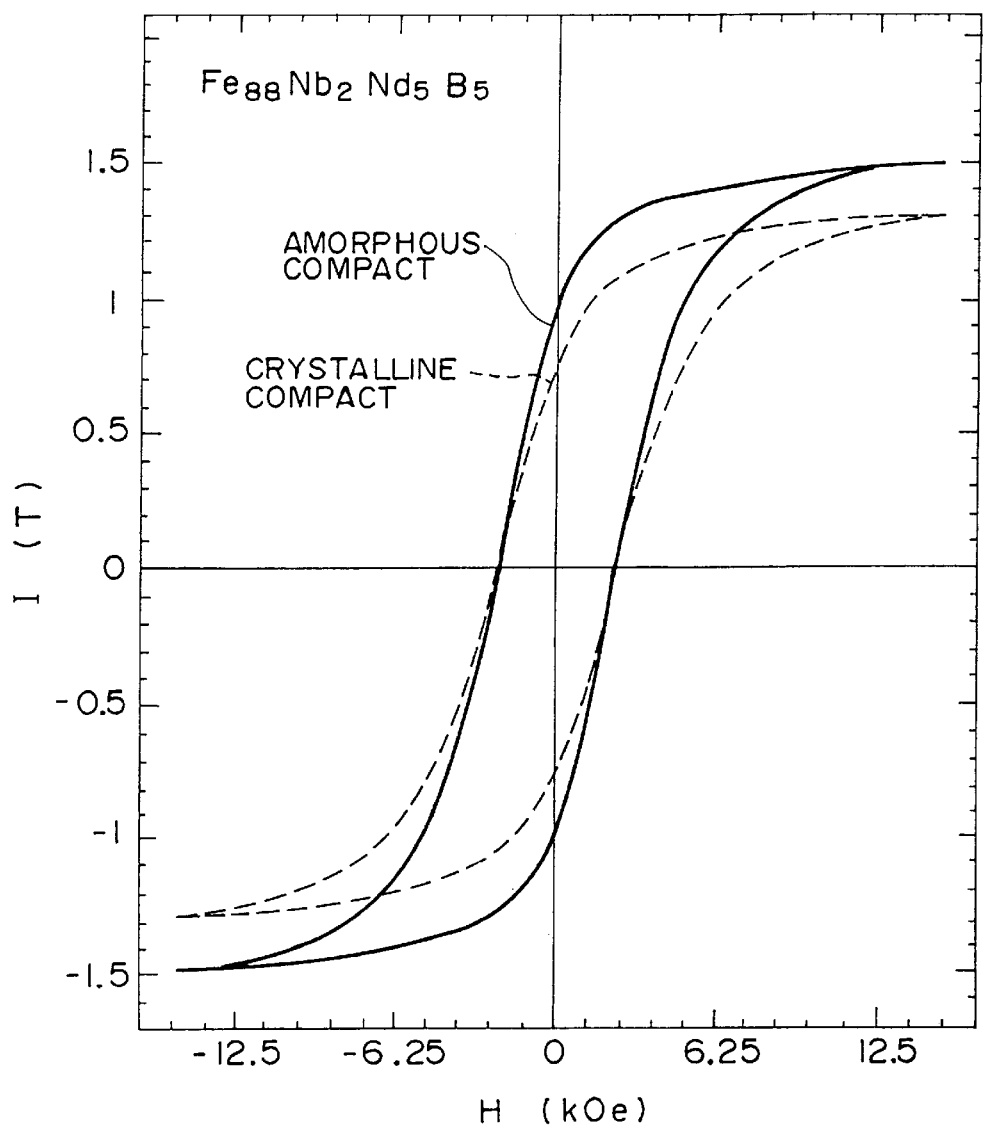
FIG. 49 is a graph of magnetization curves after annealing at 750° C. of an amorphous $Fe_{88}Nb_2Nd_5B_5$ powder as an example and a crystalline $Fe_{88}Nb_2Nd_5B_5$ powder as a comparative example which are molded under a pressure of 636 MPa at a heating rate of 1.8° C./sec., a sintering temperature of 600° C., and a holding time of 480 sec. (8 min.)

FIG. 49 is a graph illustrating the magnetization curves of an amorphous $Fe_{88}Nb_2Nd_5B_5$ compact (solid line) and a crystalline $Fe_{88}Nb_2Nd_5B_5$ compact (broken line) which were sintered at a sintering pressure of 636 MPa, a heating rate of 1.8° C./sec., a sintering temperature of 600° C., and a holding time of 8 minutes, and annealed at a 750° C. As shown in FIG. 49, these compacts have smooth magnetization curves with no steps, and the amorphous $Fe_{88}Nb_2Nd_5B_5$ compact (solid line) has hard magnetic characteristics superior to those of the crystalline $Fe_{88}Nb_2Nd_5B_5$ compact (broken line).

Figure 50:
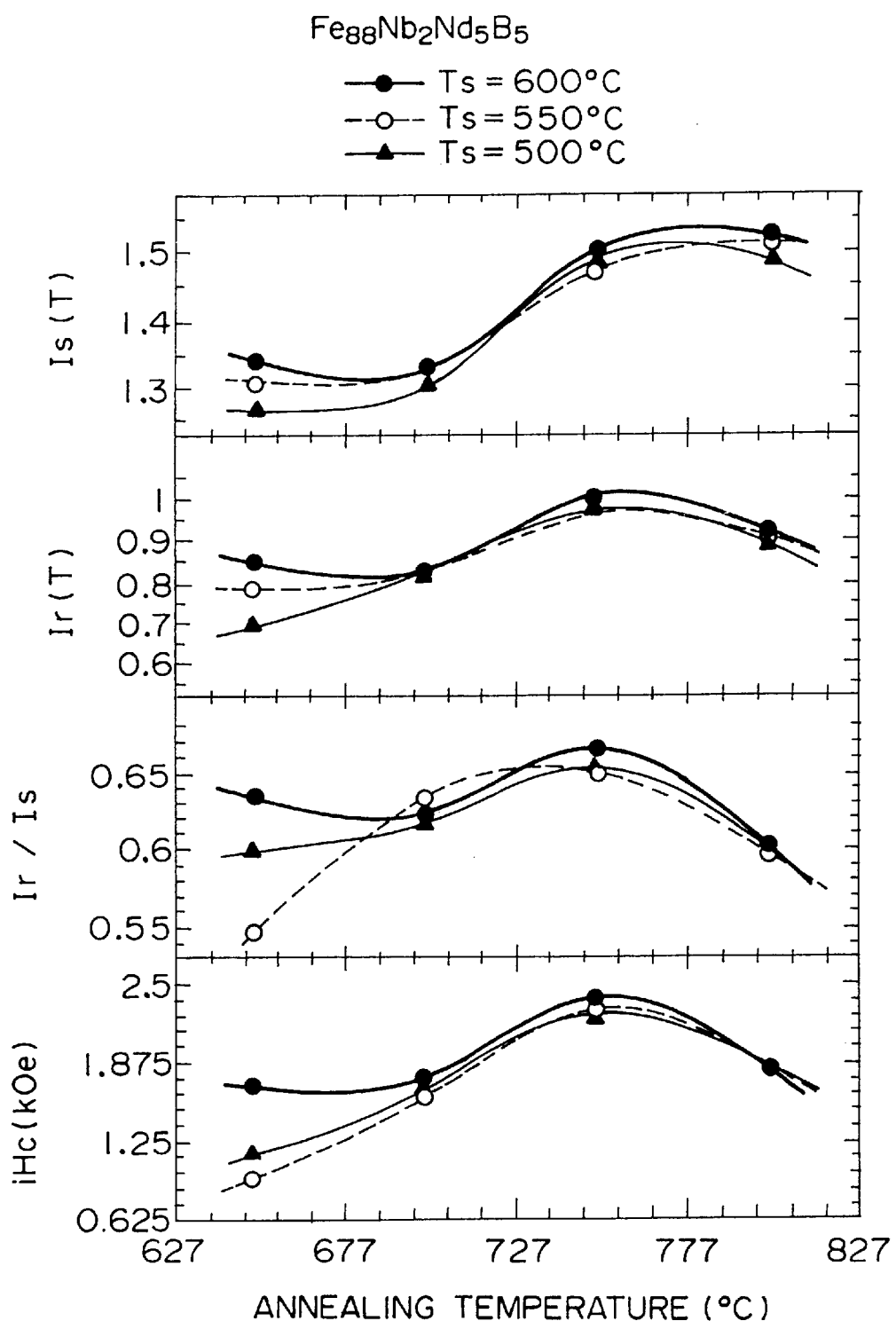
FIG. 50 is a graph illustrating the magnetic characteristics after annealing at 627° C. to 827° C. of a compact which is obtained by molding an amorphous $Fe_{88}Nb_2Nd_5B_5$ powder under a pressure of 636 MPa at a sintering temperature of 500° C. to 600° C.
Figure 51:
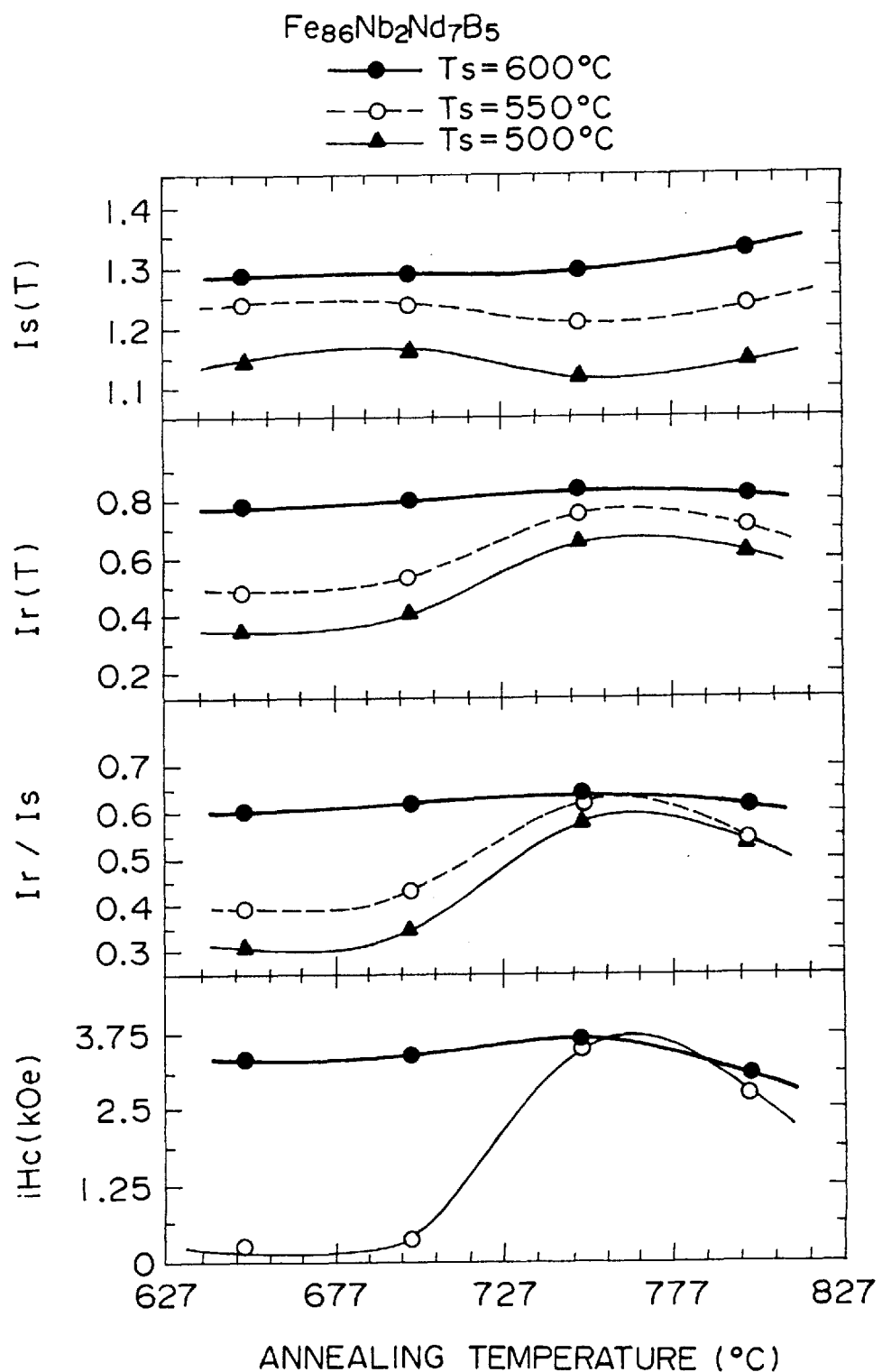
FIG. 51 is a graph illustrating the magnetic characteristics after annealing at 627° C. to 827° C. of a compact which is obtained by molding an amorphous $Fe_{86}Nb_2Nd_7B_5$ powder under a pressure of 636 MPa at a sintering temperature of 500° C. to 600° C.

FIGS. 50 and 51 are graphs of magnetic characteristics of the amorphous $Fe_{88}Nb_2Nd_5B_5$ and $Fe_{86}Nb_2Nd_7B_5$ compacts which were annealed at a sintering pressure of 636 MPa, a heating rate of 1.8° C./sec., a sintering temperature of 500° C. to 600° C., and a holding time of 8 minutes, and annealed at a heating rate of 3° C./min., at an annealing temperature of 627° C. to 827° C., and an annealing time of 180 seconds. As shown in FIGS. 50 and 51, the $Fe_{88}Nb_2Nd_5B_5$ compact has a high coercive force in a combination of a sintering temperature of 600° C. and an annealing temperature of 750° C., and the $Fe_{86}Nb_2Nd_7B_5$ compact has a high coercive force in a combination of a sintering temperature of 500° C. or 550° C. and an annealing temperature of 750° C. although the change of the magnetic characteristics of the $Fe_{86}Nb_2Nd_7B_5$ compact is slight at a sintering temperature of 600° C.

In Table 10, the magnetic characteristics of the sintered compact are inferior to those of the alloy ribbon, because the demagnetization field is probably not corrected for the thickness of the sintered compact.

Figure 52:
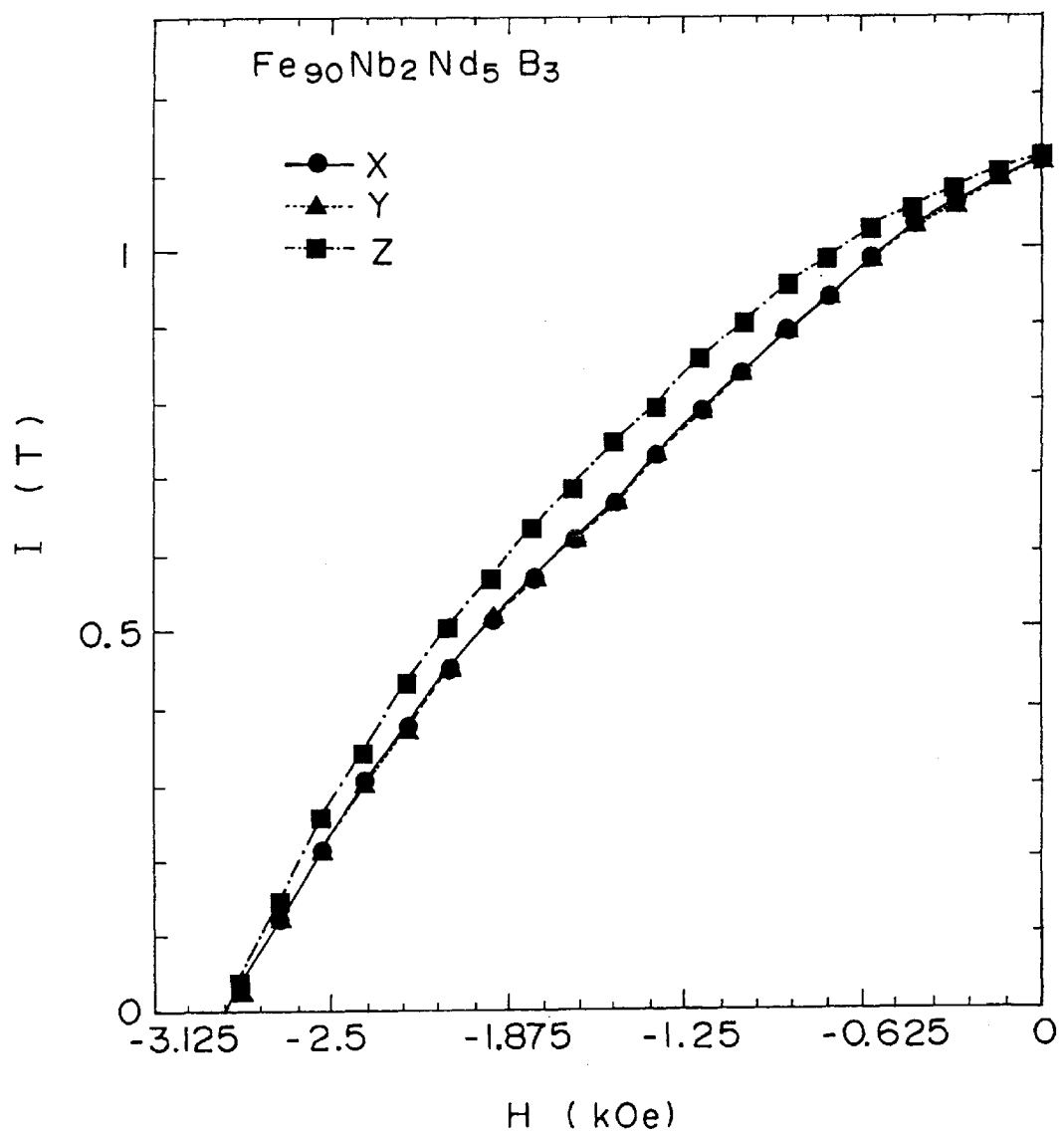
FIG. 52 is a graph illustrating the demagnetization curves of a compact which is obtained by molding an amorphous $Fe_{90}Nb_2Nd_5B_3$ powder under a pressure of 636 MPa at a sintering temperature of 600° C. for 8 min.
Figure 53:
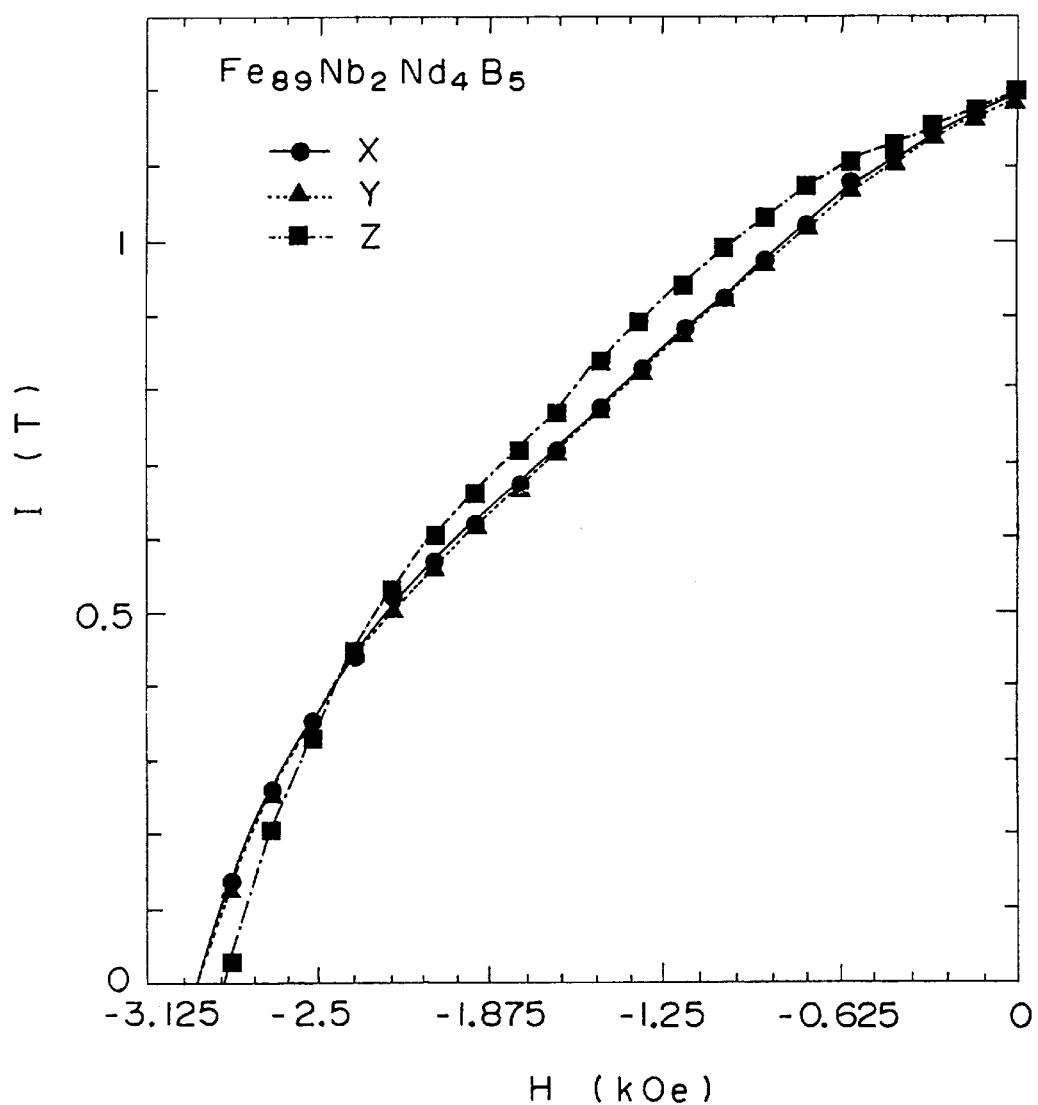
FIG. 53 is a graph illustrating the demagnetization curves of a compact which is obtained by molding an amorphous $Fe_{89}Nb_2Nd_4B_5$ powder under a pressure of 636 MPa at a sintering temperature of 600° C. for 8 min.
Figure 54:
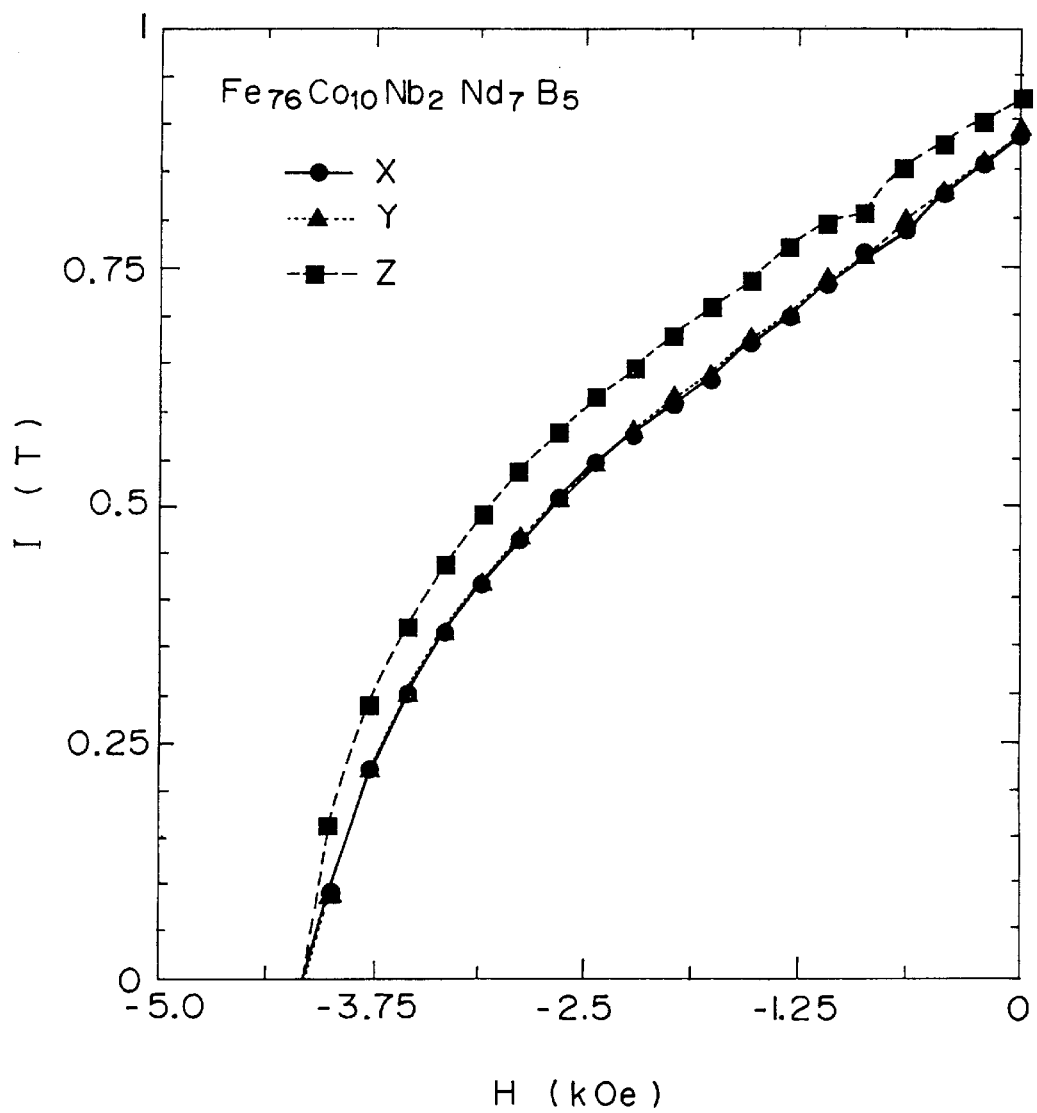
FIG. 54 is a graph illustrating the demagnetization curves of a compact which is obtained by molding an amorphous $Fe_{76}Co_{10}Nb_2Nd_7B_5$ powder under a pressure of 636 MPa at a sintering temperature of 600° C. for 8 min.
Figure 55:
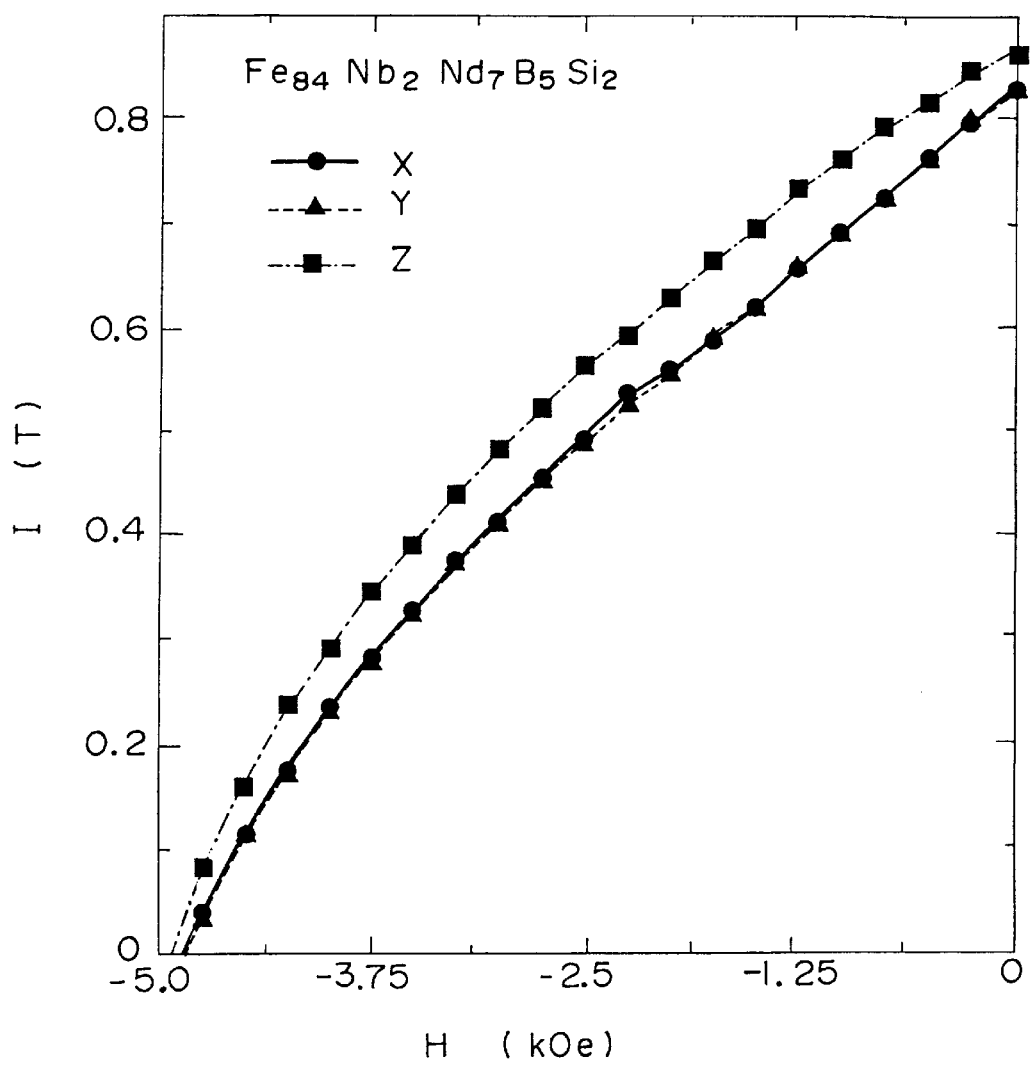
FIG. 55 is a graph illustrating the demagnetization curves of a compact which is obtained by molding an amorphous $Fe_{84}Nb_2Nd_7B_5Si_2$ powder under a pressure of 636 MPa at a sintering temperature of 600° C. for 8 min.

FIGS. 52 to 55 are graphs of demagnetization curves of the amorphous compacts which were prepared by sintering the corresponding amorphous alloy powders at a sintering pressure of 636 MPa, a sintering temperature of 600° C., and a holding time of 8 minutes, and cutting the sintered alloys to form a cube of 5×5×5 mm or 4×4×4 mm, and annealing the cube at the optimum annealing conditions. The demagnetization curves were measured while applying a magnetic field of 5 T with a pulse magnetization system. In each curve, the antimagnetic field is corrected. FIG. 52 includes demagnetization curves in the X, Y, and Z directions of the amorphous $Fe_{90}Nb_2Nd_5B_3$ compact, FIG. 53 includes those of the amorphous $Fe_{89}Nb_2Nd_4B_5$ compact, FIG. 54 includes those of the amorphous $Fe_{76}Co_{10}Nb_2Nd_7B_5$ compact, and FIG. 55 includes those of the amorphous $Fe_{84}Nb_2Nd_7B_5Si_2$ compact. The amorphous alloy powders were compressed in the Z direction when they were sintered, hence the amorphous phase was crystallized or the crystal grains were grown under pressure. Each of these alloy compacts have a remanent magnetization of 0.8 T or more, and a coercive force of approximately 2.5 kOe or more, of which the hard magnetic characteristics are superior to those measured with a VSM in an applied magnetic field of 1.5 T. As shown in FIGS. 52 to 55, each compact has a convex demagnetization curve in the Z direction. Such excellent hard magnetic characteristics in the Z direction are based on single-axis anisotropy of the hard magnetic phase which forms by the precipitation of the hard magnetic phase under pressure or stress.

Example 8

Figure 56:
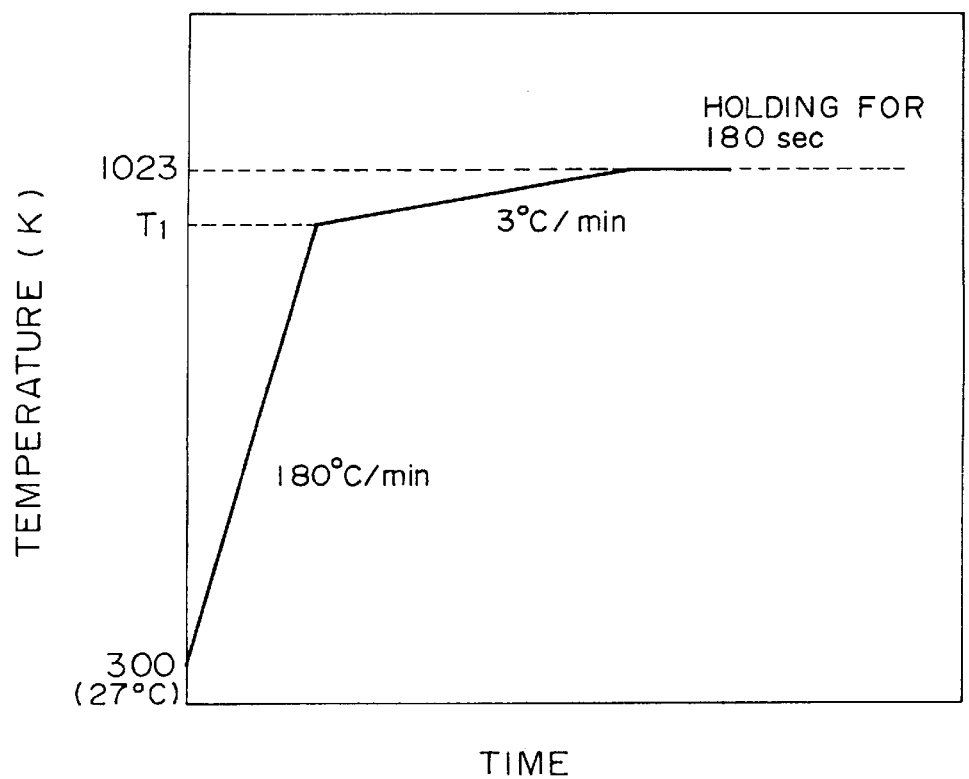
FIG. 56 is a graph illustrating a heating pattern.
Figure 57:
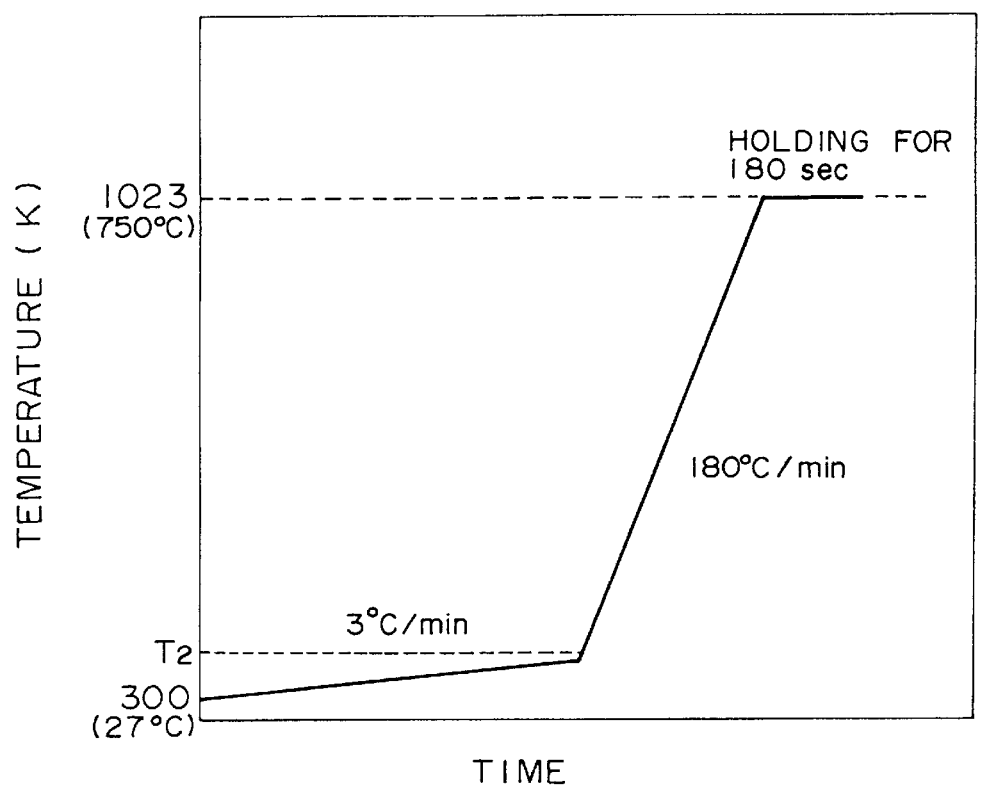
FIG. 57 is a graph illustrating a heating pattern.

A quenched alloy ribbon having a composition of $Fe_{88}Nb_2Nd_5B_5$ was prepared as in Example 1. The resulting alloy ribbon was heated to 750° C. in an infrared image furnace and annealed for approximately 180 seconds. In the annealing process, as shown in FIG. 56, the heating rate of the alloy ribbon was 180° C./min. from room temperature (27° C.) to $T_1$, and 3° C./min. from $T_1$ to 750° C., wherein $T_1$ is changed within a range from 27° C. to 750° C. Several alloy ribbons annealed by different heating processes were prepared in such a manner. Also, several annealed alloy ribbons were prepared by heating, as shown in FIG. 57, at a heating rate of 3° C./min. from room temperature (27° C.) to $T_2$, and 180° C./min. from $T_2$ to 750° C., wherein $T_2$ is changed within a range from 27° C. to 750° C.

Figure 58:
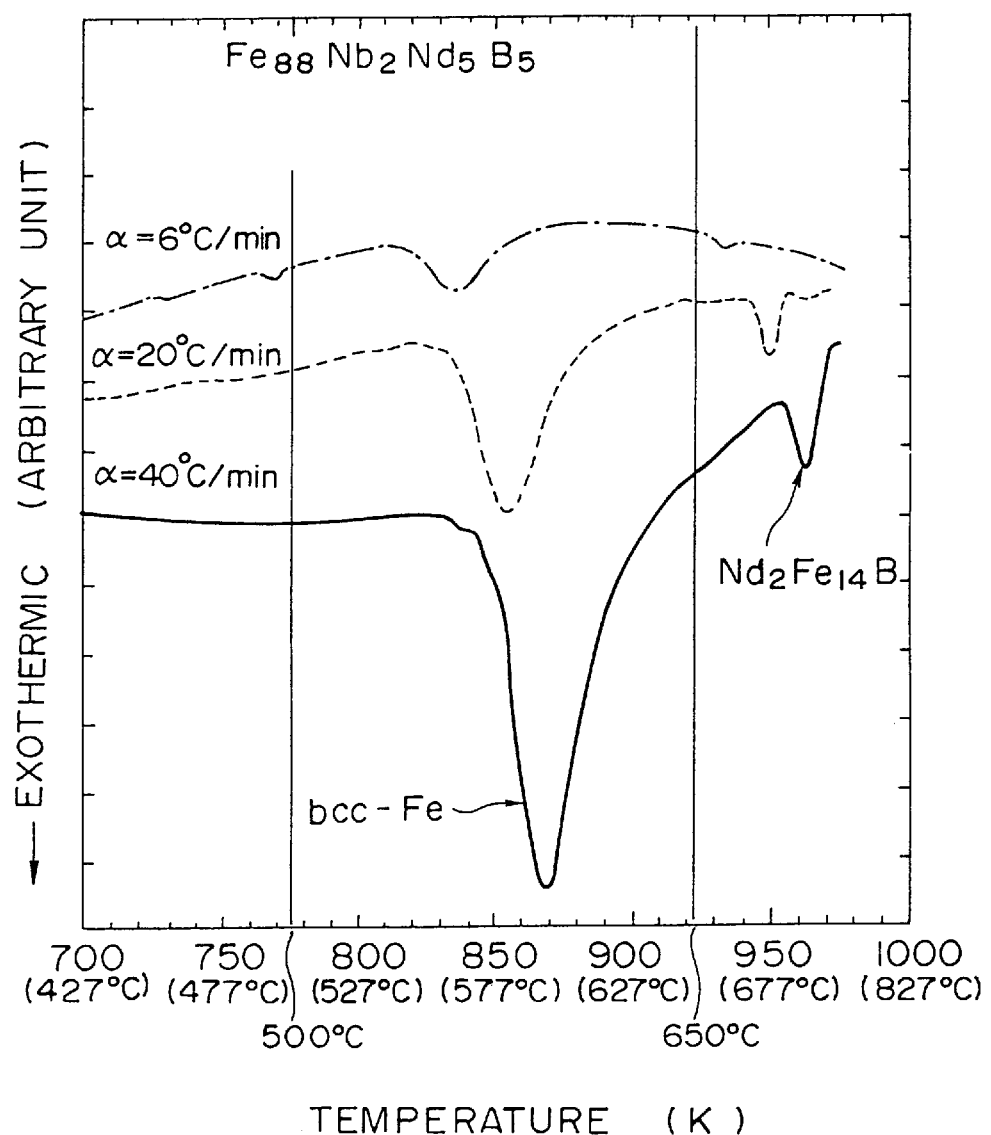
FIG. 58 is a graph of DSC thermograms at various heating rates of an amorphous alloy ribbon having a composition of $Fe_{88}Nb_2Nd_5B_5$ which is obtained by a quenching process.

FIG. 58 is a graph of DSC thermograms at a heating rate of 6 to 40° C./min. of the annealed alloy ribbons. In each of the heating rates, an exothermic peak based on the crystallization of the bcc-Fe phase was observed within a temperature range from 500° C. to 650° C. and an exothermic peak based on the crystallization of the $Nd_2Fe_{14}B$ phase was observed in a temperature range above 650° C.

Figure 59:
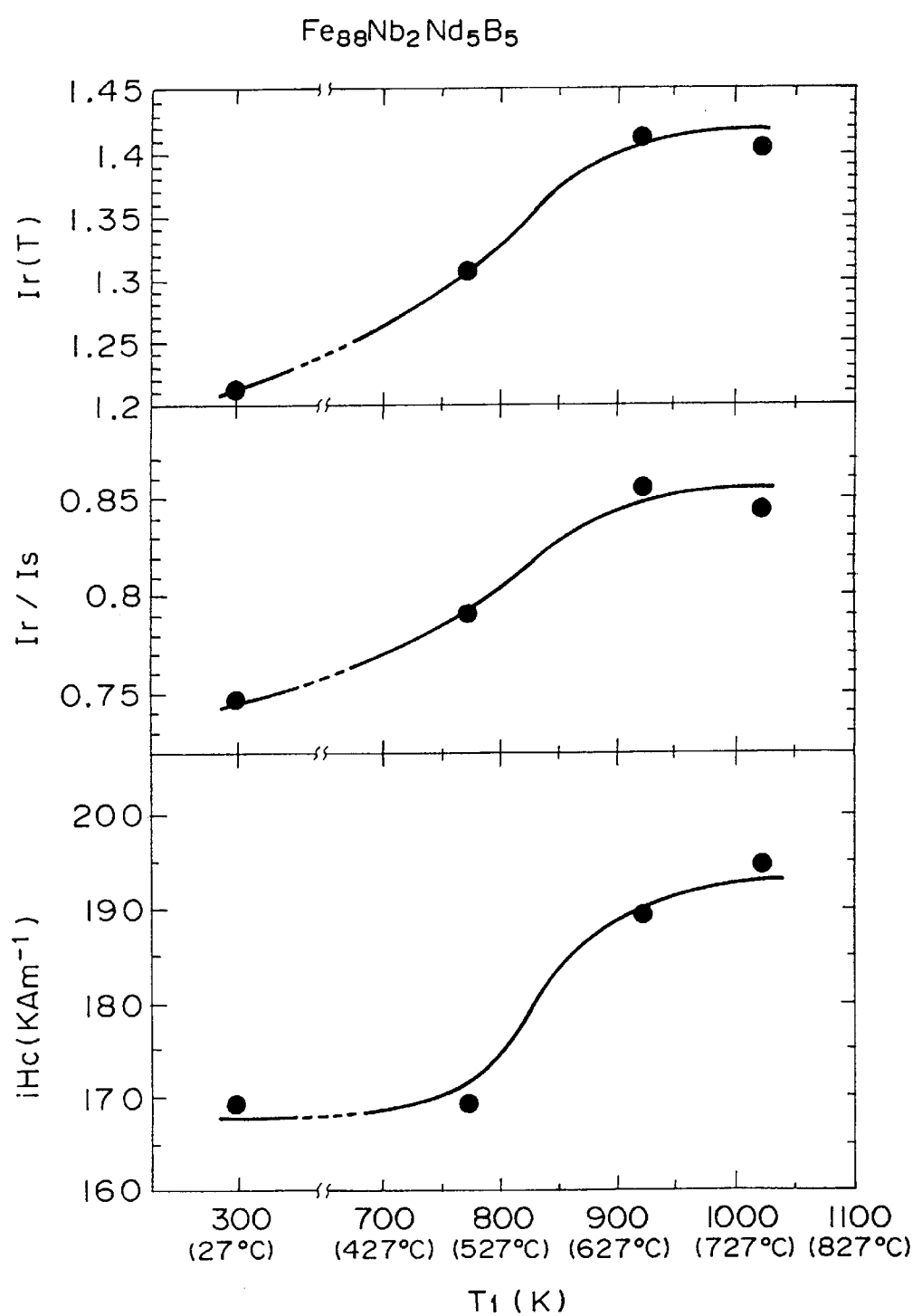
FIG. 59 is a graph illustrating the dependence of magnetic characteristics on $T_1$ in an $Fe_{88}Nb_2Nd_5B_5$ composition.

FIG. 59 is a graph illustrating the remanent magnetization Ir, remanence ratio Ir/Is, and coercive force iHc on $T_1$ of the annealed alloy ribbon, wherein $T_1$ was changed within a temperature range from 27° C. to 750° C. FIG. 59 demonstrates that all the remanent magnetization Ir, remanence ratio Ir/Is, and coercive force iHc are low at a $T_1$ of less than 500° C., resulting in deterioration of the hard magnetic characteristics. When $T_1$ is lower than 500° C., the heating rate is low in a temperature range (500° C. to 650° C.) causing the precipitation of the bcc-Fe phase, hence the sites of the bcc-Fe nuclei will decrease and the crystal grain size of the $Nd_2Fe_{14}B$ phase will increase, which is precipitated and grown between crystal grains of the bcc-Fe phase. Such a phenomenon results in decreased exchange coupling, and thus deterioration of hard magnetic characteristics.

When $T_1$ is 650° C., the heating rate is low in a temperature range (650° C. to 750° C.) causing the precipitation of the $Nd_2Fe_{14}B$ phase. Although a decrease in exchange coupling due to coarsening of the $Nd_2Fe_{14}B$ crystal grains is expected, the observed hard magnetic characteristics of the alloy ribbon are excellent as shown in FIG. 59. With such a phenomenon it is presumed that a large number of crystal grains of the bcc-Fe phase are precipitated at a high heating rate, hence the crystal grain growth of the $Nd_2Fe_{14}B$ phase is suppressed and thus exchange coupling is improved.

Figure 60:
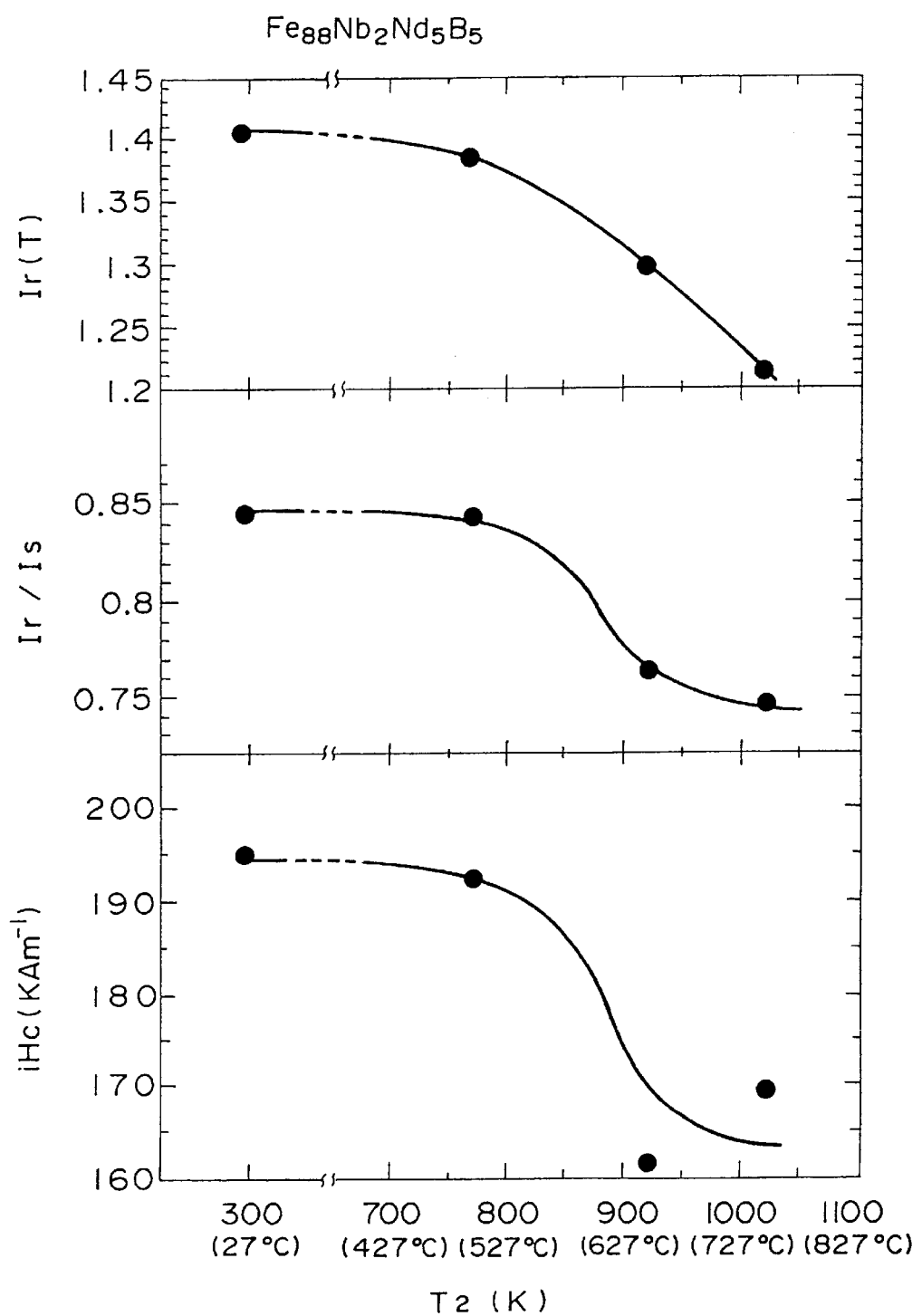
FIG. 60 is a graph illustrating the dependence of magnetic characteristics on $T_2$ in an $Fe_{88}Nb_2Nd_5B_5$ composition.

FIG. 60 is a graph illustrating the remanent magnetization Ir, remanence ratio Ir/Is, and coercive force iHc on $T_2$ of the annealed alloy ribbon, wherein $T_2$ was changed within a temperature range from 27° C. to 750° C. FIG. 60 demonstrates that all the remanent magnetization Ir, remanence ratio Ir/Is, and coercive force iHc are low at a $T_2$ of less than 650° C., resulting in deterioration of hard magnetic characteristics. When $T_2$ is lower than 650° C., the heating rate is low in a temperature range (500° C. to 650° C.) causing the precipitation of the bcc-Fe phase, the crystal grain size of the bcc-Fe phase will increase, resulting in decreased exchange coupling with the $Nd_2Fe14B$ phase and thus deterioration of hard magnetic characteristics.

Accordingly, the alloy ribbon in accordance with the present invention has excellent hard magnetic characteristics by being annealed at a heating rate of 10° C./min. or more within a temperature range (500° C. t 650° C.) causing the precipitation of the bcc-Fe phase.

What is claimed is:

1. A hard magnetic alloy compact comprising one of an Fe-based and FeCo-based alloy containing 3 to 20 atomic percent of at least one rare earth element R, and 2 to 20 atomic percent of B, wherein the alloy having a texture, in which at least a part of the texture comprises one of an amorphous phase and fine crystalline phase having an average crystal grain size of not greater than 100 nm, is subjected to one of crystallization and grain growth under stress, such that a mixed phase composed of a hard magnetic phase and one of a soft magnetic and semi-hard magnetic phase is formed in said texture, anisotropy is imparted to a crystal axis of said hard magnetic phase, and said hard magnetic alloy compact has a coercive force of not less than 1 kOe.

2. A hard magnetic alloy compact according to claim 1, wherein said hard magnetic alloy compact comprises at least 10 percent by volume of one of a soft magnetic and semi-hard magnetic phase having a coercive force of not greater than 1 kOe which comprises an Fe-B compound phase, an amorphous phase, and one of a body centered cubic (bcc) Fe phase and bcc-FeCo phase as precipitates, and at least 10 percent by volume of a hard magnetic phase having a coercive force of not less than 1 kOe which comprises an $R_2Fe_{14}B$ phase.

3. A hard magnetic alloy compact according to claim 1, wherein, after quenching, the alloy is compacted and is simultaneously one of crystallized and subjected to crystal growth under stress.

4. A hard magnetic alloy compact according to claim 1, wherein said hard magnetic alloy contains an amorphous phase, and is formed by solidifying an alloy having hard magnetic characteristics when being crystallized, by means of a softening phenomenon of said alloy during the crystallization reaction.

5. A hard magnetic alloy compact according to claim 1, wherein said alloy is heated under stress.

6. A hard magnetic alloy compact according to claim 1, wherein a relative density of the compact obtained by compacting said alloy is not less than 90%.

7. A hard magnetic alloy compact according to claim 1, wherein said hard magnetic alloy compact has a remnant magnetization of not less than 100 emu/g.

8. A hard magnetic alloy compact according to claim 1, wherein a ratio of a remnant magnetization Ir to a saturation magnetization Is is not less than 0.6.

9. A hard magnetic alloy compact according to claim 1, wherein said hard magnetic alloy compact has the following formula:

$$T_xM_yR_zB_w$$

wherein T represents at least one element selected from the group consisting of Fe, Co and Ni, M represents at least one element selected from the group consisting of Zr, Nb, Ta and Hf, R represents at least one rare earth element, and the suffixes x, y, z and w by atomic percent satisfy $50 \leq x$, $0 \leq y \leq 15$, $3 \leq z \leq 20$, and $2 \leq w \leq 20$, respectively.

10. A hard magnetic alloy compact according to claim 9, wherein the suffixes x, y, z and w by atomic percent satisfy $80 \leq x \leq 92$, $1 \leq y \leq 5$, $3 \leq z \leq 10$, and $3 \leq w \leq 7$, respectively.

11. A hard magnetic alloy compact according to claim 1, wherein said hard magnetic alloy compact has the following formula:

$$T_xM_yR_zB_wSi_u$$

wherein T represents at least one element selected from the group consisting of Fe, Co and Ni, M represents at least one element selected from the group consisting of Zr, Nb, Ta and Hf, R represents at least one rare earth element, and the suffixes x, y, z, w, and u by atomic percent satisfy $50 \leq x$, $0 \leq y \leq 15$, $3 \leq z \leq 20$, $2 \leq w \leq 20$, and $0 \leq u \leq 5$, respectively.

12. A hard magnetic alloy compact according to claim 11, wherein the suffixes x, y, z, w, and u by atomic percent satisfy $80 \leq x \leq 92$, $1 \leq y \leq 5$, $3 \leq z \leq 10$, $3 \leq w \leq 7$, and $0.5 \leq u \leq 5$, respectively.

13. A hard magnetic alloy compact according to claim 1, wherein said hard magnetic alloy compact has the following formula:

$$T_xM_yR_zB_wE_v$$

wherein T represents at least one element selected from the group consisting of Fe, Co and Ni, M represents at least one element selected from the group consisting of Zr, Nb, Ta and Hf, R represents at least one rare earth element, E represents at least one element selected from the group consisting of Cr, Al, Pt and platinum elements, and the suffixes x, y, z, w, and v by atomic percent satisfy $50 \leq x$, $0 \leq y \leq 15$, $3 \leq z \leq 20$, $2 \leq w \leq 20$, and $0 \leq v \leq 10$, respectively.

14. A hard magnetic alloy compact according to claim 13, wherein the suffixes x, y, z, w, and v by atomic percent satisfy $80 \leq x \leq 92$, $1 \leq y \leq 5$, $3 \leq z \leq 10$, $3 \leq w \leq 7$, and $0 \leq v \leq 5$, respectively.

15. A hard magnetic alloy compact according to claim 1, wherein said hard magnetic alloy compact has the following formula:

$$T_xM_yR_zB_wE_vSi_u$$

wherein T represents at least one element selected from the group consisting of Fe, Co and Ni, M represents at least one element selected from the group consisting of Zr, Nb, Ta and Hf, R represents at least one rare earth element, E represents at least one element selected from the group consisting of Cr, Al, Pt and platinum elements, and the suffixes x, y, z, w, v, and u by atomic percent satisfy $50 \leq x$, $0 \leq y \leq 15$, $3 \leq z \leq 20$, $2 \leq w \leq 20$, $0 \leq v \leq 10$, and $0 \leq u \leq 5$, respectively.

16. A hard magnetic alloy compact according to claim 15, wherein the suffixes x, y, z, w, v, and u by atomic percent satisfy $80 \leq x \leq 92$, $1 \leq y \leq 5$, $3 \leq z \leq 10$, $3 \leq w \leq 7$, $0 \leq v \leq 5$, and $0.5 \leq u \leq 5$, respectively.

17. A method for producing a hard magnetic alloy compact comprising:

quenching one of an Fe- and FeCo-based alloy containing 3 to 20 atomic percent of at least one rare earth element R and 2 to 20 atomic percent of B to form a texture, in which at least a part of the texture comprises one of an amorphous phase and fine crystalline phase having an average crystal grain size of not greater than 100 nm;

performing one of crystallization and grain growth under stress, such that a mixed phase composed of a hard magnetic phase and one of a soft magnetic and semi-hard magnetic phase is formed in said texture; and imparting anisotropy to a crystal axis of said hard magnetic phase.

18. A method for producing a hard magnetic alloy compact according to claim 17, wherein after performing one of crystallization and grain growth of said alloy under stress, said alloy is annealed at 400° C. to 1000° C. to precipitate a fine crystalline phase having an average crystal grain size of not greater than 100 nm as a main phase in the texture.

19. A method for producing a hard magnetic alloy compact according to claim 17, wherein said alloy after quenching is compacted while performing one of crystallization and grain growth of said alloy under stress.

20. A method for producing a hard magnetic alloy compact according to claim 17, wherein said hard magnetic alloy contains an amorphous phase, and is formed by solidifying an alloy having hard magnetic characteristics when being crystallized, by means of a softening phenomenon of said alloy during the crystallization reaction.

21. A method for producing a hard magnetic alloy compact according to claim 17, wherein said alloy is heated under stress.

* * * * *

UNITED STATES PATENT AND TRADEMARK OFFICE
CERTIFICATE OF CORRECTION

PATENT NO. : 6,171,410 B1
DATED : January 9, 2001
INVENTOR(S) : Akinori Kojima et al.

It is certified that error appears in the above-identified patent and that said Letters Patent is hereby corrected as shown below:

Title page,
Line 6, under "ABSTRACT", immediately after "C" delete "." (period).

Claim 18,
Line 4, immediately after "C" (first and second occurrence) delete "." (period).

Signed and Sealed this

Ninth Day of April, 2002

Attest:

Attesting Officer

JAMES E. ROGAN
Director of the United States Patent and Trademark Office